(12) United States Patent
Krasnoff

(10) Patent No.: US 10,435,859 B2
(45) Date of Patent: Oct. 8, 2019

(54) CEMENTITIOUS COMPOSITE MAT

(71) Applicant: Cortex Composites, Inc., Pacific Palisades, CA (US)

(72) Inventor: Curren E. Krasnoff, Pacific Palisades, CA (US)

(73) Assignee: Cortex Composites, Inc., Pacific Palisades, CA (US)

( * ) Notice: Subject to any disclaimer, the term of this patent is extended or adjusted under 35 U.S.C. 154(b) by 0 days.

(21) Appl. No.: 15/767,191

(22) PCT Filed: Nov. 4, 2016

(86) PCT No.: PCT/US2016/060684
§ 371 (c)(1),
(2) Date: Apr. 10, 2018

(87) PCT Pub. No.: WO2017/079661
PCT Pub. Date: May 11, 2017

(65) Prior Publication Data
US 2019/0071837 A1    Mar. 7, 2019

Related U.S. Application Data

(60) Provisional application No. 62/251,308, filed on Nov. 5, 2015, provisional application No. 62/251,491, filed
(Continued)

(51) Int. Cl.
*E02D 17/20* (2006.01)
*E02D 3/00* (2006.01)
(Continued)

(52) U.S. Cl.
CPC ............ *E02D 17/202* (2013.01); *E02B 3/123* (2013.01); *E02D 3/00* (2013.01); *E02D 3/005* (2013.01);
(Continued)

(58) Field of Classification Search
CPC combination set(s) only.
See application file for complete search history.

(56) References Cited

U.S. PATENT DOCUMENTS 984,121 A     2/1911   Condie
2,958,593 A   11/1960  Hoover et al.
(Continued)

FOREIGN PATENT DOCUMENTS

CN    101500790         8/2009
CN    101863631 A      10/2010
(Continued)

OTHER PUBLICATIONS

U.S. Appl. No. 15/806,980, filed Nov. 8, 2017, Cortex Composites, Inc.
(Continued)

*Primary Examiner* — Kyle Armstrong
(74) *Attorney, Agent, or Firm* — Foley & Lardner LLP

(57) ABSTRACT

A cementitious composite for in-situ hydration includes a structure layer having a first side and an opposing second side, a cementitious material disposed within the structure layer, a sealing layer disposed along and coupled to the first side of the structure layer, and a containment layer disposed along the opposing second side of the structure layer. The structure layer has an intersection at the sealing layer and the containment layer that is at least partially fiberless. The cementitious material includes a plurality of cementitious particles. The containment layer is configured to prevent the plurality of cementitious particles from migrating out of the structure layer.

18 Claims, 45 Drawing Sheets

Related U.S. Application Data on Nov. 5, 2015, provisional application No. 62/251,505, filed on Nov. 5, 2015, provisional application No. 62/251,342, filed on Nov. 5, 2015, provisional application No. 62/358,448, filed on Jul. 5, 2016.

(51) Int. Cl.
  *E02B 3/12* (2006.01)
  *E02D 29/02* (2006.01)
  *E02D 31/00* (2006.01)

(52) U.S. Cl.
  CPC .......... *E02D 17/20* (2013.01); *E02D 29/0283* (2013.01); *E02D 31/004* (2013.01); *E02D 2200/13* (2013.01); *E02D 2300/0084* (2013.01); *E02D 2600/40* (2013.01)

(56) References Cited

U.S. PATENT DOCUMENTS

| | | | |
|---|---|---|---|
| 3,373,741 | A | 3/1968 | Hill et al. |
| 3,537,121 | A | 11/1970 | McAvoy |
| 3,754,954 | A | 8/1973 | Gabriel et al. |
| 3,897,073 | A | 7/1975 | Swanson et al. |
| 3,900,024 | A | 8/1975 | Lauber et al. |
| 3,917,285 | A | 11/1975 | Swanson et al. |
| 4,235,228 | A | 11/1980 | Gaylord et al. |
| 4,437,271 | A | 3/1984 | McAvoy |
| 4,485,137 | A | 11/1984 | White |
| 4,488,909 | A | 12/1984 | Galer et al. |
| 4,495,235 | A | 1/1985 | Tesch |
| 4,617,219 | A | 10/1986 | Schupack |
| 4,622,260 | A | 11/1986 | Tesch |
| 5,041,330 | A | 8/1991 | Heerten et al. |
| 5,102,726 | A | 4/1992 | Gabbay |
| 5,112,665 | A | 5/1992 | Alexander |
| 5,174,231 | A | 12/1992 | White |
| 5,346,566 | A | 9/1994 | White |
| 5,461,885 | A | 10/1995 | Yokoyama et al. |
| 5,475,904 | A | 12/1995 | Le Roy |
| 5,527,387 | A | 6/1996 | Andersen et al. |
| 5,543,188 | A | 8/1996 | Te'Eni |
| 5,589,245 | A | 12/1996 | Roell |
| 5,631,097 | A | 5/1997 | Andersen et al. |
| 5,651,641 | A * | 7/1997 | Stephens ............ D04H 11/00 405/302.6 |
| 6,156,406 | A | 12/2000 | Rock et al. |
| 6,284,681 | B1 | 9/2001 | Langton et al. |
| 6,461,317 | B1 | 10/2002 | Grim et al. |
| 6,477,865 | B1 | 11/2002 | Matsumoto |
| 6,586,083 | B1 | 7/2003 | Weiss et al. |
| 6,630,414 | B1 | 10/2003 | Matsumoto |
| 6,723,416 | B1 | 4/2004 | Groitzsch et al. |
| 7,465,283 | B2 | 12/2008 | Grim et al. |
| 7,552,604 | B1 | 6/2009 | Waldrop et al. |
| 7,607,730 | B2 | 10/2009 | Moseneder |
| 7,611,999 | B2 | 11/2009 | McMurray |
| 7,721,749 | B2 | 5/2010 | Brewin et al. |
| 7,762,970 | B2 | 7/2010 | Henderson et al. |
| 7,763,339 | B2 | 7/2010 | Groitzsch et al. |
| 7,849,715 | B2 | 12/2010 | Starbuck et al. |
| 7,913,520 | B1 | 3/2011 | Chen et al. |
| 7,937,973 | B2 | 5/2011 | Sorensen et al. |
| 7,960,603 | B2 | 6/2011 | Evans |
| 8,287,982 | B2 | 10/2012 | Brewin et al. |
| 8,343,609 | B2 | 1/2013 | Crawford et al. |
| 8,703,266 | B2 | 4/2014 | Crawford et al. |
| 9,187,902 | B2 | 11/2015 | Krasnoff et al. |
| 9,567,750 | B2 | 2/2017 | Krasnoff et al. |
| 2002/0090871 | A1 | 7/2002 | Ritchie et al. |
| 2003/0077965 | A1 | 4/2003 | Mack et al. |
| 2004/0097151 | A1 | 5/2004 | McMurray |
| 2006/0099415 | A1 | 5/2006 | Morin |
| 2006/0155223 | A1 | 7/2006 | Koch |
| 2007/0206994 | A1 | 9/2007 | Olsta et al. |
| 2007/0238392 | A1 | 10/2007 | Starbuck et al. |
| 2007/0293112 | A1 | 12/2007 | Hanson et al. |
| 2008/0017229 | A1 | 1/2008 | Brewin et al. |
| 2008/0118735 | A1 | 5/2008 | Kanao |
| 2008/0287852 | A1 | 11/2008 | Evans |
| 2010/0233417 | A1 | 9/2010 | Brewin et al. |
| 2010/0319832 | A1 | 12/2010 | Herbert et al. |
| 2011/0086214 | A1 | 4/2011 | Rockwell |
| 2011/0311755 | A1 | 12/2011 | Crawford et al. |
| 2012/0223004 | A1* | 9/2012 | Ferraiolo ............ E02B 3/127 210/293 |
| 2013/0129946 | A1 | 5/2013 | Crawford et al. |
| 2014/0170916 | A1 | 6/2014 | Krasnoff et al. |
| 2014/0205776 | A1 | 7/2014 | Crawford et al. |
| 2015/0099098 | A1 | 4/2015 | Bahukudumbi et al. |
| 2015/0099410 | A1 | 4/2015 | Bahukudumbi et al. |
| 2015/0352804 | A1 | 12/2015 | Kohlman et al. |
| 2015/0352809 | A1 | 12/2015 | Kohlman et al. |
| 2016/0052236 | A1 | 2/2016 | Krasnoff et al. |
| 2016/0186434 | A1 | 6/2016 | Krasnoff et al. |
| 2018/0066430 | A1 | 3/2018 | Krasnoff et al. |

FOREIGN PATENT DOCUMENTS

| | | |
|---|---|---|
| DE | 90 16 062 U1 | 2/1991 |
| DE | 91 05 132 U1 | 6/1991 |
| DE | 10019264 | 10/2001 |
| DE | 10260694 | 6/2004 |
| DE | 10 2006 009 923 | 9/2007 |
| EP | 0 712 09 | 2/1983 |
| EP | 0 748 889 | 12/1996 |
| EP | 0 876 524 | 11/1998 |
| EP | 0 876 524 B1 | 10/2003 |
| EP | 1 630 145 A1 | 3/2006 |
| EP | 1 686 210 | 11/2013 |
| JP | 04-327272 | 11/1992 |
| JP | 06-018099 | 1/1994 |
| JP | 06-048099 | 2/1994 |
| JP | 08-049143 | 2/1996 |
| RU | 2189421 | 9/2002 |
| RU | 624023 | 4/2007 |
| RU | 2592104 | 7/2016 |
| WO | WO-99/35434 | 7/1999 |
| WO | WO-2005/052235 | 6/2005 |
| WO | WO-2005/124063 | 12/2005 |
| WO | WO-2007/144559 | 12/2007 |
| WO | WO-2007/147062 | 12/2007 |
| WO | WO-2008/134604 | 11/2008 |
| WO | WO-2009/115654 | 9/2009 |
| WO | WO-2010/086618 | 8/2010 |
| WO | WO-2013/067034 | 5/2013 |

OTHER PUBLICATIONS

Celanese Acetate, Mesh definition, Complete Textile Glossary, 2001, 3 pages.
Communication pursuant to Rule 114(2) EPC for EP Application No. 12783816, dated Feb. 24, 2015, 4 pages.
International Search Report and Written Opinion for International Application No. PCT/US2012/062831, dated Mar. 21, 2013, 11 pages.
International Search Report and Written Opinion for International Application No. PCT/US2016/060684, dated Feb. 10, 2017, 15 pages.
International Search Report and Written Opinion for PCT Application No. PCT/GB2007/001795, dated Nov. 30, 2007, 10 pages.
International Search Report and Written Opinion for PCT Application No. PCT/GB2010/000156, dated Oct. 28, 2010, 14 pages.
Particle Size Conversion Table, SIGMA-ALDRICH, Downloaded From Internet Jul. 10, 2017.
International Search Report and Written Opinion for International App. No. PCT/US2018/027984, dated Jul. 5, 2018, 13 pages.
Anderson et al., Manual of Ready-Mixed Concrete, 2nd Edition, CRC Press, 2003, ProQuest ebook central.
Powers, T.C.; "Structure and Physical Properties of Hardened Portland Cement Paste" Journal of the American Ceramic Society, vol. 41, No. 1, Jan. 1, 1958 (Year: 1958).

(56) References Cited

OTHER PUBLICATIONS

International Search Report and Written Opinion for International Application No. PCT/US2018/059220, dated Feb. 7, 2019, 8 pages.

* cited by examiner

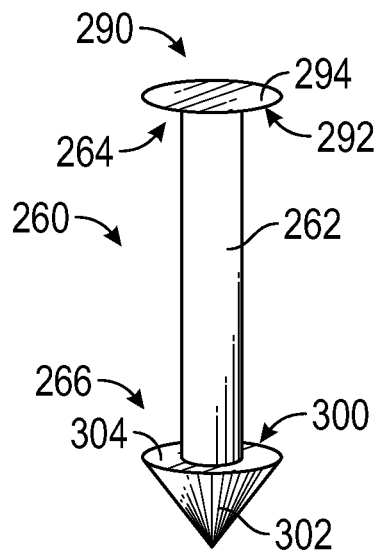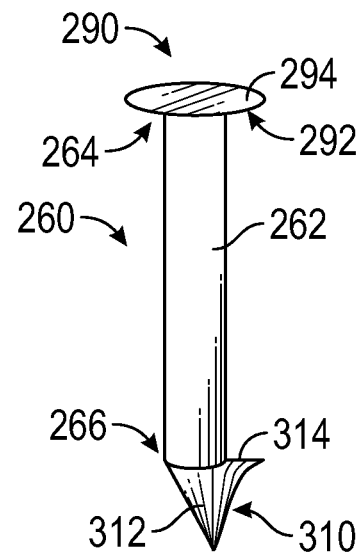
FIG. 9E　　　　　　　　　　FIG. 9F
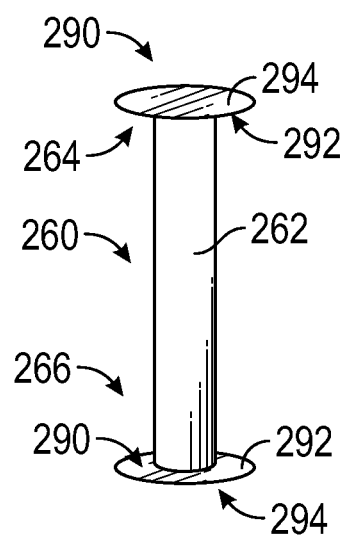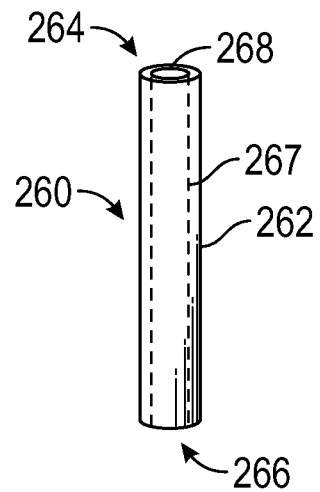
FIG. 9G　　　　　　　　　　FIG. 9H

CEMENTITIOUS COMPOSITE MAT

CROSS-REFERENCE TO RELATED PATENT APPLICATION

This application claims the benefit of U.S. Provisional Patent Application No. 62/358,448, filed Jul. 5, 2016, U.S. Provisional Patent Application No. 62/251,308, filed Nov. 5, 2015, U.S. Provisional Patent Application No. 62/251,342, filed Nov. 5, 2015, U.S. Provisional Patent Application No. 62/251,491, filed Nov. 5, 2015, and U.S. Provisional Patent Application No. 62/251,505, filed Nov. 5, 2015, all of which are incorporated herein by reference in their entireties.

BACKGROUND

The present application relates to a cementitious composite for in-situ hydration (i.e., hydration in place, on location, on a construction site). In-situ hydration occurs as a liquid is topically applied and reacts with a volume of cementitious material within the cementitious composite. This reaction occurs while the cementitious composite is in a position and does not change the directional orientation of the pre-fabricated nature of the cementitious composite. Such a cementitious composite allows cementitious material to set and harden within the cementitious composite without requiring traditional mixing and pour procedures.

Textile-reinforced composites may include at least one layer of a two or three-dimensional textile and a layer of cementitious material to form a laminated composite, where traditionally the textiles are layered in a planer form. Such laminated composites may exhibit excellent in-plane properties but typically lack reinforcement in the thickness direction (i.e., a direction orthogonal to a surface of the composite) or have reduced bonding of the layers. While traditional cement composites may include plain weave fabrics or multiple layers of fabric to improve performance, these systems may fail (e.g., delaminate, etc.) under loading.

Other cementitious composites include "spacer fabric" composites having monofilament threads or yarns which are ideally elastomeric, woven between two layers to create a fabric with a spaced apart arrangement configured to entrap cementitious material between the two layers. The outer layers are each porous to allow the yarns, threads, etc. to be threaded through the outer layers, where the yarns, threads, etc. are fed through the pores of the layers. Additional, less porous fabrics or membranes may be attached to the outer layers of the spacer fabric to reduce the size of openings on each layer and prevent the cementitious material from escaping the composite. Adhesive may be required to attach the additional, less porous fabric layers. The yarns of the spacer fabric do not provide a structure to which other layers may be attached. The yarns must be woven between porous outer layers having apertures arranged in a set configuration designed for the yarn to thread though. Such spacer fabric cementitious composites are labor intensive to manufacture.

SUMMARY

One exemplary embodiment relates to a cementitious composite for in-situ hydration. The cementitious composite includes a structure layer having a first side and an opposing second side, a cementitious material disposed within the structure layer, a sealing layer disposed along and coupled to the first side of the structure layer, and a containment layer disposed along the opposing second side of the structure layer. The structure layer has an intersection at the sealing layer and the containment layer that is at least partially fiberless. The cementitious material includes a plurality of cementitious particles. The containment layer is configured to prevent the plurality of cementitious particles from migrating out of the structure layer.

Another exemplary embodiment relates to a cementitious composite for in-situ hydration. The cementitious composite includes a membrane and a cementitious mixture at least one of disposed along and within the membrane. The membrane includes at least one of a structure layer and an impermeable layer. The cementitious mixture includes cementitious material, aggregate, and absorbent material. The absorbent material is configured to absorb water and expand during in-situ hydration and thereby lock the cementitious material and aggregate in place to prevent washout of the cementitious mixture from the membrane.

Still another exemplary embodiment relates to a cementitious composite for in-situ hydration. The cementitious composite includes a structure layer, a cementitious material, a sealing layer, and a containment layer. The structure layer has at least one strand arranged in at least one of a coiled configuration and a bunched configuration. The structure layer forms a mat having a first side and an opposing second side. The cementitious material is disposed within the structure layer. The cementitious material includes a plurality of cementitious particles. The sealing layer is disposed along the first side of the structure layer and is coupled to the at least one strand. The containment layer is disposed along the opposing second side of the structure layer. The containment layer is configured to prevent the plurality of cementitious particles from migrating out of the structure layer.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description taken in conjunction with the accompanying drawings wherein like reference numerals refer to like elements, in which.

DETAILED DESCRIPTION

Figure 1:
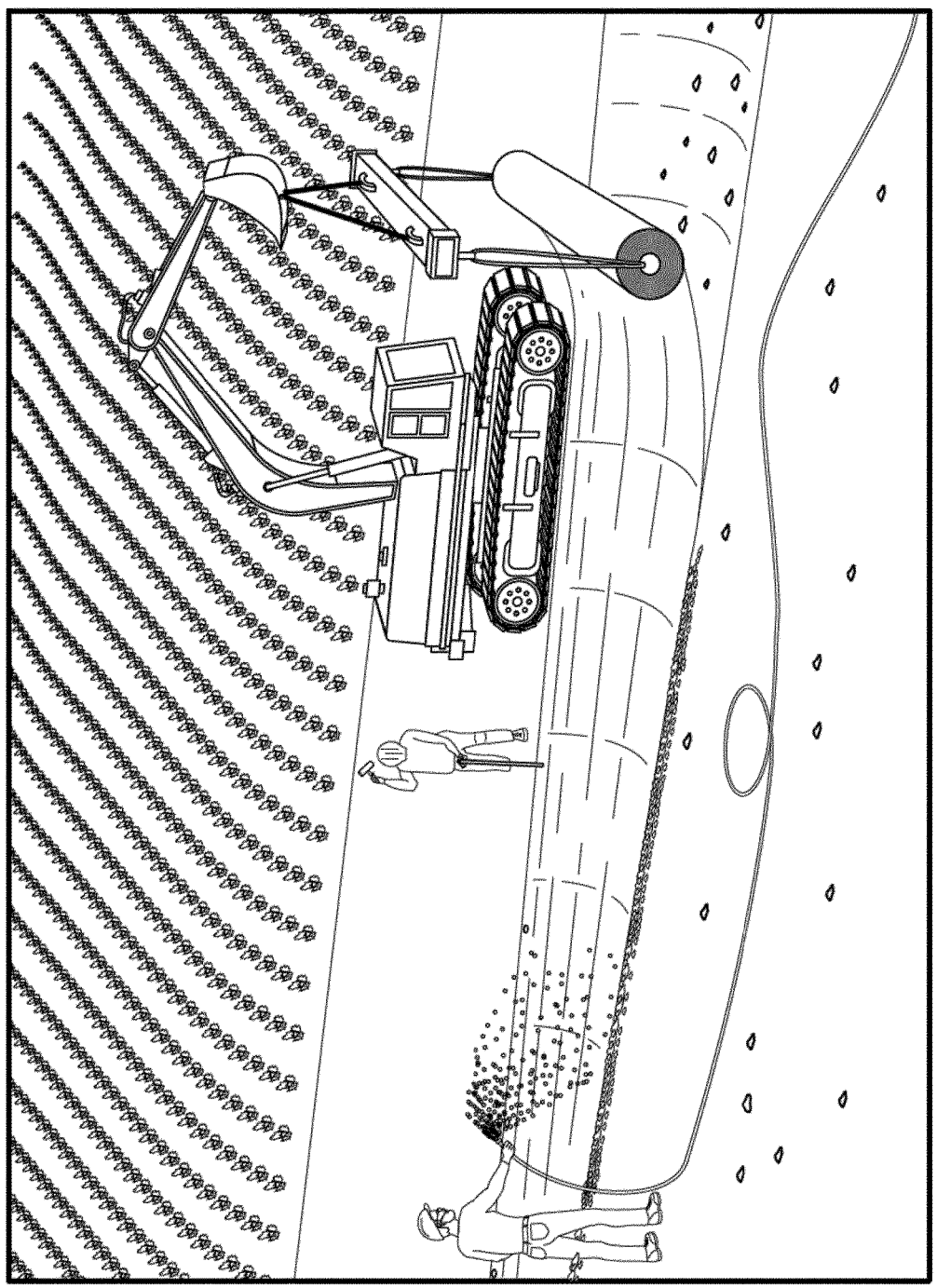
FIG. 1 is a perspective view of operators installing a cementitious composite in a canal lining application, according to an exemplary embodiment.

Before turning to the figures which illustrate the exemplary embodiments in detail, it should be understood that the application may be not limited to the details or methodology set forth in the description or illustrated in the figures. It should also be understood that the terminology may be for the purpose of description only, and should not be regarded as limiting.

Composite Layers

Cementitious composite mats may provide enhanced structural performance relative to concrete reinforced with traditional materials (e.g., fibers, rebar, etc.), traditional unidirectional textile reinforced concrete composites, and woven or knitted three-dimensional textile concrete composites. Cementitious composite mats may include a dry cementitious mixture embedded in, and/or contained by, a structural layer. The structural layer may be positioned between an impermeable layer and a permeable layer. The cementitious mixture undergoes its normal setting and strength gain process after in-situ hydration to produce a rigid composite. The permeable layer may hold water (e.g., for a controlled period of time, etc.) for improved curing of the cementitious composite mat (e.g., facilitating the release of water into the cementitious mixture over a period of time, etc.). Unlike traditional concrete, cementitious composite mats do not require the cementitious portion to be mixed (e.g., in a standalone mixer, in a cement mixer truck, etc.). The cementitious mixture of the present application does not wash from the cementitious composite mat as easily (e.g., not at all, etc.) as traditional, non-formulated cementitious mixtures and remains secured within the cementitious composite mat such that it hardens in place without needing to be mixed. The cementitious mixture is disposed between the permeable and impermeable layers and may include accelerators, retarders, latex modifiers, curing modifiers, other modifiers, fibers, glass additives, metal additives, stone additives, organic additives, water reducing admixtures, shrinkage reducing admixtures, viscosity modifiers, absorbent materials (e.g., superabsorbent materials, superabsorbent polymers, superabsorbent clays, etc.), interconnection particles (e.g., beads, pellets, strands, etc.; made of a resin, a polymer, elastomeric polymer, PVC, polypropylene, polyethylene, a metal or metal alloy having a low melting point, etc.), and/or other gel forming additives so the cementitious mixture remains stationary when hydrated. A cementitious mixture that remains stationary facilitates using a top layer (e.g., permeable layer, etc.) that dissolves upon hydration and/or has apertures.

The structural layer of the cementitious composite mat may be formed into, or include an independent, free-standing material (e.g., the structural layer, etc.). The structure layer may improve load bearing capabilities of the cementitious composite mat by distributing the energy of a load across the structural layer. The structure layer may also bridge crack faces in the cementitious phase to provide improved crack resistance and/or localize cracking to reduce crack propagation. The structural layer may be coupled to at least one of the permeable layer and the impermeable layer with an adhesive, a heat treatment process, and/or mechanically (e.g., barbs, fibers, etc.). Cementitious composite mats having the structural layer may provide improved structural performance per unit of volume, have a lower cost, reduce labor costs, require less processing than other concrete or concrete composite, reduce the possibility of variation in specification compared to poured concrete, and/or eliminate the disadvantages of traditional wet mixing (e.g., range constraints for delivery with a concrete mixer vehicle, etc.), among having other advantages. In addition to holding the cementitious composite mat together and/or retaining the cementitious mixture (e.g., pre-hydration, etc.), the structural layer may structurally reinforce the cementitious layer and/or cementitious composite mat post-hydration.

Hydration of cementitious composite mats may be initiated in-situ (e.g., in place, on a job site, etc.). The cementitious composite mat may be transported to a location (e.g., canal, etc.) as a flexible composite material in a pre-packaged configuration (e.g., sheets, rolls, etc.) and hydrated on-location. Such cementitious composite materials may provide commercial, water conservation, and operational benefits. By way of example, cementitious composite mats may be applied to form a canal lining, as shown in FIG. 1. Other applications for cementitious composite mats may include the following: low to high flow channels, open-channel water conveyance canals, irrigation and drainage ditches, swales, culverts, jetties, groins, dikes, levees, reservoirs, check dams, interceptor ditches, horizontal drains, stream restoration and storm water management, seawall and bulkhead scour protection, landfill layering and capping, brown field layering and capping, mine shaft reinforcement, structural reinforcement, airfield or helipad construction, boat launch ramps, column and beam reinforcement, pipe repair, oilfield lining, holding basins, pond lining, pit lining, waste water lagoon lining, slope fortification, snow basin fortification, tieback fortification, berm lining, beach and shoreline restoration, as a road surface, driveways, sidewalks and walkways, form work lining, concrete waterproofing, a material for homes or other structures, landscaping, foundation linings, flooring, pool construction, patio construction, roofs, insulation and weatherproofing, as a replacement for stucco, for noise attenuation, and for retaining wall and embankment construction, among other applications.

Figure 2:
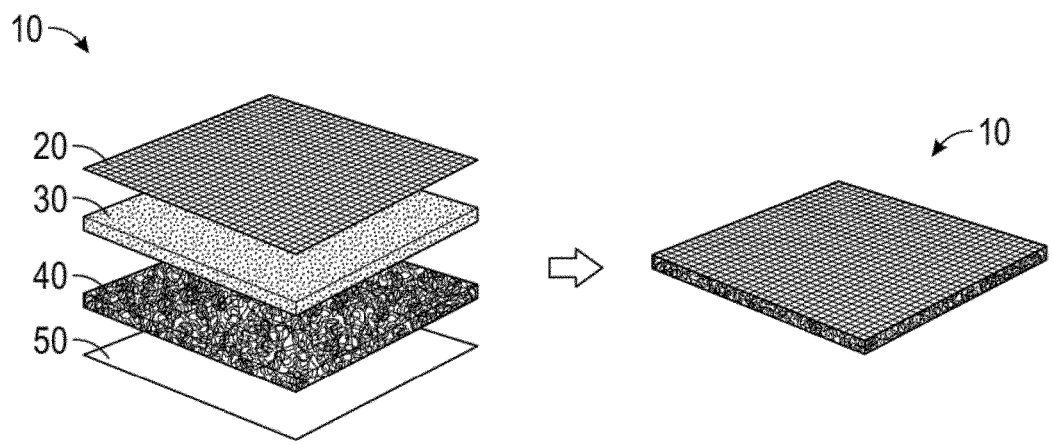
FIG. 2 is an exploded perspective view of a cementitious composite, according to an exemplary embodiment.

According to the exemplary embodiment shown in FIG. 2, a composite mat, shown as cementitious composite 10, includes a plurality of layers. As shown in FIG. 2, such layers include a containment layer, shown as permeable layer 20, a cementitious layer, shown as cementitious mixture 30, a three-dimensional volume layer (e.g., a bunching layer, a mesh layer, a grid layer, a nonwoven layer, a not woven layer, a nonfibrous layer, a fiberless layer, pins/connectors, interconnecting particle layer, a coiled layer, a tube layer, a 3D knitted/woven layer, a plastic layer, a metal layer, a layer configured for integration with one or more snap-fit connections, etc.), shown as structure layer 40, and an impermeable (e.g., sealing, etc.) layer, shown as impermeable layer 50. According to an exemplary embodiment, permeable layer 20, cementitious mixture 30, structure layer 40, and impermeable layer 50 are disposed adjacent to one another and assembled into a sheet to form cementitious composite 10. As shown in FIG. 2, structure layer 40 may be disposed between (e.g., sandwiched between, etc.) permeable layer 20 and impermeable layer 50. According to an exemplary embodiment, cementitious composite 10 has a thickness of between five millimeters and one hundred millimeters pre-hydration. The thickness of cementitious composite 10 may exceed the pre-hydration thickness after hydration when, by way of example, additives are included in cementitious mixture 30 (e.g., expansive cement, etc.). It should be understood that reference to a structure layer or a cementitious mixture may include any structure layer and/or cementitious mixture disclosed herein.

According to an exemplary embodiment, cementitious composite 10 includes layers that are coupled together. Such coupling may reduce the relative movement between the layers pre-hydration (e.g., during the manufacturing process, during transportation, during installation, etc.). By way of example, impermeable layer 50 may be coupled (e.g., selectively joined, etc.) with structure layer 40. By way of another example, permeable layer 20 may be coupled (e.g., selectively joined, etc.) with structure layer 40. Such coupling may improve the structural characteristics of cementitious composite 10 by facilitating load transfer between permeable layer 20, structure layer 40, and impermeable layer 50. Structure layer 40 may serve as a bonding medium. Various structure layers may reduce the risk of delamination.

According to an alternative embodiment, cementitious composite 10 includes a different combination of layers. By way of example, cementitious composite 10 may include impermeable layer 50, structure layer 40, cementitious mixture 30, and/or permeable layer 20. Such a composite may utilize the structure layer 40 to hold cementitious mixture 30, may include a removable layer to retain cementitious mixture 30 during transport and in the application of cementitious composite 10, and/or may include another system designed to retain cementitious mixture 30. According to various alternative embodiments, cementitious composite 10 includes permeable layer 20 and impermeable layer 50, only impermeable layer 50, only permeable layer 20, or neither permeable layer 20 nor impermeable layer 50. By way of example, cementitious composite 10 may include impermeable layer 50, structure layer 40, cementitious mixture 30, and permeable layer 20. By way of another example, cementitious composite 10 may include impermeable layer 50, structure layer 40, and cementitious mixture 30. By way of yet another example, cementitious composite 10 may include only structure layer 40, and cementitious mixture 30 may be introduced therein on-site (e.g., cementitious mixture 30 may be scattered, laid, embedded, etc. across, in, and/or along structure layer 40 on-site and prior to in-situ hydration, etc.). By way of still another example, the cementitious composite 10 may include only impermeable layer 50, and cementitious mixture 30 may be introduced thereon on-site (e.g., cementitious mixture 30 may be scattered, laid, embedded, etc. across, in, and/or along impermeable layer 50 on-site and prior to in-situ hydration, etc.). Further, impermeable layer 50 may have one or more surface imperfections and/or a roughness (e.g., fibers, members, barbs, etc.) that are configured to facilitate holding cementitious mixture 30 prior to and/or after hydration, attach to the hardened concrete, and/or be embedded within the hardened concrete. By way of still another example, cementitious composite 10 may include only permeable layer 20 and cementitious mixture 30. Cementitious mixture 30 may be introduced on-site (e.g., cementitious mixture 30 may be scattered across or otherwise deposited on the ground, compacted soil, non-compacted soil, cracked concrete substrate in need of repair, another substrate, etc.) and may be compacted on-site. Permeable layer 20 may be introduced after cementitious mixture is deposited on the ground, substrate, etc. to aid in hydration and reduce washout of cementitious mixture 30 (e.g., for mixes with water absorbent polymers, etc.). By way of a further example, cementitious composite 10 may include only cementitious mixture 30 (e.g., a mixture of constituent materials, etc. in a prepackaged bagged form, in super sacks, or in portable sacks, etc.). Such a cementitious mixture 30 may be scattered across or otherwise deposited on the ground (e.g., compacted soil, non-compacted soil, cracked concrete substrate in need of repair, another substrate, etc.) on-site without permeable layer 20, structure layer 40, and/or impermeable layer 50. The layer of cementitious mixture 30 may be compacted using hand tools or heavy equipment prior to in-situ hydration.

According to still another alternative embodiment, cementitious composite 10 includes cutout voids extending entirely through cementitious composite 10. By way of example, the cutout voids may allow a fluid to drain through the composite after hardening. A cementitious composite having cutout voids may be produced by forming voids either before or after manufacturing the composite. The cutout voids may be formed in any shape (e.g., triangle, circle, oval, diamond, square, rectangle, octagon, etc.). The volume of the composite removed to form the cutout voids may define between one and ninety percent of the total composite volume.

Figure 3:
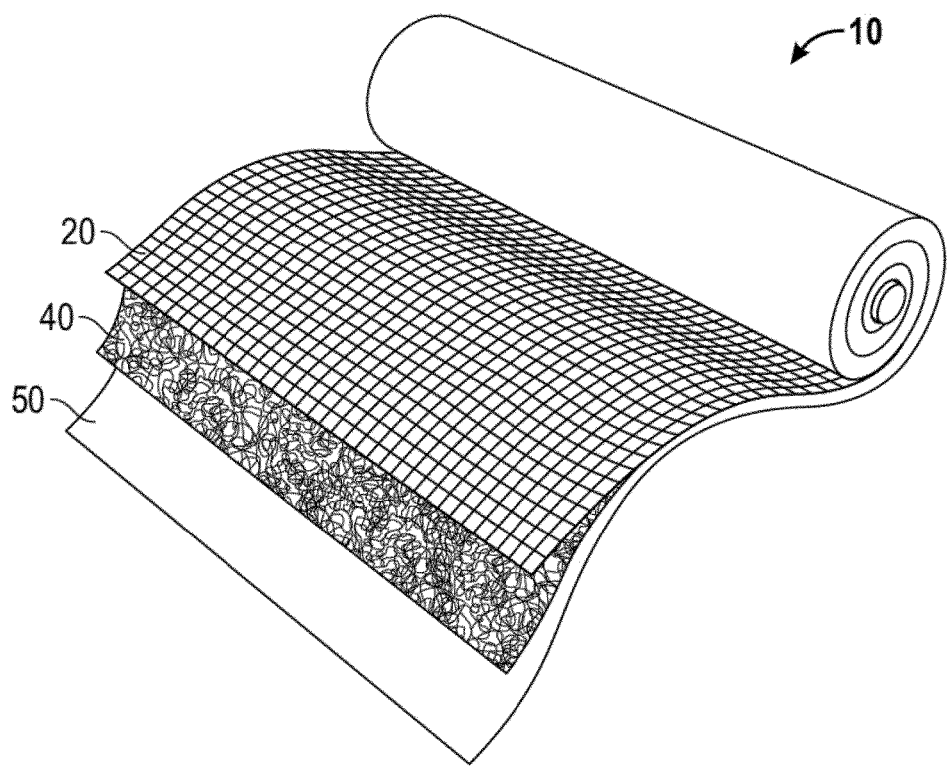
FIG. 3 is a perspective view of a rolled cementitious composite, according to an exemplary embodiment.

Referring next to the exemplary embodiment shown in FIG. 3, cementitious composite 10 may be arranged into a flexible sheet. As shown in FIG. 3, permeable layer 20, structure layer 40, and impermeable layer 50 are each flexible and disposed adjacent to one another. According to an exemplary embodiment, such a combination of flexible layers facilitates rolling cementitious composite 10 to facilitate transportation and reduce the amount of cementitious mixture 30 that migrates through permeable layer 20. According to an alternative embodiment, cementitious composite 10 may be arranged in another configuration (e.g., various sheets that may be stacked, a sheet having a preformed shape, etc.).

Structure Layer
Nonwoven Structure Layer

Structure layer 40 may include low density, high void space, and discontinuities, among other characteristics. In one embodiment, structure layer 40 is an independent, structural material configured to support the weight of cementitious mixture 30, thereby reducing the risk of pre-hydration delamination (e.g., separation of structure layer 40 from impermeable layer 50, from permeable layer 20, etc.), while improving the strength of the cementitious composite 10 post-hydration. By way of example, structure layer 40 may be configured to independently support a cementitious mix having a weight of between one and five pounds per square foot. These characteristics improve the strength and transportability, among other features, of cementitious composite 10. Structure layer 40 may also reduce the prevalence and/or severity of shrink-induced cracking within cementitious mixture 30. Such a reduction may be produced because structure layer 40 limits crack propagation by bridging crack faces within the cementitious phase.

According to an exemplary embodiment, structure layer 40 is flexible. In other embodiments, structure layer 40 is semi-rigid. By way of example, structure layer 40 may have a predefined shape (e.g., curved, etc.) such that cementitious composite 10 takes the shape of structure layer 40. In some embodiments, structure layer 40 is deformable (e.g., plastically deformable, etc.). According to an exemplary embodiment, structure layer 40 includes at least one of a natural material (e.g., coconut fiber, cellulose fiber, other natural materials, etc.), a synthetic material (e.g., aramid glass, etc.), a polymeric material, (e.g., plastic, nylon, polypropylene, etc.), a metallic material (e.g., metal, aluminum oxide, etc.), and a composite material (e.g., carbon fiber, silicon carbide, etc.).

According to an exemplary embodiment, structure layer 40 may have independent mechanical properties apart from those of the other layers of cementitious composite 10. By way of example, such mechanical properties may include tensile strength, elongation at break, and tear strength, among other known properties. Structure layer 40 may have portions with a target thickness, length, and/or coupling designed to provide target mechanical properties. Structure layer 40 may have a composition that provides a target mechanical property. The modulus of elasticity and geometry of structure layer 40 may affect the flexibility of cementitious composite 10. A structure layer 40 having one of a lower modulus of elasticity or more open geometry may increase the pliability (e.g., lower radius of curvature, etc.) of cementitious composite 10 (e.g., for shipping, to contain cementitious mixture 30, etc.).

According to an alternative embodiment, structure layer 40 includes void patterns (e.g., shapes cut through structure layer 40, three dimensional voids formed within structure layer 40, etc.). Such void patterns may be formed in structure layer 40 through cutting, forming, or another process. The void patterns may be formed during the primary manufacturing of structure layer 40 or subsequently as a secondary manufacturing process. According to an exemplary embodiment, the void patterns are randomly distributed or formed in sequence (e.g., a honeycomb, etc.). The void patterns may decrease the time required to dispose cementitious mixture 30 in structure layer 40, improve the physical properties of cementitious composite 10 after in-situ hydration, and/or provide other advantages.

According to an alternative embodiment, a coating may be disposed around and/or along at least a portion of structure layer 40. By way of example, the coating may be configured to improve various properties (e.g., strength, durability, etc.) of structure layer 40. As still a further example, the coating may improve the coupling strength of portions within structure layer 40, of structure layer 40 to permeable layer 20 and impermeable layer 50, and of structure layer 40 to cementitious mixture 30 after in-situ hydration. By way of example, the coating may include an abrasive coating (e.g., similar to that provided with a Scotch-Brite® scouring pad, etc.), a coating to provide resistance to ultraviolet light, a coating to protect structure layer 40 from cementitious mixture 30 (e.g., improved alkaline resistance, improved bonding to cementitious mixture 30 post-hydration, to reduce delamination and/or detachment from set cementitious mixture 30, etc.), and/or still another known coating.

In some embodiments, cementitious composite 10 includes a scrim lining (e.g., a mesh reinforcing material, a grid reinforcing material, a geotextile, a geogrid, a nonwoven material, a woven material, etc.) coupled to (e.g., fused, integrally formed, joined, etc.) structure layer 40. A scrim lining may be coupled to one or more surfaces of structure layer 40 or disposed within structure layer 40. By way of example, the scrim lining may be disposed along a top surface (e.g., the topmost, etc.) of structure layer 40, disposed along a bottom surface (e.g., the bottommost, etc.) of structure layer 40, disposed within a middle portion of structure layer 40, disposed along an edge of structure layer 40, extending diagonally within structure layer 40, etc. The scrim lining may be a similar material as permeable layer 20 to improve bonding between permeable layer 20 and structure layer 40 (e.g., when the scrim is disposed along the bonding interface, etc.). The scrim lining may improve the tensile strength of structure layer 40 and cementitious composite 10 both before and after in-situ hydration. By way of example, a loosely assembled structure layer 40 may have a tendency to separate, and a scrim lining may reinforce structure layer 40 to prevent such separation. The scrim lining may decrease the risk of delamination of permeable layer 20 and/or impermeable layer 50 therefrom (e.g., when the scrim lining is positioned on the top and/or the bottom of structure layer 40, etc.).

Figure 4A:
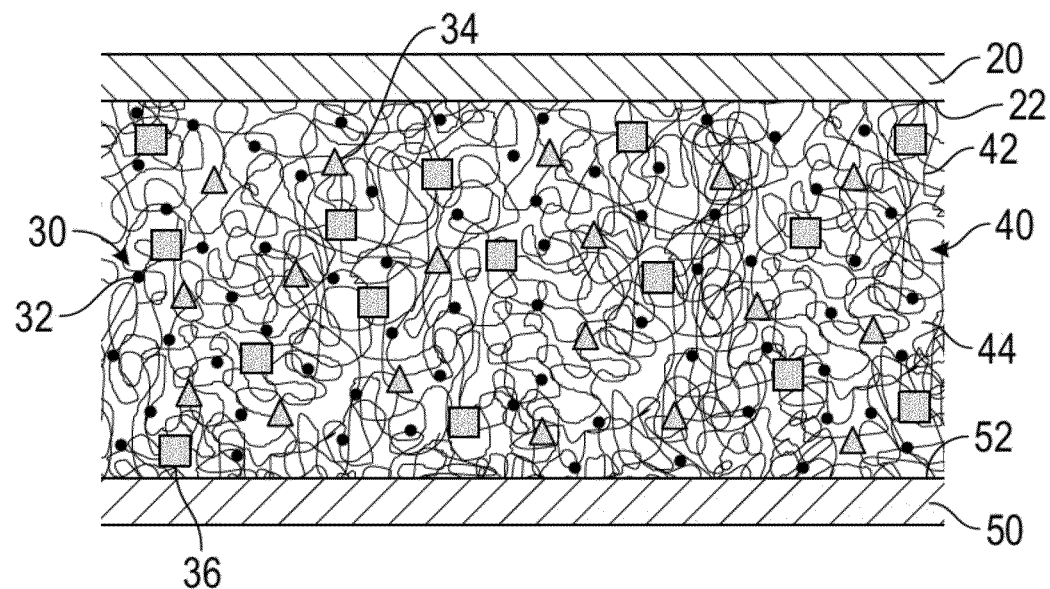
FIGS. 4A-4C are schematic cross-sectional views of the cementitious composite of FIG. 2, according to various exemplary embodiments.
Figure 4B:
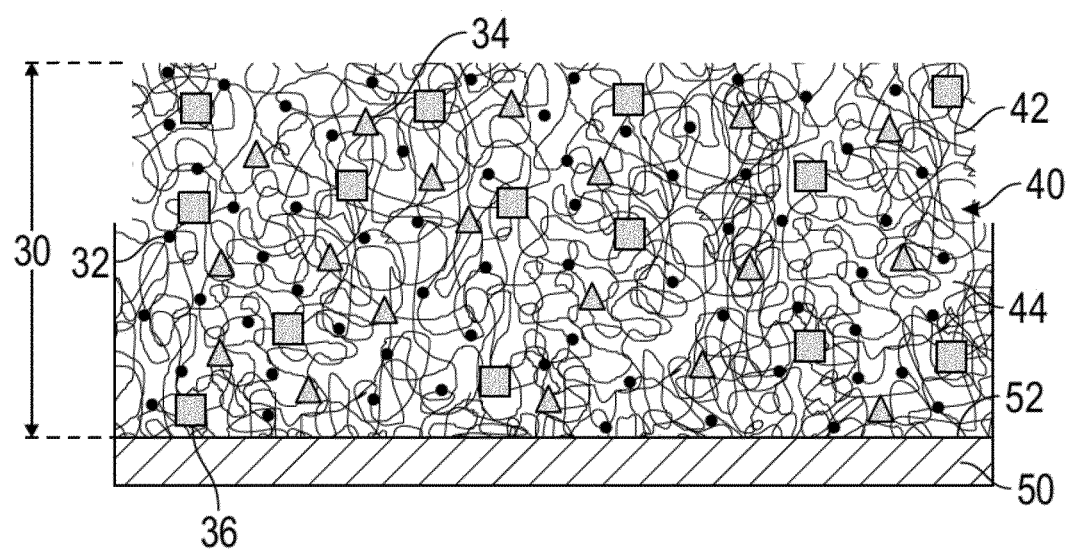
Figure 4C:
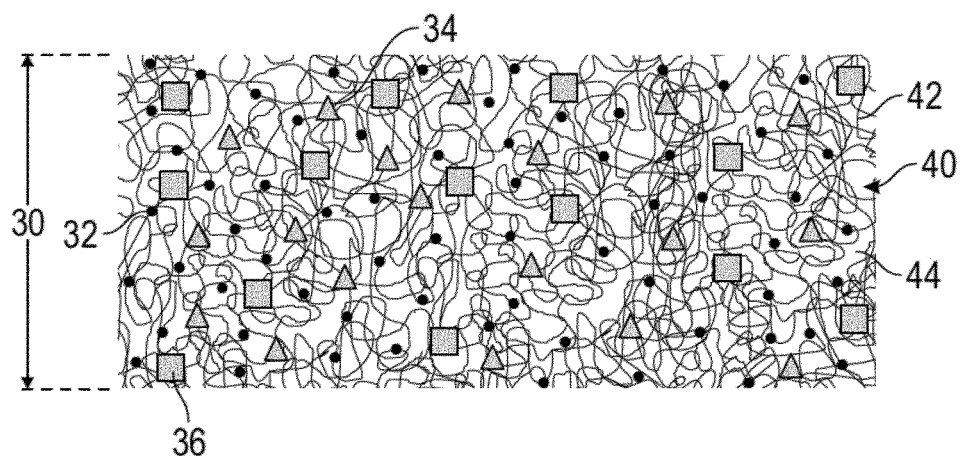
Figure 5:
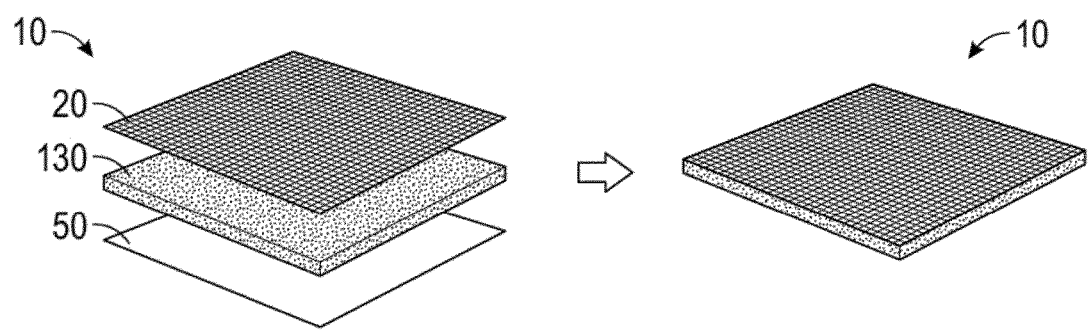
FIG. 5 is an exploded perspective view of a cementitious composite, according to another exemplary embodiment.

According to the exemplary embodiment shown in FIGS. 4A-4C, structure layer 40 includes one or more strands, shown as strands 42, arranged in a nonwoven configuration. According to an exemplary embodiment, strands 42 are not bonded together (e.g., not molecularly bonded together, not integrally joined together, etc.), but held together due to being bunched tightly together. The tight proximity facilitates an interlocking arrangement between strands 42, creating a self-supporting material. In one embodiment, strands 42 have a circular coil arrangement including a plurality of coils or loops separated by spaces or gaps. In other embodiments, strands 42 have another shape and/or configuration. By way of example, strands 42 may have a square coil arrangement, a trapezoidal coil arrangement, an asymmetrical coil arrangement, a wedge-shaped coil arrangement, or another coil arrangement. By way of another example, strands 42 may have a non-coil arrangement such as a wavy and/or curved arrangement, a flat arrangement, or other possible arrangements. According to an exemplary embodiment, the gaps or loops of strands 42 facilitate intertwining the same strand 42 and/or one strand 42 with proximate strands 42. According to an exemplary embodiment, strands 42 are flexible. In other embodiments, strands 42 are semi-rigid. In some embodiments, strands 42 are deformable (e.g., plastically deformable, etc.). According to an exemplary embodiment, strands 42 includes at least one of a natural material (e.g., coconut fiber, cellulose fiber, other natural materials, etc.), a synthetic material (e.g., aramid glass, etc.), a polymeric material, (e.g., plastic, nylon, polypropylene, polyethylene, etc.), a metallic material (e.g., metal, aluminum oxide, steel, etc.), and a composite material (e.g., carbon fiber, silicon carbide, etc.). Strands 42 may include various constituent strand structures such as a monofilament (e.g., a single material strand, etc.), a multifilament (e.g., a multi-material strand, etc.), a woven yarn, a braided yarn, and/or a thread.

According to an exemplary embodiment, strands 42 and/or different portions of the same strand 42 disposed along one another are independent (e.g., not physically bonded, not melted or integrally formed, etc.) such that strands 42 and/or different portions of the same strand 42 are held together by friction and entanglement (e.g., nonwoven, etc.). In one embodiment, structure layer 40 includes a single, continuous strand 42 intertwined with itself. In other embodiments, structure layer 40 includes a plurality of discontinuous strands 42 that are intertwined with each other (e.g., intersect, overlap, or otherwise interface with one another, etc.). According to an exemplary embodiment, strands 42 are arranged in a random manner (e.g., randomly distributed, distributed non-uniformly, etc.). Strands 42 may be curled, randomly configured, or otherwise oriented such that strands 42 frequently change directions and have various relative orientations. Structure layer 40 may include a different density of strands 42 in various areas throughout. In other embodiments, strands 42 are arranged into structure layer 40 in a uniform manner (e.g., systematically arranged, arranged in a specified pattern, etc.). Structure layer 40 may have one or more columns or other structures formed by strands 42 that are thereafter intertwined with one another. In some embodiments, strands 42 include a plurality of extensions (e.g., barbs, fibers, etc.) protruding from one or more bodies thereof that facilitate in holding strands 42 in an intertwined configuration to form structure layer 40. The extensions may prevent strands 42 from separating. Such extensions may protrude from a main body of strands 42. In some embodiments, a scrim lining is disposed within, disposed along, interwoven through, and/or otherwise proximate with the strands 42. In some embodiments, strands 42 are coated or sprayed with a coarse material (e.g., by including an abrasive within the coating, a coating is applied thereto, etc.) that aids in the intertwining of strands 42 to form the bunching. In some embodiments, an adhesive is applied to strands 42 to prevent detanglement (e.g., prevent the separation of strands 42, etc.).

According to an exemplary embodiment, strands 42 are packed together in a tightly-spaced configuration. The tightly-spaced configuration may form interstitial voids, shown as voids 44. The volume of structure layer 40 that includes voids 44 may be designed to provide a target density, weight, and/or other characteristic of structure layer 40 and/or cementitious composite 10. The amount of voids 44 may be designed by specifying a characteristic of strands 42 (e.g., size, length, thickness, etc.), and/or the dimensions of structure layer 40 (e.g., strands 42 compressed into a small volume versus a larger volume, etc.). The distance between intertwined portions of strands 42 may be between 0.1 micron and over 500 microns at any given location. According to an exemplary embodiment, structure layer 40 has a density of strands 42 that reduces the loss of cementitious mixture 30 during the transportation and handling of cementitious composite 10.

According to an exemplary embodiment, structure layer 40 supports (e.g., holds, contains, reinforces, etc.) cementitious mixture 30. By way of example, strands 42 of structure layer 40 may physically support cementitious mixture 30 within voids 44. The size, shape, or orientation of strands 42 that support cementitious mixture 30 may be designed to improve the structural properties and/or hydration characteristics of cementitious composite 10. By way of example, cementitious composite 10 may have less open space with more densely arranged strands 42, improving the strength of structure layer 40 but make it harder to fill.

As shown in FIGS. 4A-4C, cementitious mixture 30 is disposed within at least a portion of voids 44 of structure layer 40. According to an exemplary embodiment, cementitious mixture 30 is positioned within voids 44 using gravity, vibration, compaction, or any combination of gravity, vibration, and compaction. The extent that cementitious mixture 30 is compacted may impact the ability of water to flow through cementitious mixture 30, the time required for hydration, setting and hardening of cementitious mixture 30, the strength of cementitious composite 10, the uniformity of the cementitious mixture 30, and/or the risk of cementitious mixture 30 migrating through permeable layer 20.

A top surface and a bottom surface of structure layer 40 may be separated by the thickness of structure layer 40. In one embodiment, structure layer 40 has a thickness of between five millimeters and one hundred millimeters, for example, fifteen millimeters. As shown in FIGS. 4A and 4B, the bottom surface of structure layer 40 is positioned along a surface, shown as inner side 52, of impermeable layer 50. According to an exemplary embodiment, the bottom surface of structure layer 40 is coupled (e.g., attached, joined, bonded etc.) to inner side 52 of impermeable layer 50 using heat (e.g., heat welded, melted, bonded in a furnace, etc.), an adhesive, a chemical reaction, an intermediate coupling material (e.g., double-sided tape, etc.), or still another process. In one embodiment, the bottom surface of structure layer 40 is coupled to inner side 52 of impermeable layer 50 prior to cementitious mixture 30 being deposited along impermeable layer 50 and within structure layer 40.

As shown in FIG. 4A, a surface, shown as inner side 22, of permeable layer 20 is positioned along the top surface of structure layer 40. According to an exemplary embodiment, at least a portion of structure layer 40 is exposed from cementitious mixture 30 (e.g., at least a portion of one or more strands 42 is exposed, etc.), thereby forming an exposed portion of structure layer 40. In one embodiment, the exposed portion protrudes from cementitious mixture 30. For example, various strands 42 may protrude (e.g., 0.5 millimeters, 1 millimeter, 2 millimeters, etc.) from cementitious mixture 30. A portion of each strand 42 may protrude from cementitious mixture 30, or portions of a subset of strands 42 may protrude from (e.g., vertically, from the sides of, etc.) cementitious mixture 30. The lengths of strands 42 protruding from cementitious mixture 30 may define the exposed portion of structure layer 40. According to one embodiment, the exposed portion of structure layer 40 includes strands 42 extending vertically (e.g., from the top of, etc.) and/or horizontally (e.g., from the side of, etc.) from cementitious mixture 30. Such strands 42 may be disposed in a random arrangement and extend in various directions from cementitious mixture 30. In other embodiments, structure layer 40 has a defined pattern (e.g., diagonally intersecting, honeycomb, etc.), permeable layer 20 being coupled to the top surface of structure layer 40 according to a corresponding bonding pattern. The exposed portion may facilitate the bonding of various other layers of cementitious composite 10 to structure layer 40.

In one embodiment, inner side 22 of permeable layer 20 is coupled to the exposed portion of the top surface of structure layer 40 (e.g., permeable layer 20 bonded to the lengths of strands 42 protruding from cementitious mixture 30, etc.). By way of example, inner side 22 of permeable layer 20 may be coupled to the top surface of structure layer 40 with heat (e.g., heat welded, melted, bonded in a furnace, etc.), an adhesive (e.g., hot melt adhesive, ethylene-vinyl acetate ("EVA") adhesive, an adhesive with high durability and/or ultraviolet resistance for, by way of example only, increased service life when using a water soluble permeable layer, an adhesive with color stability for, by way of example only, improved surface appearance when using a water soluble permeable layer, etc.), a chemical reaction, an intermediate coupling material (e.g., double-sided tape, etc.), or still another process. In one embodiment, the exposed portion of structure layer 40 is cleaned (e.g., with pressurized air, with a brush, etc.) to remove cementitious mixture 30 or other debris from the exposed portion of structure layer 40 prior to coupling. In another embodiment, cementitious mixture 30 is compacted within structure layer 40 (e.g., uniformly, evenly, etc.), thereby reducing the prevalence of cementitious mixture 30 on the exposed portion of structure layer 40.

Connector Structure Layer

According to the exemplary embodiment shown in FIGS. 8-14S, cementitious composite 10 additionally or alternatively includes a second structure layer (e.g., a nonwoven, not woven, fiberless, nonfibrous, etc. layer), shown as connection layer 240. According to an exemplary embodiment, connection layer 240 includes a plurality of connectors with specific characteristics designed to facilitate the operation of cementitious composite 10. As shown in FIGS. 8-14S, connection layer 240 includes a plurality of connectors, shown as connectors 260, configured to join permeable layer 20 and impermeable layer 50 to form cementitious composite 10. According to an exemplary embodiment, connectors 260 extend vertically between permeable layer 20 and impermeable layer 50. In other embodiments, connectors 260 extend horizontally across cementitious composite 10 (e.g., parallel to permeable layer 20 and impermeable layer 50, etc.). In still other embodiments, connectors 260 extend at an angle between permeable layer 20 and impermeable layer 50 (e.g., creating a truss arrangement, etc.). In one embodiment, connectors 260 are positioned between and coupled to permeable layer 20 and impermeable layer 50. In another embodiment, connectors 260 are inserted into cementitious mixture 30 prior to the addition of permeable layer 20. In other embodiments, connectors 260 are inserted through at least one of permeable layer 20 and impermeable layer 50 after cementitious mixture 30 is disposed therebetween. In an alternative embodiment, connectors 260 are injected into cementitious mixture 30 through permeable layer 20 and/or impermeable layer 50. In one embodiment, connectors 260 are spaced evenly (e.g., in a predefined pattern, every square inch, every three square inches, etc.) within cementitious composite 10. In an alternative embodiment, connectors 260 are spaced randomly. In some embodiments, connectors 260 are particularly spaced for a specific application. By way of example, connectors 260 may be spaced in a higher density arrangement (e.g., more connectors 260 per unit area, etc.) in applications where the load rating of cementitious composite 10 may be relatively higher. By way of another example, connectors 260 may be spaced in a lower density arrangement (e.g., less connectors 260 per unit area, etc.) in applications where the load rating of cementitious composite 10 may be relatively lower. In some embodiments, the connectors 260 are attached to one or more scrim linings (e.g., to increase bonding within cementitious mixture 30, improve reinforcement, etc.).

According to an exemplary embodiment, connectors 260 are a polymeric material (e.g., a resin, a polymer, elastomeric polymer, PVC, etc.). In other embodiments, connectors 260 include metal (e.g., a low melting point metal or metal alloy, etc.). In one embodiment, connectors 260 are made of a single, uniform material. In an alternative embodiment, at least a portion of connectors 260 (e.g., the ends thereof, etc.) are different material or composition than other portions of connectors 260. By way of example, the ends of connectors 260 may be a material or structure with a lower melting point than the center portions thereof. Such dual-construction may allow the ends to melt relatively quicker during a heat treatment process to join permeable layer 20 to impermeable layer 50 with connectors 260. By way of another example, the ends of connectors 260 may include a heat activated adhesive and/or a coating (e.g., a heat-activated coating, a chemically-activated coating, etc.) configured to join connectors 260 to permeable layer 20 and/or impermeable layer 50. In some embodiments, the ends of connectors 260 are the same material as permeable layer 20 and/or impermeable layer 50, respectively. Such uniform construction may facilitate the ends joining or fusing (e.g., during heat treatment, with an adhesive, etc.) to the surface of permeable layer 20 and/or impermeable layer 50.

According to an exemplary embodiment, at least a portion of connectors 260 are made of a flexible and/or a semi-flexible material. Permeable layer 20, connection layer 240, and impermeable layer 50 may each be flexible. According to an exemplary embodiment, such a combination of flexible layers allows cementitious composite 10 to be rolled to facilitate transportation and reduce the amount of cementitious mixture 30 that migrates through permeable layer 20. According to an alternative embodiment, connectors 260 are rigid. Thus, cementitious composite 10 may be arranged in another configuration (e.g., various sheets that may be stacked, a sheet having a preformed shape, etc.).

Figure 9A:
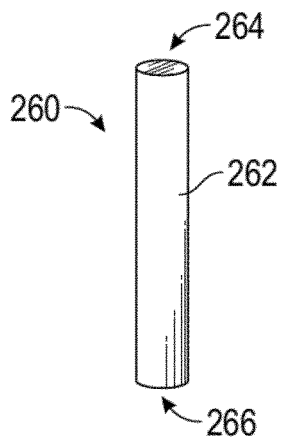
FIGS. 9A-9R are schematic illustrations of various connectors for use with the cementitious composite of FIG. 8, according to various exemplary embodiments.

As shown in FIG. 9A-14S, connectors 260 having various shapes, structures, and/or functions may be used to couple permeable layer 20 and impermeable layer 50. As shown in FIG. 9A, connector 260 is a rod, shown as rod 262, with a first end, shown as upper end 264, and an opposing second end, shown as lower end 266. In one embodiment, the upper end 264 and/or the lower end 266 are flat. In other embodiments, upper end 264 and/or lower end 266 are another shape or include a member extending therefrom (e.g., a point, a flat head, a barb, etc.). Rod 262 may have a shape selected for a particular application. In one embodiment, rod 262 has a cylindrical shape. In other embodiments, rod 262 has a different shape (e.g., an hour glass shape, a rectangular shape, a diamond shape, etc.). The dimensions of rod 262 may also vary based on the application. In one embodiment, the length of rod 262 is based on the thickness of cementitious mixture 30 (e.g., when rod 262 is disposed internally within cementitious composite 10, etc.). In another embodiment, the length of rod 262 is based on the thickness of at least one of cementitious mixture 30, permeable layer 20, impermeable layer 50, and cementitious composite 10 (e.g., when rod 262 extends through at least one of permeable layer 20 and impermeable layer 50, etc.). The width, thickness, and/or diameter of rod 262 may also be selected for a particular application. By way of example, a thicker rod 262 (e.g., greater diameter, etc.) may be used in applications where the load rating of cementitious composite 10 is greater, while a thinner (e.g., smaller diameter, etc.) rod 262 may be used in applications where the load rating of cementitious composite 10 is relatively lower. In some embodiments, connectors 260 are hollowed to allow air and/or water to pass through (e.g., the length of, the width of, etc.) connectors 260. Such hollow connectors may allow the cementitious composite 10 to be water permeable allowing water to pass through connectors 260.

Figure 10A:
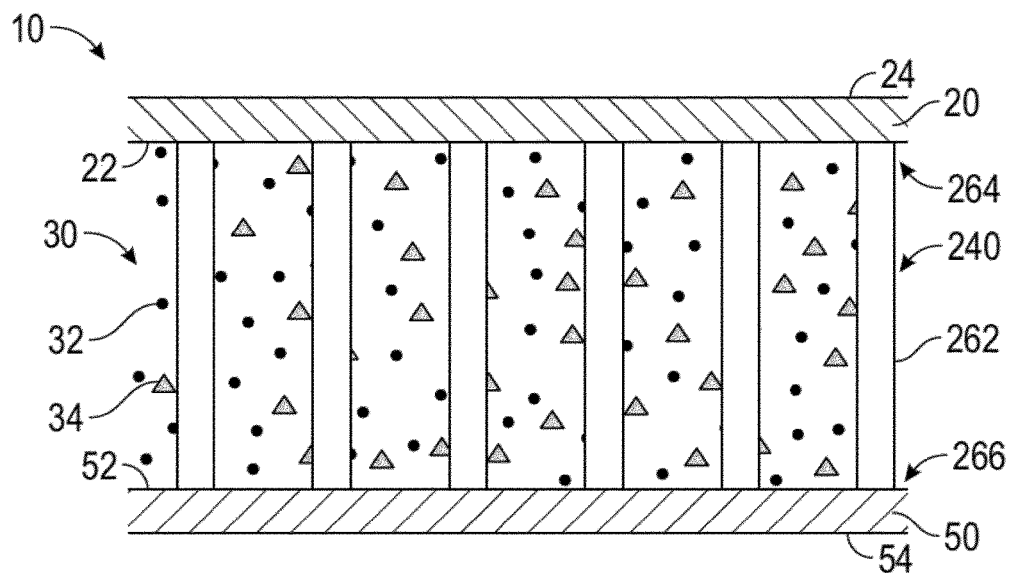
FIGS. 10A-10D are cross-sectional illustrations of internally-disposed connectors within the cementitious composite of FIG. 8, according to an exemplary embodiment.
Figure 10B:
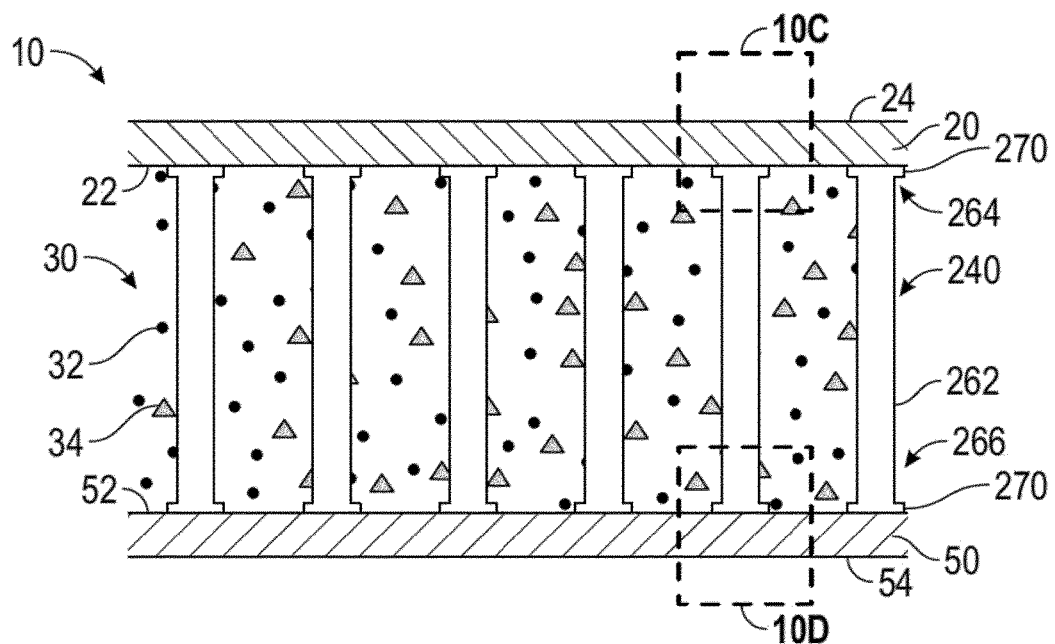
Figure 10C:
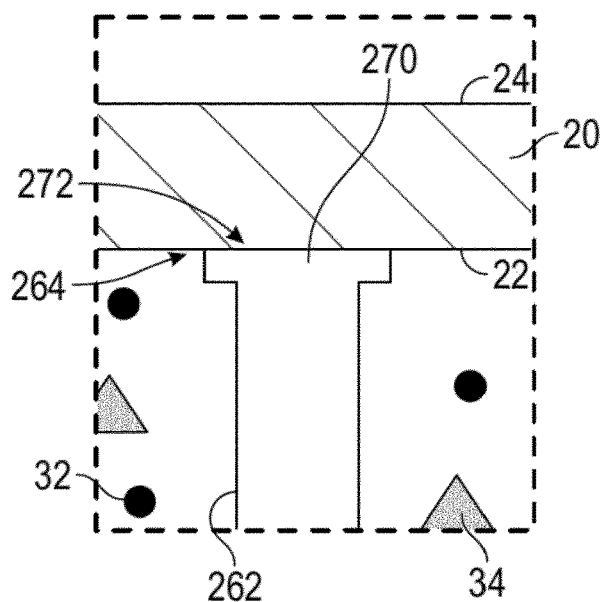
Figure 10D:
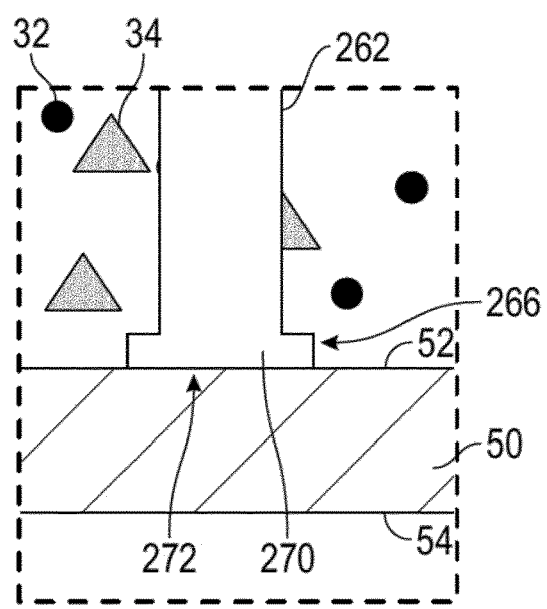

As shown in FIGS. 10A-10D, rod 262 (e.g., without any additional members extending therefrom, etc.) is positioned within cementitious composite 10 between permeable layer 20 and impermeable layer 50 (e.g., disposed between, does not extend through, etc.). As shown in FIG. 10A, upper end 264 and lower end 266 may be disposed along and adhesively coupled to inner side 22 of permeable layer 20 and inner side 52 impermeable layer 50, respectively, with an adhesive. As shown in FIGS. 10B-10D, upper end 264 and lower end 266 may be disposed along and thermally coupled to inner side 22 and inner side 52 of permeable layer 20 and impermeable layer 50, respectively, during a heat treatment process. According to an exemplary embodiment, the heat treatment process melts or otherwise deforms upper end 264 and/or lower end 266 of rod 262 such that they attach to permeable layer 20 and/or impermeable layer 50. As shown in FIGS. 10B-10D, the heat treatment may cause at least one of upper end 264 and lower end 266 to melt and cool into a coupling element, shown as element 270. As shown in FIG. 10C, element 270 at upper end 264 is flat and includes a surface, shown as melted surface 272, that attaches to inner side 22 of permeable layer 20 during the heat treatment process, thereby coupling rod 262 to permeable layer 20. In some embodiments, melted surface 272 may seep into or otherwise penetrate permeable layer 20 and/or impermeable layer 50. As shown in FIG. 10D, melted surface 272 of element 270 at lower end 266 attaches to inner side 52 of impermeable layer 50 during the heat treatment process, thereby coupling rod 262 to impermeable layer 50. In some embodiments, one end of rod 262 is coupled to one of permeable layer 20 and impermeable layer 50 with adhesive, and the opposing second end of rod 262 is coupled to the other one of permeable layer 20 and impermeable layer 50 during a heat treatment process. In one embodiment, rods 262 are coupled to permeable layer 20 and impermeable layer 50 prior to the introduction of cementitious mixture 30. In other embodiments, rods 262 are coupled to one of permeable layer 20 and impermeable layer 50 prior to the introduction of cementitious mixture 30. In still other embodiments, rods 262 are inserted through cementitious mixture 30 and coupled to one of permeable layer 20 and impermeable layer 50, and then the other of permeable layer 20 and impermeable layer 50 is added and coupled to rods 262.

Figure 9B:
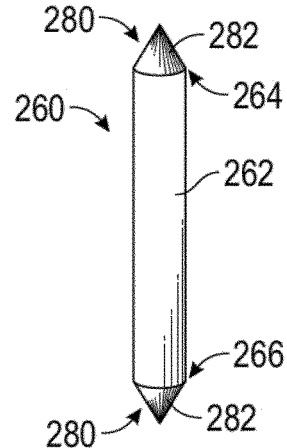

As shown in FIG. 9B, connector 260 has a shape that is similar to that of rod 262 of FIG. 9A but includes ends, shown as pointed ends 280, having pointed structures, shown as points 282. Pointed ends 280 may be shaped and sized to correspond with the shape and size of rod 262. According to an exemplary embodiment, points 282 extending from rod 262 facilitate inserting connector 260 through at least one of permeable layer 20, cementitious mixture 30, and impermeable layer 50. In other embodiments, rod 262 includes one point 282 extending from either upper end 264 or lower end 266 of connector 260.

Figure 11A:
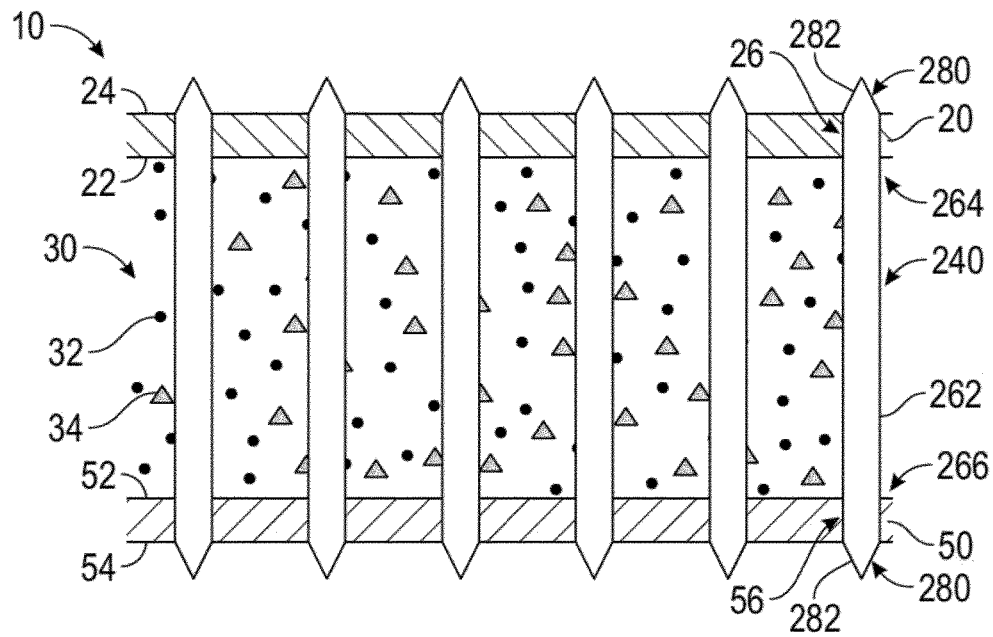
FIGS. 11A-14H are cross-sectional illustrations of connectors inserted through layers of the cementitious composite of FIG. 8, according to various exemplary embodiment.
Figure 11B:
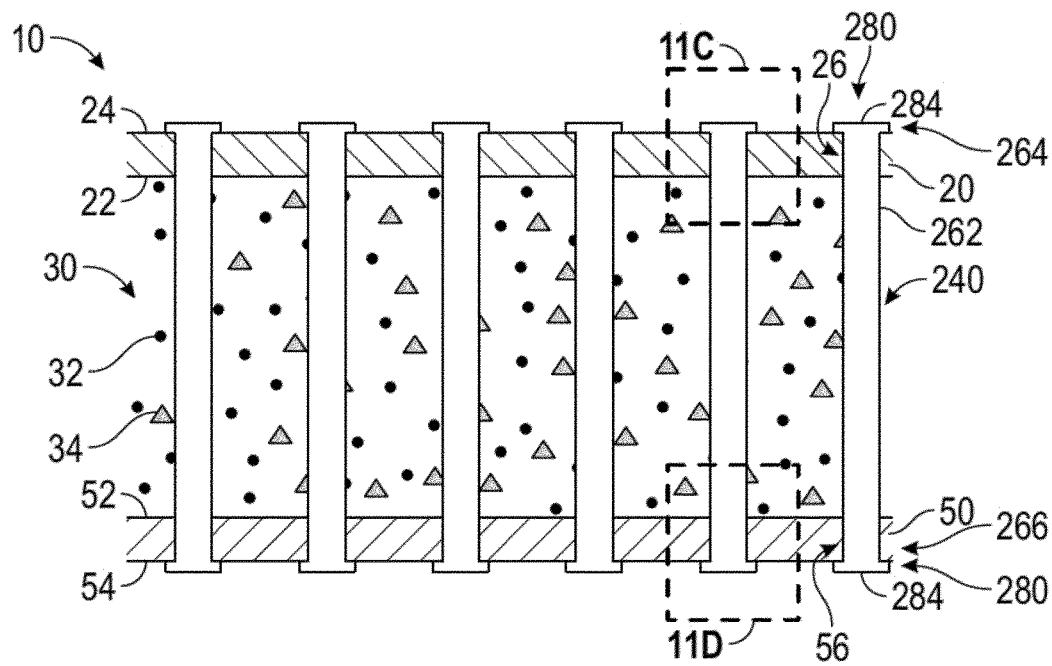
Figure 11C:
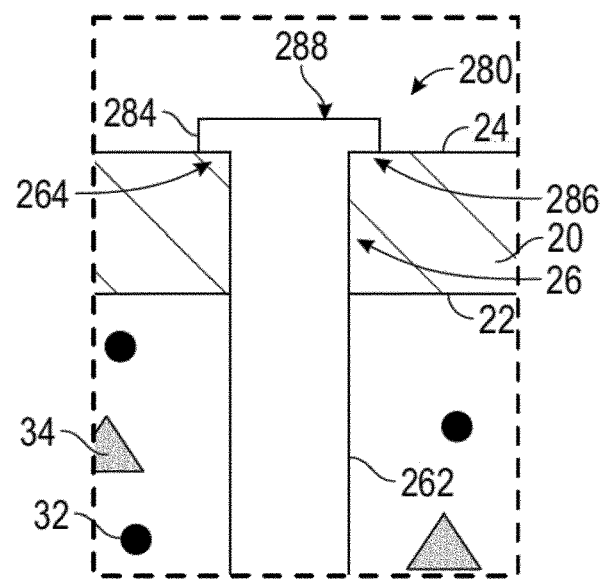
Figure 11D:
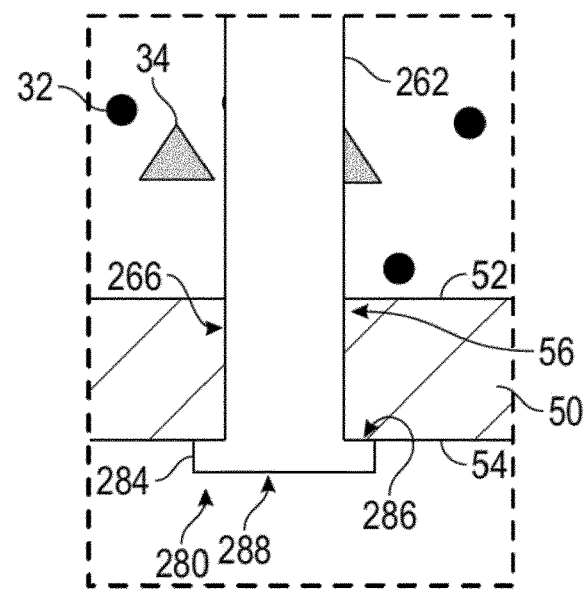

As shown in FIGS. 11A-11D, connector 260 with pointed ends 280 is configured to extend through both permeable layer 20 and impermeable layer 50. According to an exemplary embodiment, connector 260 with pointed ends 280 is inserted through cementitious composite 10 after permeable layer 20, cementitious mixture 30, and impermeable layer 50 are assembled, thereby creating apertures, shown as hole 26 and hole 56, within permeable layer 20 and impermeable layer 50, respectively. As shown in FIGS. 11B-11D, a heat treatment process may be used to melt or otherwise deform points 282 of pointed ends 280 into a melted element, shown as element 284, to substantially seal holes 26 and holes 56, and couple upper end 264 and lower end 266 to permeable layer 20 and impermeable layer 50, respectively.

As shown in FIGS. 11B-11D, the heat treatment may cause at least one of point 282 at upper end 264 and point 282 at lower end 266 to melt and cool into element 284. As shown in FIG. 11C, element 284 at upper end 264 is flat and includes a first surface, shown as inner surface 286, that is coupled to a second side, shown as outer side 24, of permeable layer 20 during the heat treatment process, thereby coupling rod 262 to permeable layer 20. Element 284 may have another shape (e.g., domed, etc.). Element 284 may substantially fill hole 26 such that cementitious mixture 30 does not migrate out of cementitious composite 10 through hole 26. As shown in FIG. 11D, inner surface 286 of element 284 at lower end 266 is coupled to a second side, shown as outer side 54, of impermeable layer 50 during the heat treatment process, thereby coupling rod 262 to impermeable layer 50. Element 284 may substantially fill hole 56 such that cementitious mixture 30 does not migrate out of cementitious composite 10 through hole 56. In an alternative embodiment, rod 262 is inserted through only one of permeable layer 20 and impermeable layer 50. For example, pointed end 280 at lower end 266 of rod 262 may extend through permeable layer 20 to inner side 52 of impermeable layer 50. Thus, following a heat treatment process, a second surface, shown as outer surface 288, of element 284 at lower end 266 of rod 262 may couple to inner side 52 of impermeable layer 50, while inner surface 286 of element 284 at upper end 264 of rod 262 is coupled to outer side 24 of permeable layer 20 during the heat treatment process, or vice versa. In yet another embodiment, rod 262 with pointed ends 280 is sized for insertion through and internal disposition within cementitious composite 10. In such embodiments, a heat treatment process may couple outer surface 288 of element 284 at both upper end 264 and lower end 266 of rod 262 to inner side 22 and inner side 52 of permeable layer 20 and impermeable layer 50, respectively (e.g., as in FIG. 10B, etc.), while closing either hole 26 or hole 56 internally (e.g., based on which layer connector 260 was pushed through, etc.).

Figure 9C:
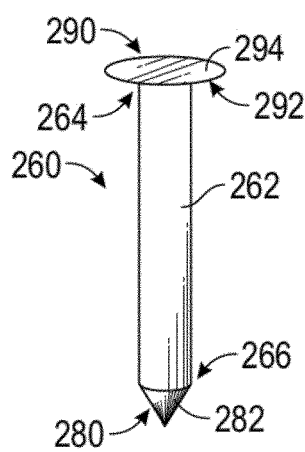

As shown in FIG. 9C, connector 260 includes a head, shown as head 290, coupled to one end (e.g., upper end 264, lower end 266, etc.) of rod 262, and a pointed end 280 coupled to the opposite end (e.g., lower end 266, upper end 264, etc.) of rod 262 (e.g., similar to a nail, etc.). Pointed end 280 may be shaped and sized to correspond with the shape and size of rod 262. Head 290 is larger (e.g., in diameter, width, etc.) than rod 262 such that head 290 extends beyond a periphery of a hole created by point 282 within permeable layer 20 or impermeable layer 50 (e.g., one and a half times the diameter of rod 262, two times the diameter of rod 262, etc.) when pointed end 280 is forced through cementitious composite 10. Head 290 includes a first face, shown as inner surface 292, and an opposing second face, shown as outer surface 294. Inner surface 292 is configured to interact with (e.g., abut, etc.) permeable layer 20 or impermeable layer 50 to stop connector 260 from extending any further into cementitious composite 10. Outer surface 294 provides a surface for a mechanical press or other mechanism to engage and thereby insert connector 260 into cementitious composite 10.

As shown in FIGS. 12A-12D, connector 260 with head 290 and pointed end 280 is configured to extend through both permeable layer 20 and impermeable layer 50. According to an exemplary embodiment, connector 260 with head 290 and pointed end 280 is inserted through cementitious composite 10 after permeable layer 20, cementitious mixture 30, and impermeable layer 50 are assembled, creating hole 26 and hole 56 within permeable layer 20 and impermeable layer 50, respectively. In one embodiment, connector 260 is pushed through cementitious composite 10 starting with permeable layer 20 first (e.g., such that head 290 abuts permeable layer 20, etc.). In other embodiments, connector 260 is inserted through cementitious composite 10 starting with impermeable layer 50 first (e.g., such that head 290 abuts impermeable layer 50, etc.).

Figure 12A:
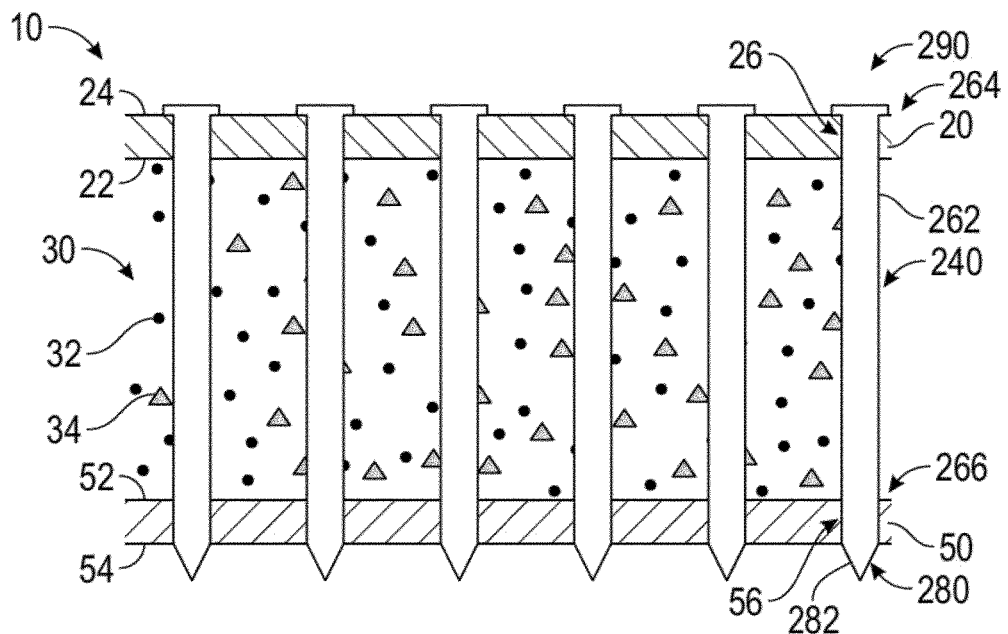
Figure 12B:
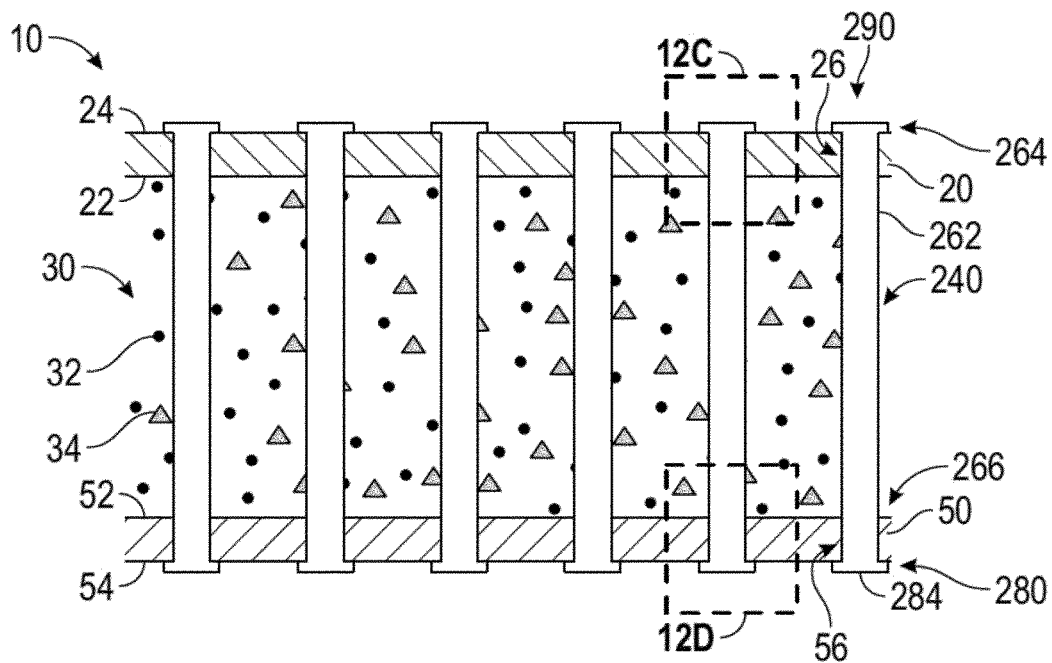
Figure 12C:
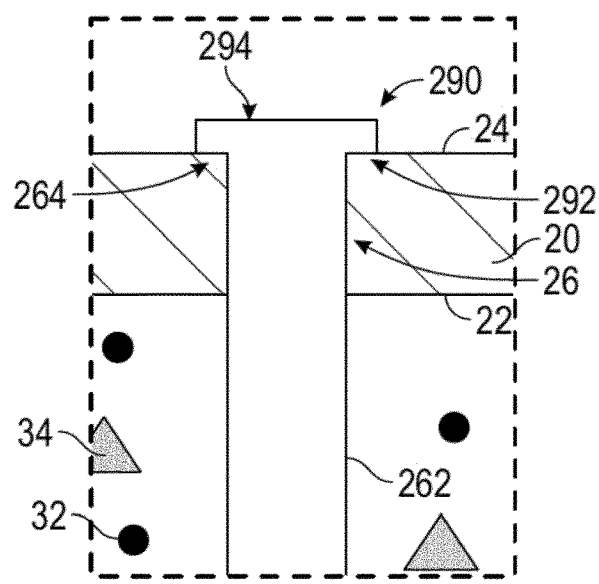

As shown in FIGS. 12B and 12C, inner surface 292 of head 290 is configured to engage with (e.g., abut, interact with, etc.) outer side 24 of permeable layer 20. In some embodiments, a heat treatment process is used to join inner surface 292 of head 290 to outer side 24 of permeable layer 20 and substantially seal hole 26 such that cementitious mixture 30 does not migrate out of cementitious composite 10. In some embodiments, adhesive is applied to inner surface 292 such that inner surface 292 of head 290 couples to outer side 24 of permeable layer 20 and substantially seals hole 26. In some embodiments, connector 260 is forced into cementitious composite 10 such that outer surface 294 of head 290 becomes flush with outer side 24 of permeable layer 20.

Figure 12D:
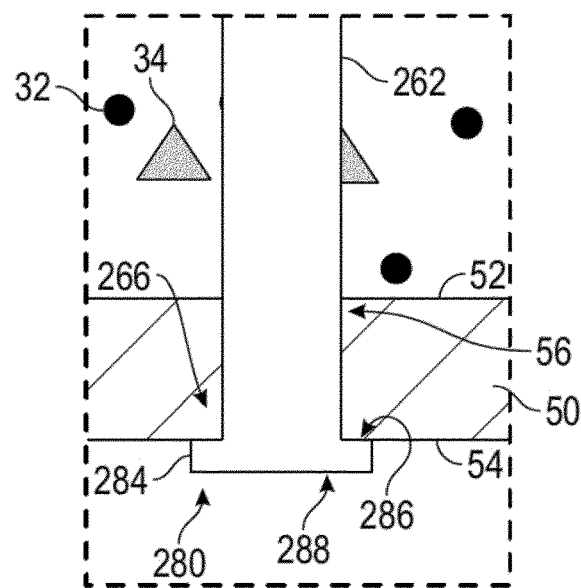

As shown in FIGS. 12B and 12D, heat may be used to melt or otherwise deform point 282 at lower end 266 of rod 262 into element 284. As shown in FIG. 12D, inner surface 286 of element 284 at lower end 266 attaches to outer side 54 of impermeable layer 50 during the heat treatment process, thereby coupling rod 262 to impermeable layer 50. Element 284 may substantially fill hole 56 such that cementitious mixture 30 does not migrate out of cementitious composite 10. In an alternative embodiment, rod 262 is inserted through only one of permeable layer 20 and impermeable layer 50. For example, pointed end 280 at lower end 266 of rod 262 may extend through permeable layer 20 to inner side 52 of impermeable layer 50. Thus, following a heat treatment process, outer surface 288 of element 284 may attach to inner side 52 of impermeable layer 50, while inner surface 292 of head 290 at upper end 264 attaches to outer side 24 of permeable layer 20 during the heat treatment process and/or with adhesive, or vice versa.

Figure 9D:
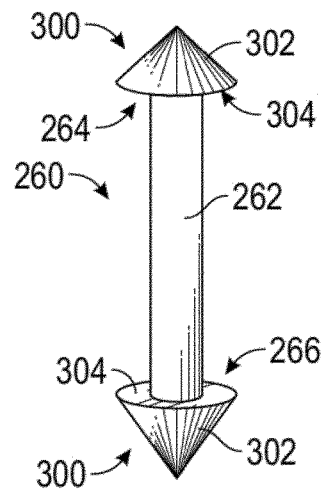

As shown in FIGS. 9D-9F, connector 260 includes a retaining member structured to prevent an end of connector 260 from pulling back through permeable layer 20 and/or impermeable layer 50 once inserted therethrough. As shown in FIG. 9D, connector 260 includes a retaining member, shown as retaining member 300, coupled to each of upper end 264 and lower end 266 of rod 262. In other embodiments, a retaining member 300 is coupled to only one of upper end 264 and lower end 266. As shown in FIG. 9D, retaining member 300 includes a pointed end, shown as point 302, and a surface, shown as engagement surface 304. According to an exemplary embodiment, point 302 of retaining member 300 facilitates inserting connector 260 through at least one of permeable layer 20, cementitious mixture 30, and impermeable layer 50. According to an exemplary embodiment, engagement surface 304 is larger (e.g., in diameter, width, etc.) than rod 262 such that engagement surface 304 extends beyond a periphery of a hole created by point 302 within permeable layer 20 or impermeable layer 50 (e.g., one and a half times the diameter of rod 262, two times the diameter of rod 262, etc.) when retaining member 300 is inserted through cementitious composite 10. Engagement surface 304 is configured to prevent the end of rod 262 at which retaining member 300 is coupled to from pulling back through the hole in which retaining member 300 or another mechanism (e.g., a press, etc.) created in permeable layer 20 and/or impermeable layer 50. In an alternative embodiment, retaining member 300 is otherwise structured (e.g., dome shaped, etc.). By way of example, a connector 260 with retaining member 300 but without point 302 may be otherwise coupled to the other elements of cementitious composite 10 in a different manner. First, rod 262 (e.g., such as rod 262 of FIG. 9B or 9C, etc.) is inserted through cementitious composite 10 such that one or more ends of rod 262 extend out from permeable layer 20 and/or impermeable layer 50. Next, retaining member(s) 300 may be coupled to the one or more ends of rod 262 extending out of cementitious composite 10 (e.g., threaded onto, adhesively secured to, welded, etc.).

As shown in FIG. 9E, connector 260 is an adaptation of connectors 260 of FIGS. 9C and 9D, with head 290 coupled to one end (e.g., upper end 264, lower end 266, etc.) and retaining member 300 coupled to the opposing second end (e.g., lower end 266, upper end 264, etc.) of rod 262. Head 290 and retaining member 300 may be structured and function as described above with respect to FIGS. 9C and 9D.

Figure 13A:
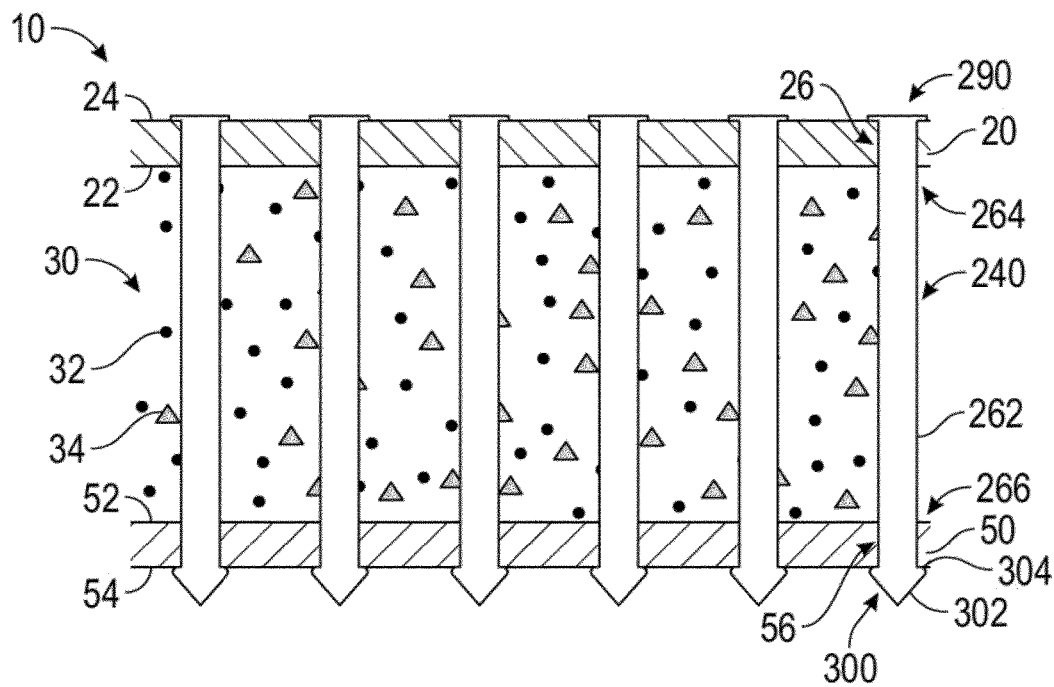

As shown in FIG. 13A, connector 260 with head 290 and retaining member 300 extends through both permeable layer 20 and impermeable layer 50. According to an exemplary embodiment, connector 260 with head 290 and retaining member 300 is inserted through cementitious composite 10 following the assembly of permeable layer 20, cementitious mixture 30, and impermeable layer 50, creating hole 26 and hole 56 within permeable layer 20 and impermeable layer 50, respectively. In one embodiment, connector 260 is inserted through cementitious composite 10 starting with permeable layer 20 first (e.g., such that head 290 abuts permeable layer 20, retaining member 300 extends through impermeable layer 50, etc.). In other embodiments, connector 260 is inserted through cementitious composite 10 starting with impermeable layer 50 first (e.g., such that head 290 abuts impermeable layer 50, retaining member 300 extends through permeable layer 20, etc.). As shown in FIG. 13A, engagement surface 304 extends beyond an outer periphery of hole 56. Such construction may prevent lower end 266 of rod 262 from pulling back through impermeable layer 50, mechanically coupling permeable layer 20 and impermeable layer 50 together. According to one embodiment, impermeable layer 50 and/or permeable layer 20 are made of a material (e.g., elastomeric, rubber, etc.) configured to close around rod 262 once point 302 pierces through. Such construction may substantially prevent cementitious mixture 30 from migrating out of cementitious composite 10 through hole 26 and/or hole 56. In some embodiments, inner surface 292 of head 290 and/or engagement surface 304 of retaining member 300 includes an adhesive configured to couple head 290 and/or retaining member 300 to permeable layer 20 and/or impermeable layer 50, respectively. In some embodiments, cementitious composite 10 is heat treated such that inner surface 292 of head 290 and/or engagement surface 304 of retaining member 300 attach to permeable layer 20 and/or impermeable layer 50, respectively.

As shown in FIG. 9F, connector 260 includes a retainer, shown as retainer 310, coupled to one end of rod 262 (e.g., upper end 264, lower end 266, etc.) and head 290 coupled to the opposing second end of rod 262. In other embodiments, a retainer 310 is coupled to both upper end 264 and lower end 266. As shown in FIG. 9F, retainer 310 includes a pointed end, shown as point 312, and retaining component, shown as barb 314. According to an exemplary embodiment, point 312 of retainer 310 facilitates inserting connector 260 through at least one of permeable layer 20, cementitious mixture 30, and impermeable layer 50. According to an exemplary embodiment, barb 314 extends from retainer 310 beyond a periphery of a hole created by point 312 within permeable layer 20 or impermeable layer 50 when retainer 310 is inserted therethrough. Barb 314 is configured to prevent the end of rod 262 at which retainer 310 is coupled to from pulling back through the hole in which retainer 310 or another mechanism created in permeable layer 20 and/or impermeable layer 50.

Figure 13B:
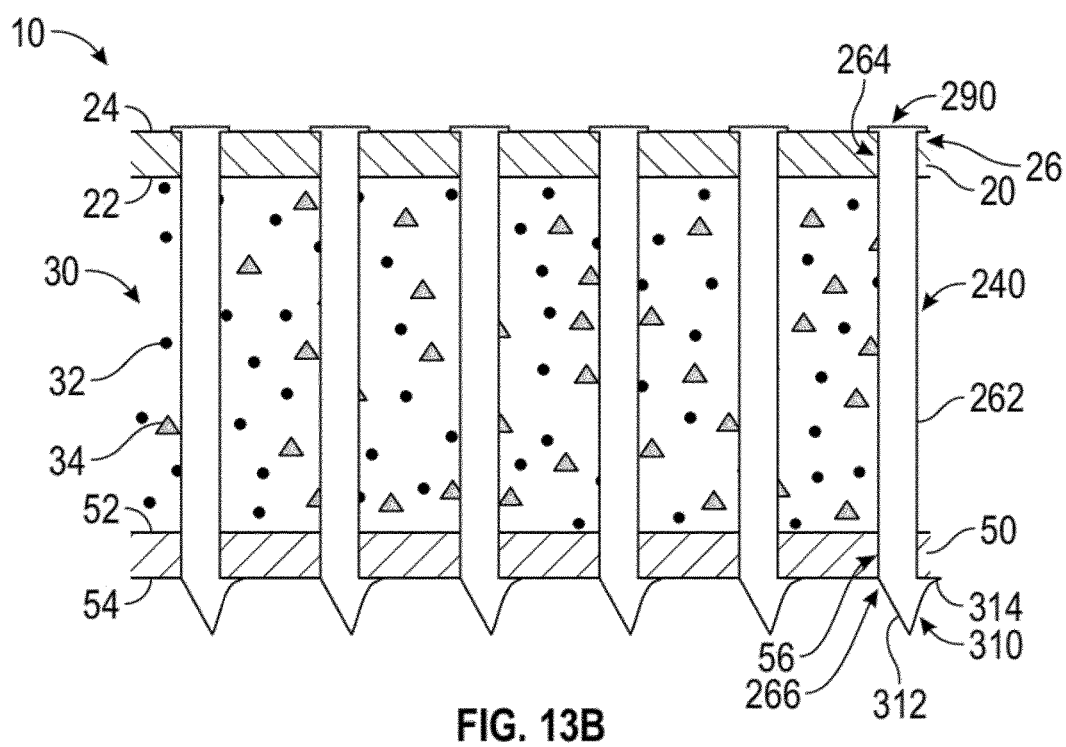

As shown in FIG. 13B, connector 260 with head 290 and retainer 310 is configured to extend through both permeable layer 20 and impermeable layer 50. According to an exemplary embodiment, connector 260 with head 290 and retainer 310 is inserted through cementitious composite 10 after assembly of permeable layer 20, cementitious mixture 30, and impermeable layer 50, creating hole 26 and hole 56 within permeable layer 20 and impermeable layer 50, respectively. In one embodiment, connector 260 is inserted through cementitious composite 10 starting with permeable layer 20 first (e.g., such that head 290 abuts permeable layer 20, retainer 310 extends through impermeable layer 50, etc.). In other embodiments, connector 260 is inserted through cementitious composite 10 starting with impermeable layer 50 first (e.g., such that head 290 abuts impermeable layer 50, retainer 310 extends through permeable layer 20, etc.). As shown in FIG. 13B, barb 314 extends beyond an outer periphery of hole 56. Such construction may prevent lower end 266 of rod 262 from pulling back through impermeable layer 50, mechanically coupling permeable layer 20 and impermeable layer 50.

As shown in FIG. 9G, connector 260 includes a head 290 coupled to each of upper end 264 and lower end 266 of rod 262. In one embodiment, connector 260 of FIG. 9G is used in a similar fashion as connector 260 of FIG. 9A. By way of example, connector 260 with two heads 290 may be positioned within cementitious composite 10 between permeable layer 20 and impermeable layer 50 (e.g., disposed between, not extending through, etc.). In this embodiment, outer surfaces 294 of heads 290 are disposed along and coupled to inner side 22 and inner side 52 of permeable layer 20 and impermeable layer 50, respectively (e.g., thermally coupled during heat treatment, adhesively coupled, etc.). In another embodiment, connector 260 of FIG. 9G is used in a similar fashion to connector 260 of FIGS. 9D-9F (e.g., one or both heads 290 are attached after rod 262 is pushed through cementitious composite 10, etc.). In this embodiment, inner surface 292 of heads 290 may be disposed along and coupled to outer side 24 and outer side 54 of permeable layer 20 and impermeable layer 50, respectively (e.g., thermally coupled during heat treatment, adhesively coupled, mechanically coupled, etc.).

Figure 9I:
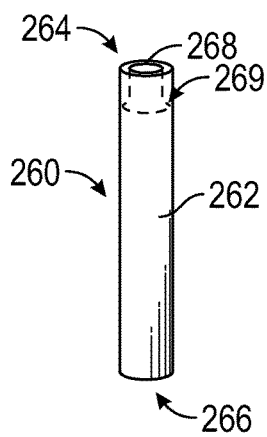

As shown in FIGS. 9H and 9I, upper end 264 of rod 262 defines an aperture, shown as aperture 268. As shown in FIG. 9H, rod 262 defines a though-hole, shown as slot 267, that aligns with aperture 268 and extends along a length of rod 262. In one embodiment, slot 267 extends from aperture 268 at upper end 264 through lower end 266 of rod 262. Slot 267 may facilitate the transmission of water and/or air through cementitious composite 10. In other embodiments, slot 267 extends at least partially from aperture 268 to lower end 266 of rod 262 (e.g., 25%, 50%, 75%, 90%, 100%, etc. of the length of rod 262). As shown in FIG. 9I, rod 262 defines a connection interface, shown as interlocking interface 269 (e.g., a snap-fit interface, etc.), that aligns with aperture 268 and extends within at least an end of rod 262. According to the exemplary embodiment shown in FIG. 9I, interlocking interface 269 is structured as a female interface configured to receive a corresponding male interface. In other embodiments, rod 262 does not define aperture 268. In such embodiments, interlocking interface 269 may be structured as a male interface configured to engage with a corresponding female interface. In some embodiments, an adhesive and/or other product facilitates interaction between the male and female interfaces (e.g., an adhesive may be disposed within the female interface, etc.). Other interfaces may replace and/or supplement the interaction of the male and female interfaces.

Figure 9J:
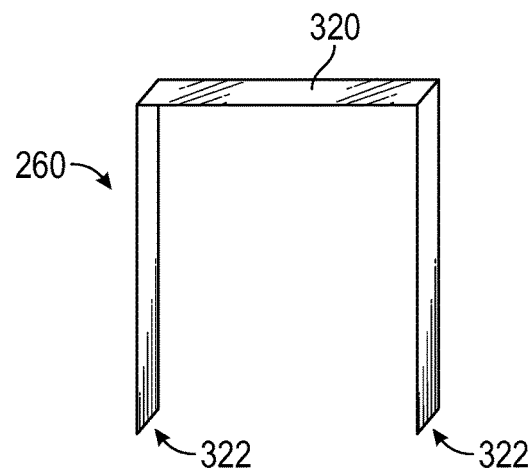
Figure 9K:
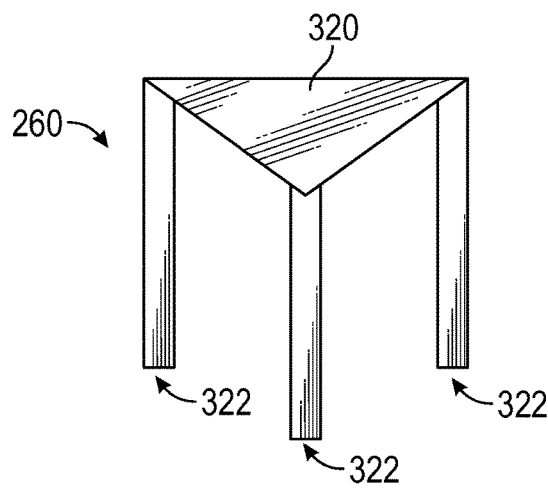

As shown in FIGS. 9J and 9K, connector 260 is a staple member, shown as staple 320. Staple 320 may be punched through cementitious composite 10. As shown in FIG. 9J, staple 320 includes a pair of legs, shown as legs 322, that may be bent to engage a surface (e.g., outer side 54, outer side 24, etc.) through which the legs 322 came through to mechanically couple permeable layer 20 and impermeable layer 50 together. As shown in FIG. 9K, staple 320 includes three legs 322. In other embodiments, staple 320 includes more than three legs 322 (e.g., four, six, etc.). As shown in FIG. 9K, staple 320 has a triangle shape. In other embodiments, staple 320 has another shape (e.g., square, rectangular, having a plurality of linearly-arranged legs 322, octagon, etc.).

Figure 9L:
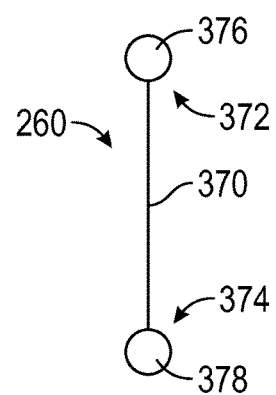

As shown in FIG. 9L, connector 260 is a wire (e.g., string, cord, strand, etc.), shown as wire 370. In various embodiments, wire 370 includes yarns (e.g., fibers, etc.), metals, plastics, and/or other suitable materials. In various embodiments, wire 370 is a monofilament, a multifilament, and/or braided. According to an exemplary embodiment, wire 370 has a discrete, non-continuous length (e.g., the length is approximately equal to and/or slightly greater than the thickness of cementitious composite 10, approximately equal to double the thickness of cementitious composite 10, etc.). As shown in FIG. 9L, wire 370 includes a first end, shown as upper end 372, and an opposing second end, shown as lower end 374. Upper end 372 includes a first retainer, shown as upper retainer 376, and lower end 374 includes a second retainer, shown as retainer 378. In other embodiments, wire 370 does not include one of upper retainer 376 and lower retainer 378. In some embodiments, connector 260 includes a plurality of wires 370 (e.g., two, three, five, ten, etc.) that extend between upper retainer 376 and lower retainer 378. Upper retainer 376 and/or lower retainer 378 may be or include a knot, a mechanical element (e.g., a clip, etc.), adhesive, and/or another retaining element.

Figure 9M:
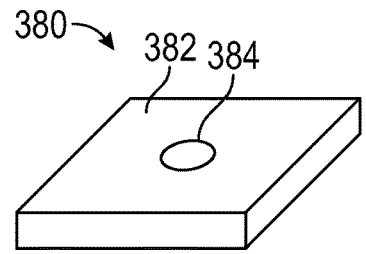
Figure 9N:
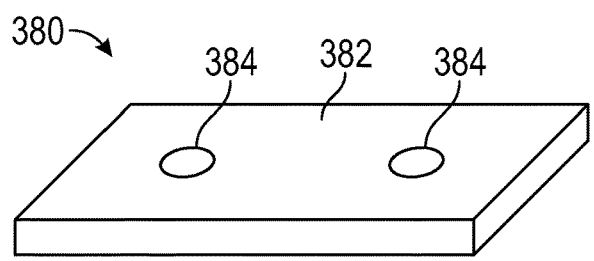

As shown in FIGS. 9M and 9N, a retaining plate, shown as plate 380, includes a body, shown as body 382, that defines at least one hole (e.g., one, two, three, four, ten, etc.), shown as holes 384. According to an exemplary embodiment, plate 380 is configured to be used in combination with at least one wire 370, pin, or other device. By way of example, holes 384 may receive at least one wire 370. Holes 384 may be configured (e.g., sized, etc.) to prevent upper retainer 376 and/or lower retainer 378 from pulling therethrough once wire 370 is inserted.

Figure 14A:
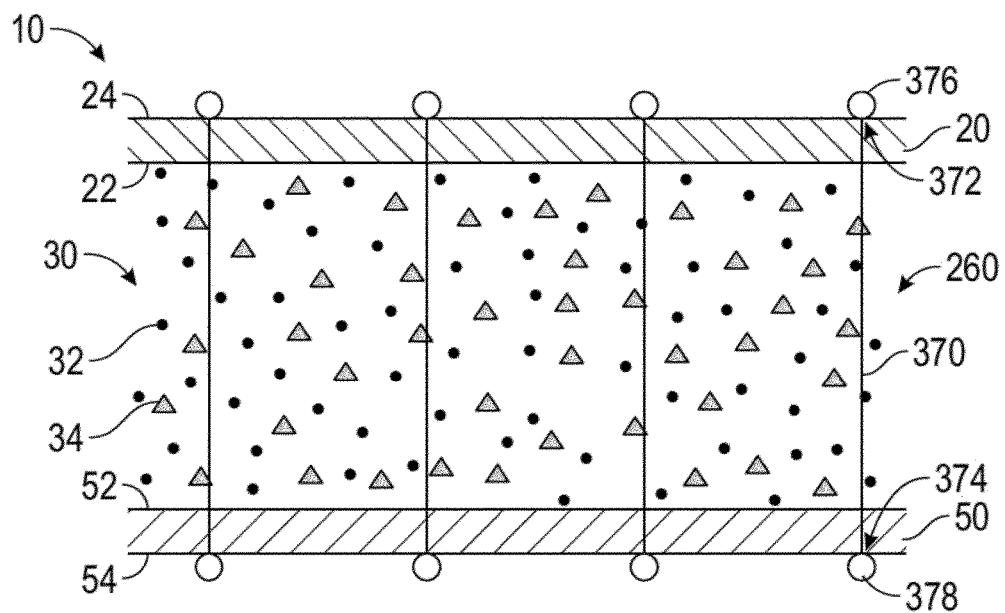
FIG. 14I is a cross-sectional illustration of internally-disposed connectors within the cementitious composite of FIG. 8 having fluid passages, according to an exemplary embodiment.
FIGS. 14J-14R are cross-sectional illustrations of a first connector layer and/or a second connector layer used with the cementitious composite of FIG. 8, according to various exemplary embodiments.
FIG. 14S is a cross-sectional illustration of internally injecting connectors within the cementitious composite of FIG. 8, according to an exemplary embodiment.
Figure 14B:
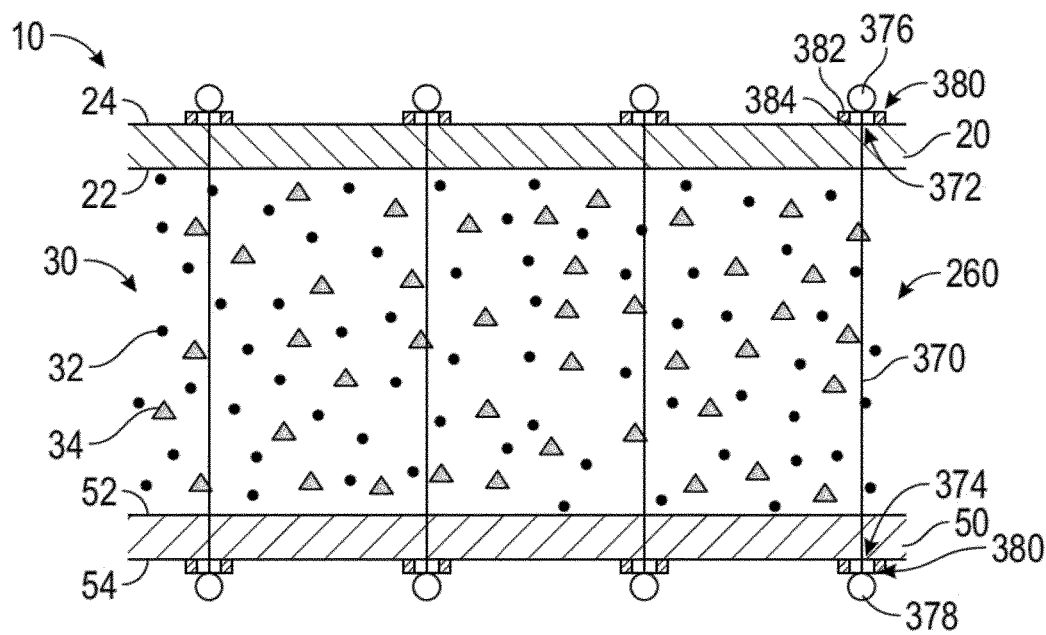

As shown in FIGS. 14A-14H, connectors 260 of connection layer 240 include wires 370 and/or plates 380. According to an exemplary embodiment, plates 380 are configured to increase holding strength and/or distribute loading such that wires 370 do not pull through and/or prevent a retainer associated therewith from pulling through permeable layer 20 and/or impermeable layer 50. As shown in FIGS. 14A and 14B, each of a plurality of discrete (e.g., a non-continuous weave, etc.) wires 370 extend through permeable layer 20 and impermeable layer 50 (e.g., a single time each, in a spaced relationship, not touching each other, etc.). In one embodiment, upper retainers 376 and/or lower retainers 378 are formed or added after wires 370 are inserted therethrough. By way example, lower end 374 of wires 370 may be inserted through permeable layer 20, cementitious mix 30, and impermeable layer 50. Lower retainers 378 may be formed (e.g., tied, knotted, etc.), melted, or added (e.g., clamped, coupled, attached, adhesively applied, etc.) thereafter to prevent lower ends 374 of wires from pulling back through impermeable layer 50. Upper retainers 376 may be formed (e.g., tied, knotted, etc.), melted, or added (e.g., clamped, coupled, attached, adhesively applied, etc.) prior to and/or after the insertion of wires 370.

As shown in FIG. 14B, connectors 260 include a plurality of discrete (e.g., a non-continuous weave, etc.) wires 370 having plates 380 (e.g., plates 380 of FIG. 9M, etc.) positioned to correspond with each upper retainer 376 and each lower retainer 378. As shown in FIG. 14B, plates 380 are positioned between each upper retainer 376 and permeable layer 20 and each lower retainer 378 and impermeable layer 50. By way of example, lower end 374 of wires 370 may be inserted through hole 384 of an upper plate 380, permeable layer 20, cementitious mix 30, impermeable layer 50, and hole 384 of a lower plate 380. In some embodiments, multiple wires 370 extend through hole 384 of a single plate 380. In some embodiments, connectors 260 do not include plates 380 positioned between impermeable layer 50 and lower retainers 378 (e.g., include only the plates 380 position between permeable layer 20 and upper retainers 376, etc.). In some embodiments, permeable layer 20 and/or impermeable layer 50 are and/or include a grid (e.g., strand layer 482 of FIGS. 20A-20I, coupled thereto, disposed along, etc.). Upper ends 372 and/or lower ends 374 of wires 370 may be tied or otherwise attached to the grid layer (e.g., adhesively secured, etc.).

As shown in FIGS. 14C-14H, each of a plurality of discrete (e.g., a non-continuous weave, etc.) wires 370 extend through permeable layer 20 and impermeable layer 50 twice. In other embodiments, each of the plurality of discrete wires 370 extends through permeable layer 20 and impermeable layer more than two times (e.g., three times, four times, etc.). It should be noted however, that irrespective of the number of times wires 370 extend through cementitious composite 10, wires 370 are discrete (e.g., have a truncated length relative to that of permeable layer 20 and/or impermeable layer 50, are not woven continuously through permeable layer 20 and/or impermeable layer 50, adjacent wires 370 are not combined, etc.).

Figure 14C:
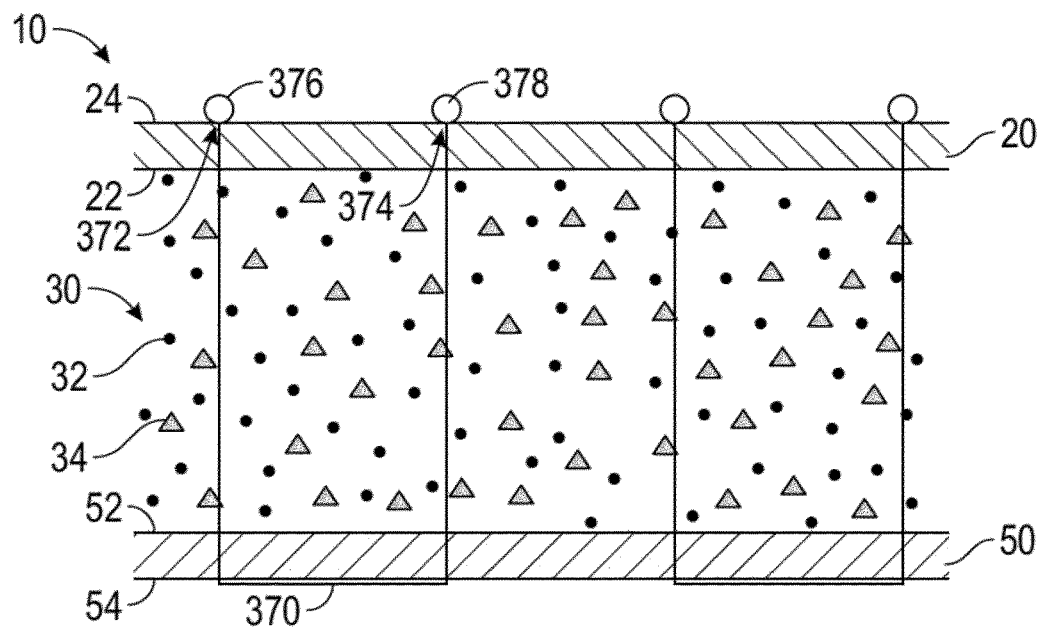
Figure 14D:
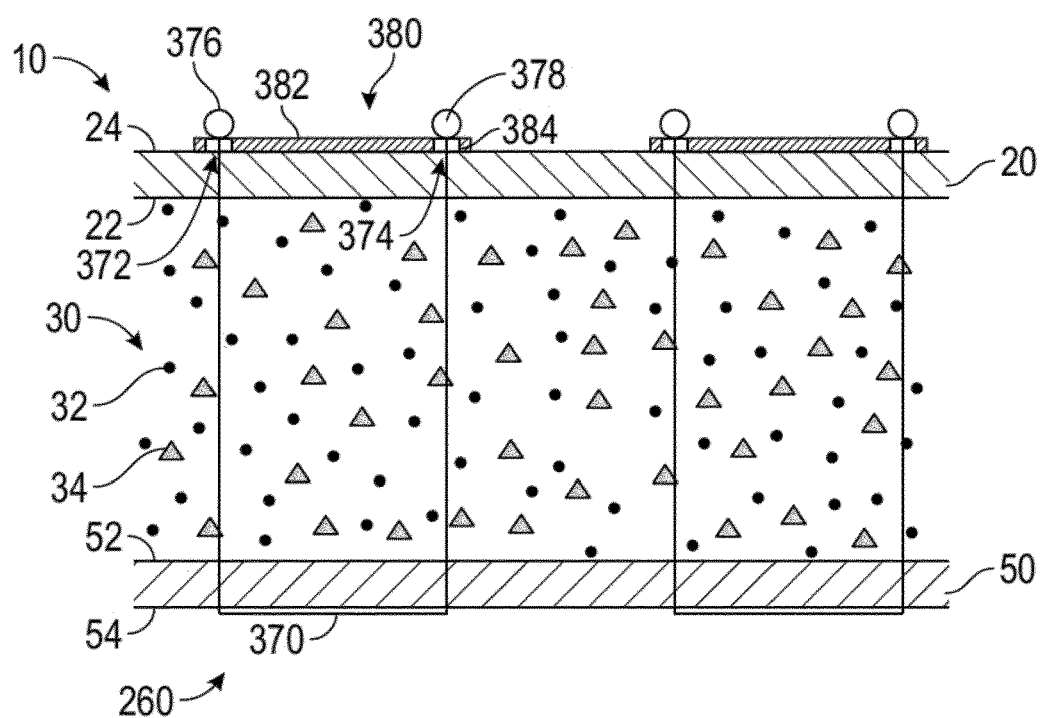
Figure 14E:
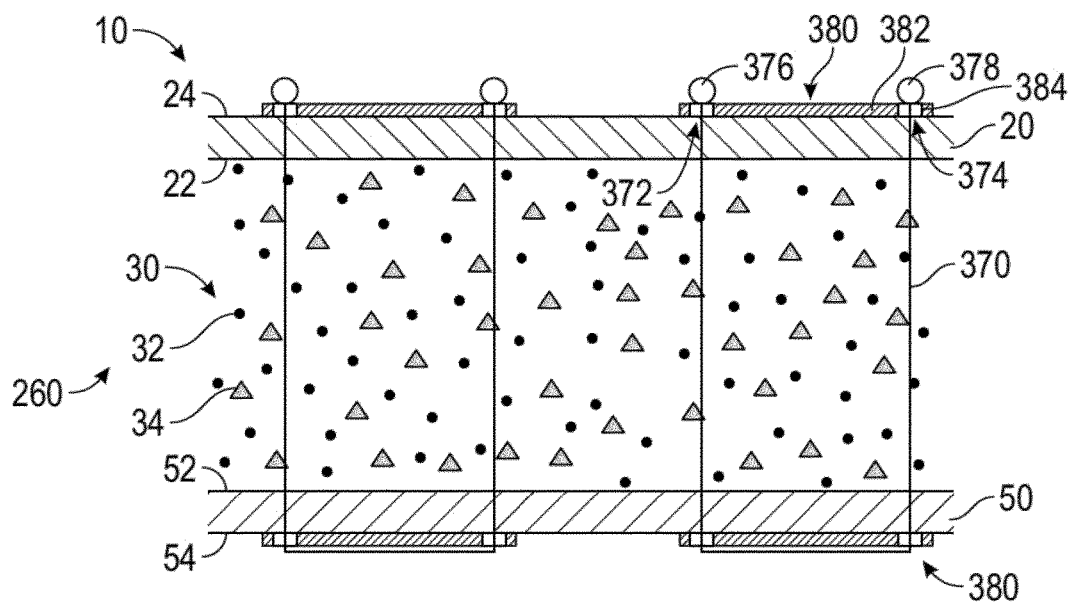

As shown in FIGS. 14C-14E, wires 370 are arranged to form a U-shape such that upper end 372 having upper retainer 376 and lower end 374 having lower retainer 378 are positioned along outer side 24 of permeable layer 20. By way of example, lower end 374 of wires 370 may be (i) inserted through permeable layer 20, cementitious mix 30, and impermeable layer 50 and (ii) inserted back through impermeable layer 50, cementitious mix 30, and permeable layer 20 thereby forming the U-shape. In other embodiments, wires 370 are arranged in a U-shape such that upper end 372 having upper retainer 376 and lower end 374 having lower retainer 378 are positioned along outer side 54 of impermeable layer 50.

As shown in FIG. 14D, connectors 260 include a plurality of discrete (e.g., a non-continuous weave, etc.) wires 370, each wire 370 having a plate 380 (e.g., plate 380 of FIG. 9N, etc.) positioned to correspond with upper retainer 376 and lower retainer 378 of each respective wire 370. As shown in FIG. 14D, plates 380 are positioned between (i) each upper retainer 376 and lower retainer 378 and (ii) permeable layer 20. By way of example, lower end 374 of wires 370 may be (i) inserted through a first hole 384 in an upper plate 380, permeable layer 20, cementitious mix 30, and impermeable layer 50, and may be (ii) inserted back through (e.g., a second time, etc.) impermeable layer 50, cementitious mix 30, permeable layer 20, and a second hole 384 of upper plate 380 thereby forming the U-shape. In another embodiment, plates 380 having multiple holes 384 are replaced with and/or supplemented by two plates 380 that have a single hole 384 (i.e., upper end 372 and lower end 374 engage with independent plates 380).

As shown in FIG. 14E, connectors 260 additionally include a lower plate 380 positioned along outer side 54 of impermeable layer 50. By way of example, lower end 374 of wires 370 may be (i) inserted through a first hole 384 in an upper plate 380, permeable layer 20, cementitious mix 30, impermeable layer 50, and a first hole 384 in a lower plate 380, and (ii) inserted through a second hole of lower plate 380, impermeable layer 50, cementitious mix 30, permeable layer 20, and a second hole 384 of upper plate 380 thereby forming the U-shape. In another embodiment, connector 260 does not include upper plate 380 (e.g., only includes the lower plate 380, etc.).

Figure 14F:
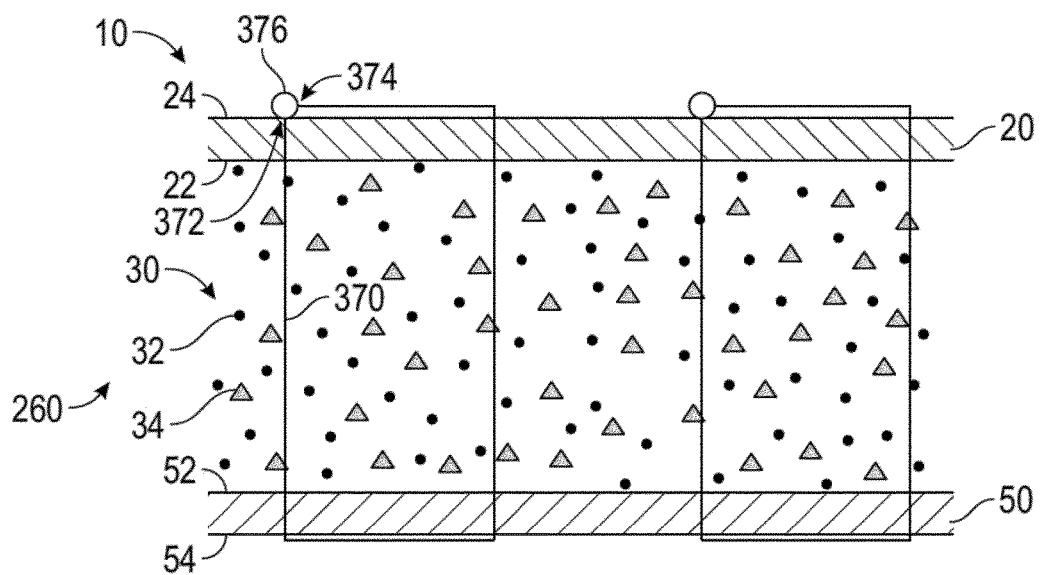
Figure 14G:
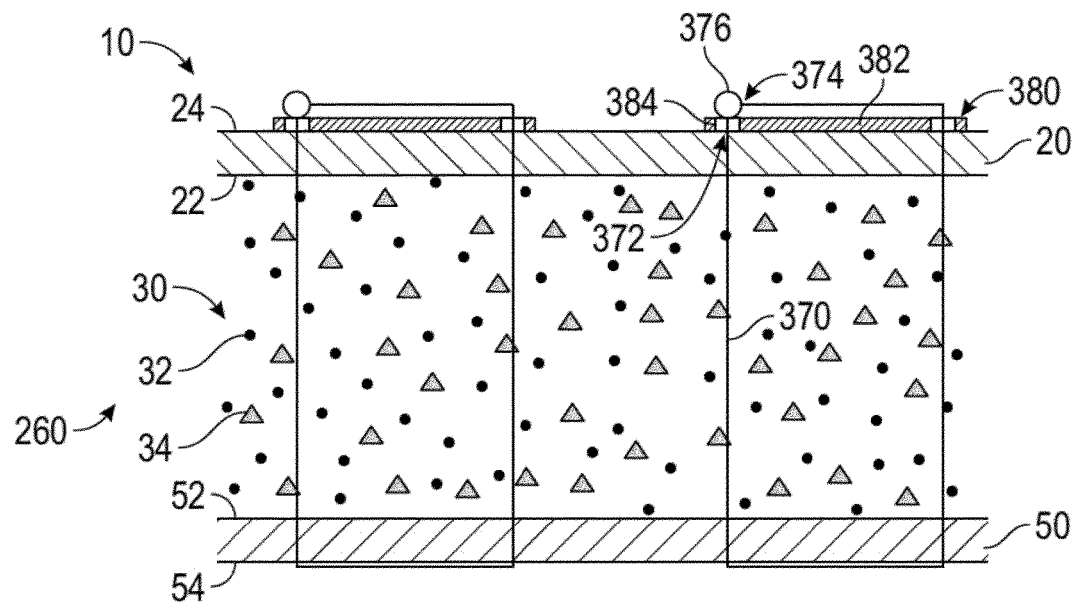
Figure 14H:
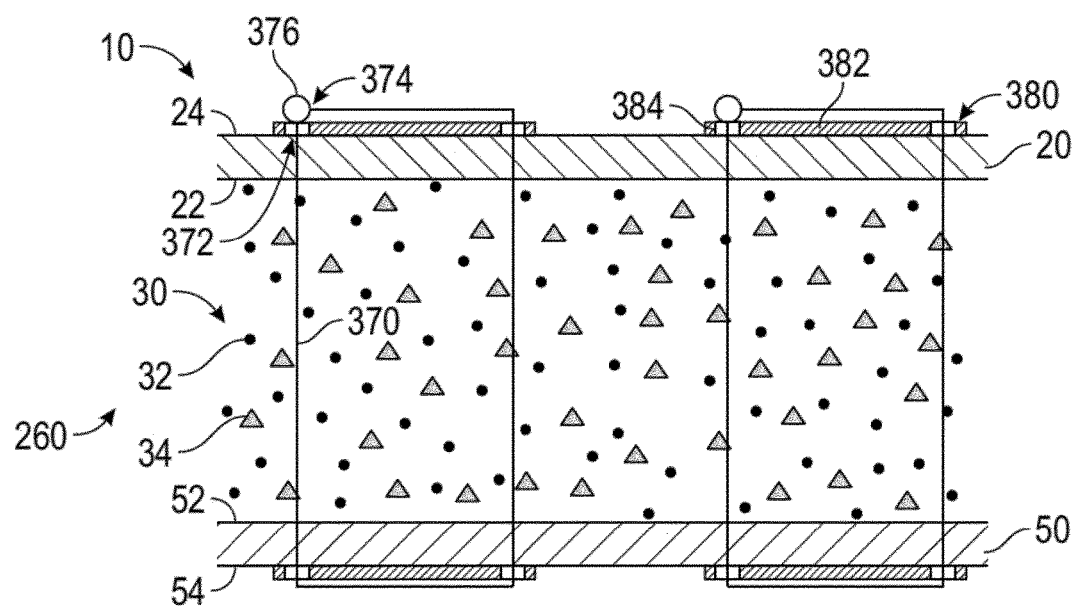

As shown in FIGS. 14F-14H, wires 370 are arranged to form a closed loop such that upper end 372 and lower end 374 are joined together along outer side 24 of permeable layer 20. By way of example, lower end 374 of wires 370 may be (i) inserted through permeable layer 20, cementitious mix 30, and impermeable layer 50, (ii) inserted back through impermeable layer 50, cementitious mix 30, and permeable layer 20, and (iii) connected to upper end 372 (e.g., tied to form a knot, adhesively coupled, mechanically coupled, etc.) with upper retainer 376, thereby forming the closed loop. In other embodiments, wires 370 are arranged in a closed loop such that upper end 372 and lower end 374 are joined together along outer side 54 of impermeable layer 50.

As shown in FIG. 14G, connectors 260 include a plurality of discrete (e.g., a non-continuous weave, etc.) wires 370, each wire 370 having a plate 380 (e.g., plate 380 of FIG. 9N, etc.) positioned to correspond with upper end 372 and lower end 374 of each respective wire 370. As shown in FIG. 14D, plates 380 are positioned between (i) the connection between upper end 372 and lower end 374 and (ii) permeable layer 20. By way of example, lower end 374 of wires 370 may be (i) inserted through a first hole 384 in an upper plate 380, permeable layer 20, cementitious mix 30, and impermeable layer 50, (ii) inserted back through impermeable layer 50, cementitious mix 30, permeable layer 20, and a second hole 384 of upper plate 380, and (iii) connected to upper end 372 (e.g., tied to form a knot, adhesively coupled, mechanically coupled, etc.) with upper retainer 376, thereby forming the closed loop. In another embodiment, plates 380 having multiple holes 384 are replaced with two plates 380 that have a single hole 384 (i.e., upper end 372 and lower end 374 engage with independent plates 380). In one embodiment, the wire 370 itself includes a loop and/or multiple strands extending through permeable layer 20, cementitious mix 30, and/or impermeable layer 50.

As shown in FIG. 14H, connectors 260 additionally include a lower plate 380 positioned along outer side 54 of impermeable layer 50. By way of example, lower end 374 of wires 370 may be (i) inserted through a first hole 384 in an upper plate 380, permeable layer 20, cementitious mix 30, impermeable layer 50, and a first hole 384 in a lower plate 380, (ii) inserted through a second hole of lower plate 380, impermeable layer 50, cementitious mix 30, permeable layer 20, and a second hole 384 of upper plate 380, and (iii) connected to upper end 372 (e.g., tied to form a knot, adhesively coupled, mechanically coupled, etc.) with upper retainer 376, thereby forming the closed loop. In another embodiment, connector 260 does not include the upper plate 380 (e.g., only includes the lower plate 380, etc.).

Figure 9O:
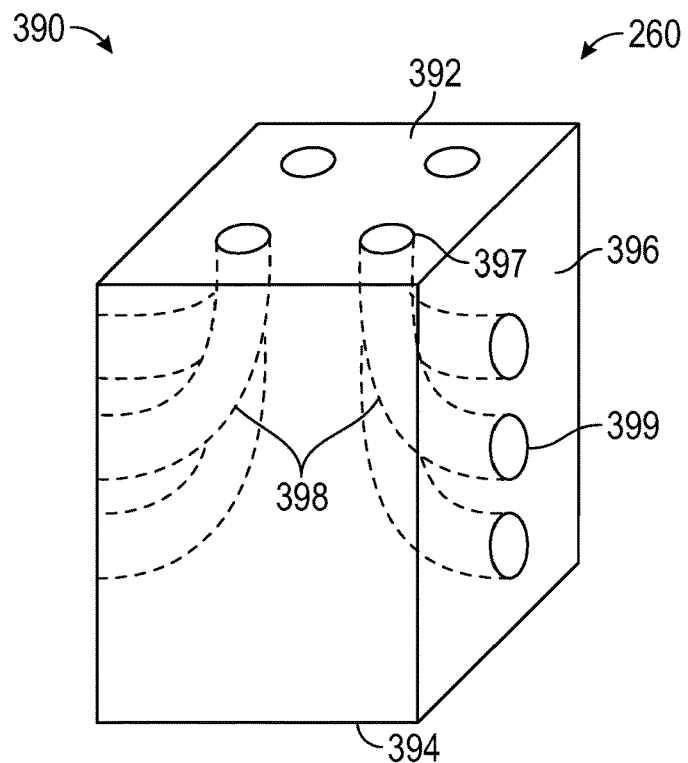

As shown in FIG. 9O, connector 260 is a block, shown as block 390. Block 390 has a first face, shown as upper face 392, an opposing second face, shown as lower face 394, and a wall, shown as sidewall 396, that couples upper face 392 and lower face 394. Upper face 392 defines a plurality of apertures, shown as apertures 397, and sidewall 396 defines a plurality of apertures, shown as apertures 399. As shown in FIG. 9O, block 390 defines a plurality of passages, shown as internal passages 398, that connect apertures 397 of upper face 392 to apertures 399 of sidewall 396. In some embodiments, lower face 394 additionally or alternatively defines a plurality of apertures. Internal passages 398 may thereby connect apertures 397 of upper face 392 to the plurality of apertures of lower face 394.

Figure 14I:
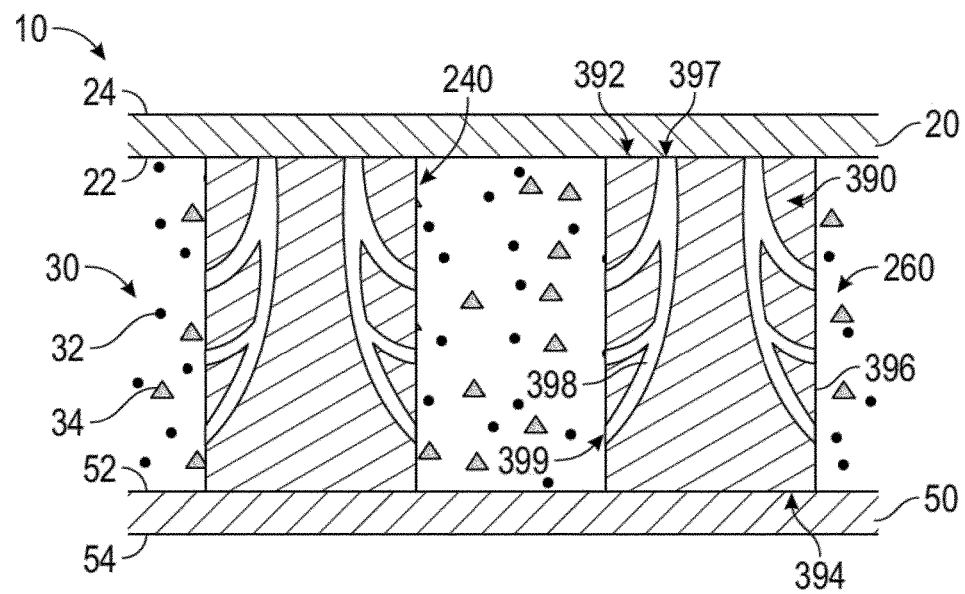

As shown in FIG. 14I, block 390 is disposed between permeable layer 20 and impermeable layer 50 such that upper face 392 is disposed along inner side 22 of permeable layer 20 and lower face 394 is disposed along inner side 52 of impermeable layer 50. Upper face 392 and/or lower face 394 may be coupled to permeable layer 20 and/or impermeable layer 50, respectively, with an adhesive, using a heat treatment process, an intermediate coupling material (e.g., double-sided tape, etc.), a chemical reaction, or still another process. According to an exemplary embodiment, apertures 397, apertures 399, and internal passages 398 are positioned to facilitate improving the hydration of cementitious mixture 30. By way of example, apertures 397 may receive hydration water to which internal passages 398 deliver to apertures 399. Block 390 may thereby facilitate delivering hydration water to the interior of cementitious mixture 30. By way of another example, apertures 397, internal passages 398, and/or the plurality of apertures of lower face 394 may cooperatively facilitate draining water (e.g., rain water, melting snow, etc.) from the top side (e.g., permeable layer 20, top surface of cementitious mixture 30, etc.) of cementitious composite 10 through cementitious composite 10 and, in some embodiments, out of the cementitious composite 10 through the bottom side (e.g., impermeable layer 50, etc.) thereof (e.g., to prevent water from pooling on outer side 24 of permeable layer 20 and/or the top surface of cementitious mixture 30, etc.). Impermeable layer 50 may define a plurality of apertures positioned to align with the plurality of apertures of lower face 394 of block 390.

Figure 9P:
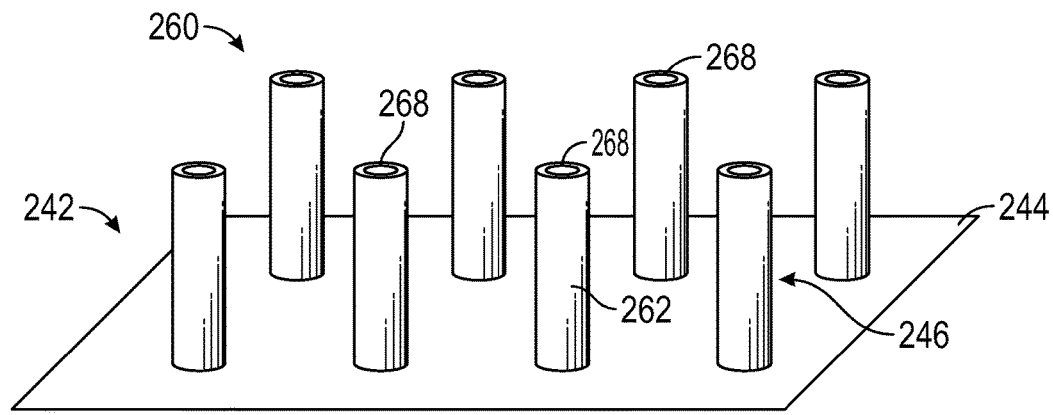

As shown in FIG. 9P, connector 260 includes a first connector layer, shown as connector layer 242. Connector layer 242 include a first base, shown as substrate 244. In some embodiments, substrate 244 is permeable layer 20. In some embodiments, substrate 244 is impermeable layer 50. In some embodiments, substrate 244 is a layer independent of permeable layer 20 and/or impermeable layer 50. By way of example, substrate 244 may be and/or include a grid, a second permeable layer, and/or a second impermeable layer. As shown in FIG. 9P, connector layer 242 includes a plurality of connection members (e.g., 50, 100, 1,000, 10,000, etc. connection members), shown as female connectors 246 (e.g., similar to connector 260 of FIG. 9H or FIG. 9I, etc.). In one embodiment, female connectors 246 are integrally formed with substrate 244. In another embodiment, female connectors 246 are otherwise coupled to substrate 244 (e.g., using a heat treatment process, double-sided tape, adhesive, a chemical process, etc.). In one embodiment, female connectors 246 include connectors 260 that define slot 267. In another embodiment, female connectors 246 include connectors 260 that define interlocking interface 269. In still another embodiment, connector layer 242 includes a combination of female connectors 246 having slots 267 and interlocking interfaces 269. In an alternative embodiment, female connectors 246 do not define apertures 268 (e.g., such that female connectors 246 have an inverted function and are configured as male connectors, etc.). The male connectors may define an extension, projection, retaining element, and/or male interface configured to engage with a corresponding female interface.

Figure 9Q:
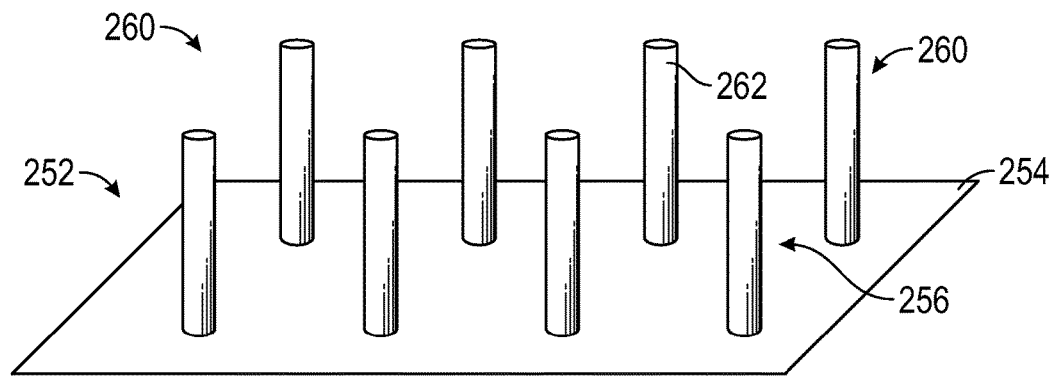
Figure 9R:
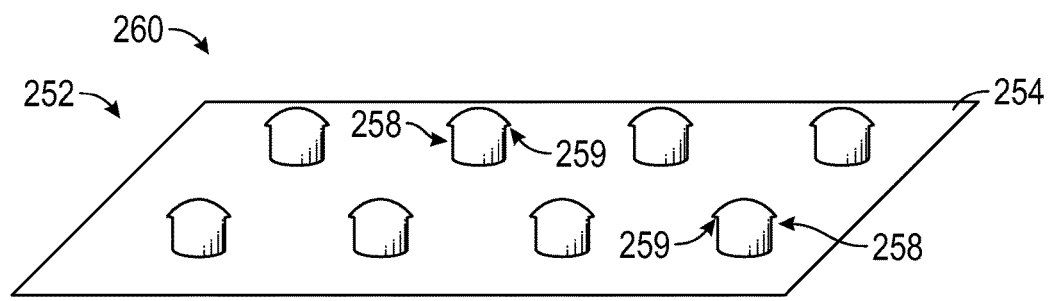

As shown in FIGS. 9Q and 9R, connector 260 includes a second connector layer, shown as connector layer 252. Connector layer 252 include a second base, shown as substrate 254. In some embodiments, substrate 254 is permeable layer 20. In some embodiments, substrate 254 is impermeable layer 50. In some embodiments, substrate 254 is a layer independent of permeable layer 20 and impermeable layer 50. By way of example, substrate 254 may be and/or include a second grid, a third permeable layer, and/or a third impermeable layer. As shown in FIG. 9Q, connector layer 252 includes a first plurality of connection members (e.g., 50, 100, 1000, 10000, etc. connection members), shown as male connectors 256 (e.g., similar to connector 260 of FIG. 9A, etc.). In one embodiment, male connectors 256 are integrally formed with substrate 254. In another embodiment, male connectors 256 are otherwise coupled to substrate 254 (e.g., using a heat treatment process, double-sided tape, adhesive, a chemical process, etc.). In some embodiments, male connectors 256 are configured to engage with and be received by slot 267 of female connectors 246 of connector layer 242.

As shown in FIG. 9R, connector layer 252 includes a second plurality of connection members (e.g., 50, 100, 1000, 10000, etc. connection members), shown as male connectors 258. In one embodiment, male connectors 258 are integrally formed with substrate 254. In another embodiment, male connectors 258 are otherwise coupled to substrate 254 (e.g., using a heat treatment process, double-sided tape, adhesive, a chemical process, etc.). As shown in FIG. 9R, male connectors 258 define an interlocking element, shown as retainer 259. According to an exemplary embodiment, male connectors 258 are configured to engage with and be received by interlocking interface 269 of female connectors 246 of connector layer 242. In an alternative embodiment, male connectors 258 do not define retainer 259 such that male connectors 258 are configured as female connectors. The female connectors may define one or more interlocking interfaces and/or one or more female interfaces are configured to engage with and receive a corresponding male interface. In still another embodiment, connector layer 252 includes a combination of male connectors 256 and male connectors 258.

Figure 14J:
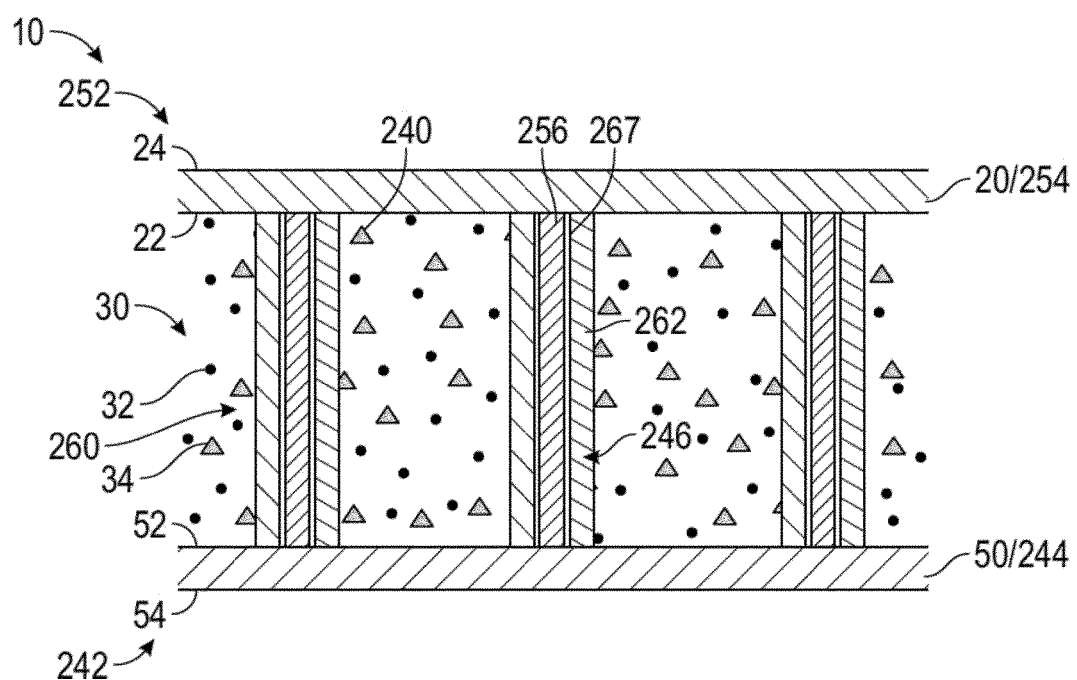
Figure 14K:
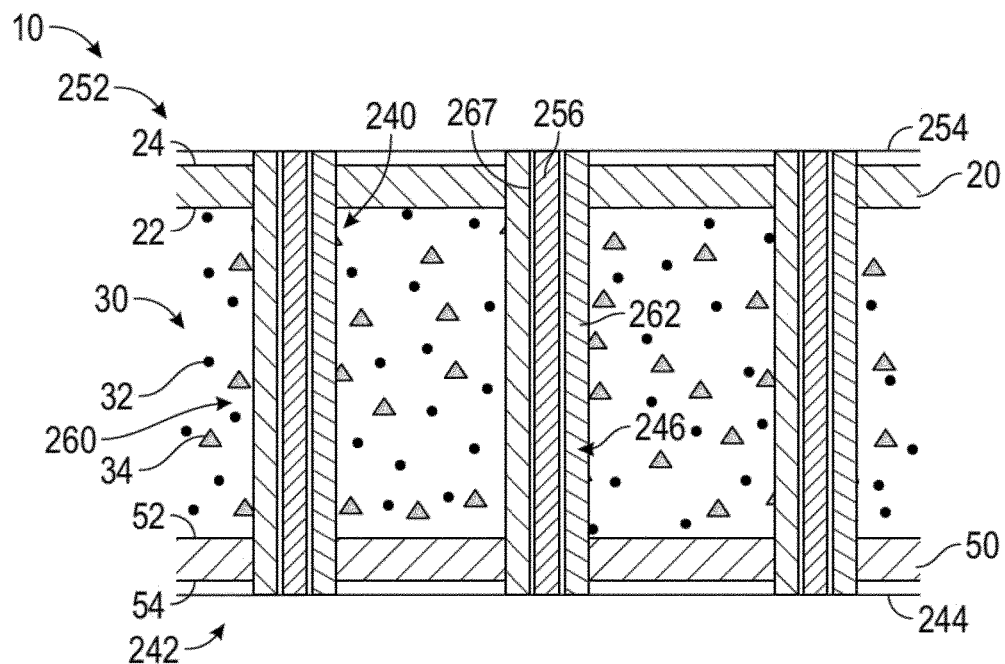
Figure 14L:
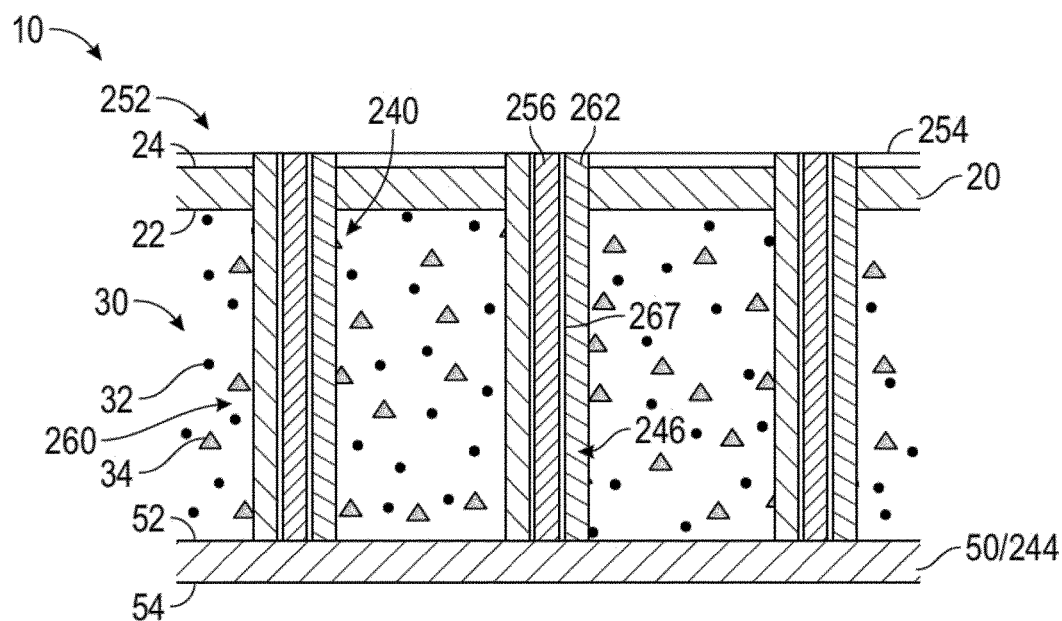

As shown in FIGS. 14J-14L, connector layer 242 and connector layer 252 are configured to interface with one another to cooperatively form connection layer 240. As shown in FIG. 14J, substrate 244 of connector layer 242 is impermeable layer 50 and substrate 254 of connector layer 252 is permeable layer 20. In another embodiment, substrate 244 of connector layer 242 is permeable layer 20 and substrate 254 of connector layer 252 is impermeable layer 50.

As shown in FIG. 14K, substrate 244 of connector layer 242 is disposed along outer side 54 of impermeable layer 50 and substrate 254 of connector layer 252 is disposed along outer side 24 of permeable layer 20. In another embodiment, substrate 244 of connector layer 242 is disposed along outer side 24 of permeable layer 20 and substrate 254 of connector layer 252 is disposed along outer side 54 of impermeable layer 50. In some embodiments, substrate 244 and/or substrate 254 are coupled (e.g., attached, secured, etc.) to permeable layer 20 and/or impermeable layer 50 (e.g., adhesive, double-sided tape, using a heat treatment process, mechanical couplers, etc.).

As shown in FIG. 14L, substrate 244 of connector layer 242 is impermeable layer 50 and substrate 254 of connector layer 252 is disposed along outer side 24 of permeable layer 20. In another embodiment, substrate 244 of connector layer 242 is disposed along outer side 24 of permeable layer 20 and substrate 254 of connector layer 252 is impermeable layer 50. In still another embodiment, substrate 244 of connector layer 242 is permeable layer 20 and substrate 254 of connector layer 252 is disposed along outer side 54 of impermeable layer 50. In yet another embodiment, substrate 244 of connector layer 242 is disposed along outer side 54 of impermeable layer 50 and substrate 254 of connector layer 252 is permeable layer 20.

As shown in FIGS. 14J-14L, slots 267 of female connectors 246 are positioned to receive male connectors 256 to couple connector layer 242 and connector layer 252 together to cooperatively form connection layer 240. According to the exemplary embodiment shown in FIGS. 14K and 14L, female connectors 246 and male connectors 256 are positioned to extend through corresponding holes within permeable layer 20 and/or impermeable layer 50. In one embodiment, the holes within permeable layer 20 and/or impermeable layer 50 are predefined. In another embodiment, the holes are defined as connector layer 242 and connector layer 252 are pushed through cementitious composite 10 to engage each other. In one embodiment, male connectors 256 are fixedly secured within slots 267 of female connectors 246 (e.g., with an adhesive, bonded together using a heat treatment process, etc.). In another embodiment, male connectors 256 are releasably secured within slots 267 of female connectors 246 such that connector layer 252 may be removed prior to and/or after in-situ hydration of cementitious composite 10. In some embodiments, substrate 244 and/or substrate 254 are coupled (e.g., attached, secured, etc.) to permeable layer 20 and/or impermeable layer 50 (e.g., with adhesive, double-sided tape, using a heat treatment process, mechanical couplers, etc.).

Figure 14M:
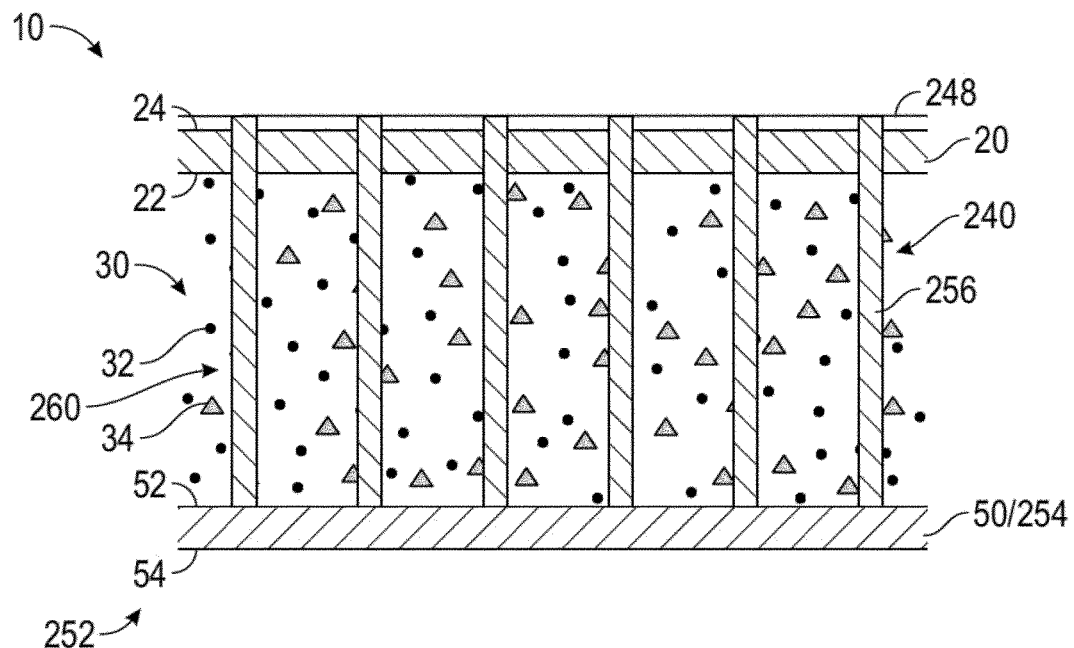
Figure 14N:
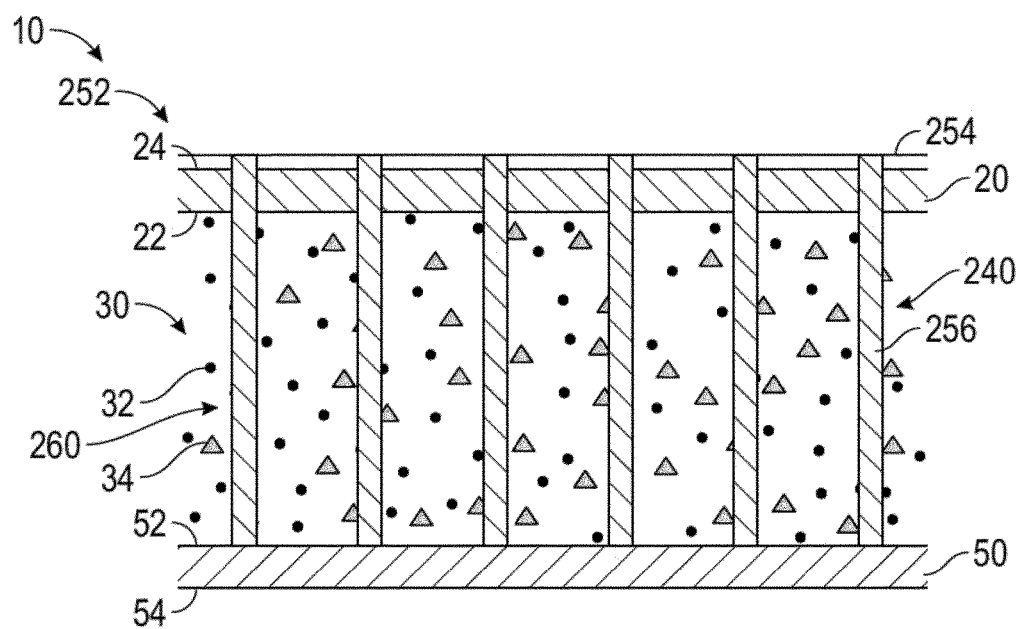
Figure 14O:
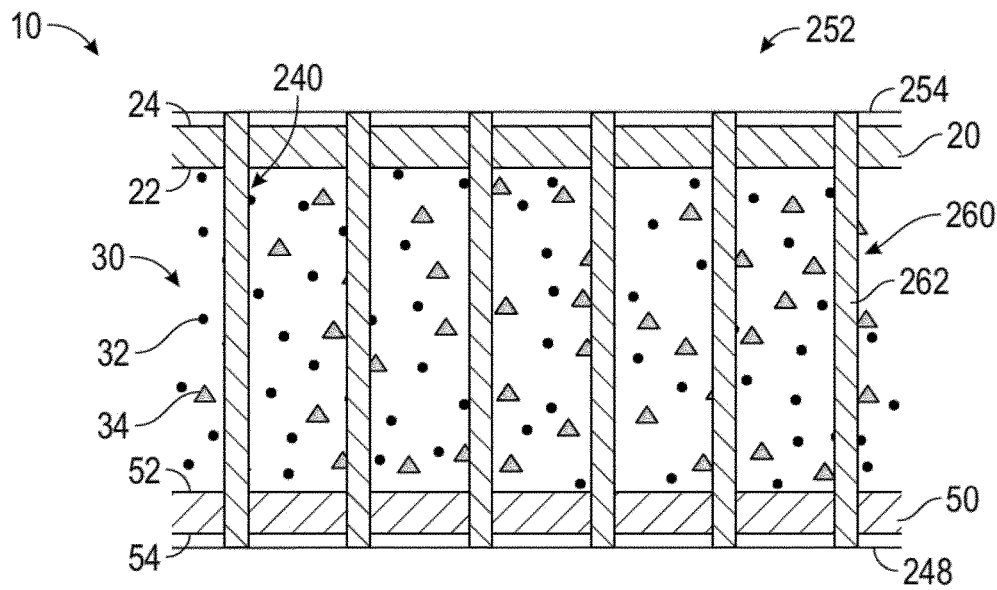

As shown in FIGS. 14M-14O, connector layer 252 is configured to interface with at least one of permeable layer 20, impermeable layer 50, and/or a secondary layer, shown as secondary layer 248. Secondary layer 248 may be a permeable layer (e.g., similar to permeable layer 20, a geogrid similar to strand layer 482, etc.) and/or an impermeable layer (e.g., similar to impermeable layer 50, etc.). As shown in FIG. 14M, substrate 254 of connector layer 252 is impermeable layer 50 and secondary layer 248 is disposed along outer side 24 of permeable layer 20 such that male connectors 256 extend from impermeable layer 50 through permeable layer 20 and engage secondary layer 248. In another embodiment, substrate 254 of connector layer 252 is permeable layer 20 and secondary layer 248 is disposed along outer side 54 of impermeable layer 50 such that male connectors 256 extend from permeable layer 20 through impermeable layer 50 and engage secondary layer 248. In still another embodiment, cementitious composite 10 does not include secondary layer 248 such that male connectors 256 extend form substrate 254 and engage either permeable layer 20 or impermeable layer 50.

As shown in FIG. 14N, substrate 254 of connector layer 252 is disposed along outer side 24 of permeable layer 20 such that male connectors 256 extend from substrate 254 through permeable layer 20 and engage impermeable layer 50. In another embodiment, substrate 254 of connector layer 252 is disposed along outer side 54 of impermeable layer 50 such that male connectors 256 extend from substrate 354 through impermeable layer 50 and engage permeable layer 20.

As shown in FIG. 14O, substrate 254 of connector layer 252 is disposed along outer side 24 of permeable layer 20 and secondary layer 248 is disposed along outer side 54 of impermeable layer 50 such that male connectors 256 extend from substrate 254 through permeable layer 20 and impermeable layer 50 and engage secondary layer 248. In another embodiment, substrate 254 of connector layer 252 is disposed along outer side 54 of impermeable layer 50 and secondary layer 248 is disposed along outer side 24 of permeable layer 20 such that male connectors 256 extend from substrate 254 through impermeable layer 50 and permeable layer 20 and engage secondary layer 248.

In one embodiment, the holes within permeable layer 20 and/or impermeable layer 50 are predefined. In another embodiment, the holes are defined as connector layer 252 is pushed through at least one of permeable layer 20 and impermeable layer 50. In one embodiment, male connectors 256 are fixedly secured to secondary layer 248, permeable layer 20, and/or impermeable layer 50 (e.g., with an adhesive, bonded together using a heat treatment process, etc.). In some embodiments, substrate 254 and/or secondary layer 248 are coupled (e.g., attached, secured, etc.) to permeable layer 20 and/or impermeable layer 50 (e.g., with adhesive, double-sided tape, using a heat treatment process, mechanical couplers, etc.).

Figure 14P:
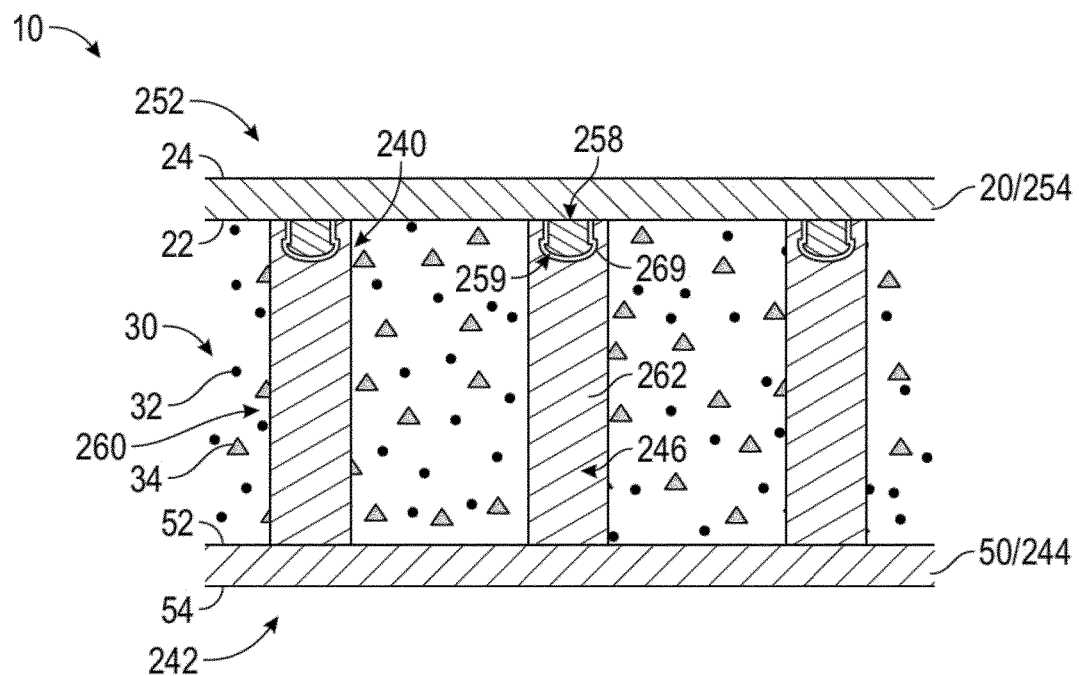
Figure 14Q:
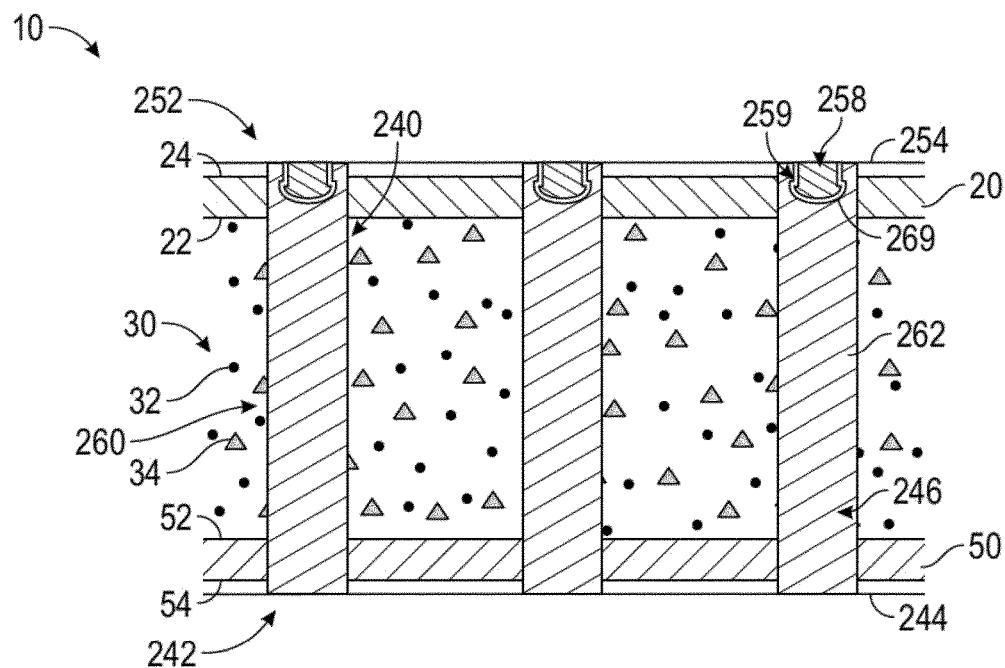
Figure 14R:
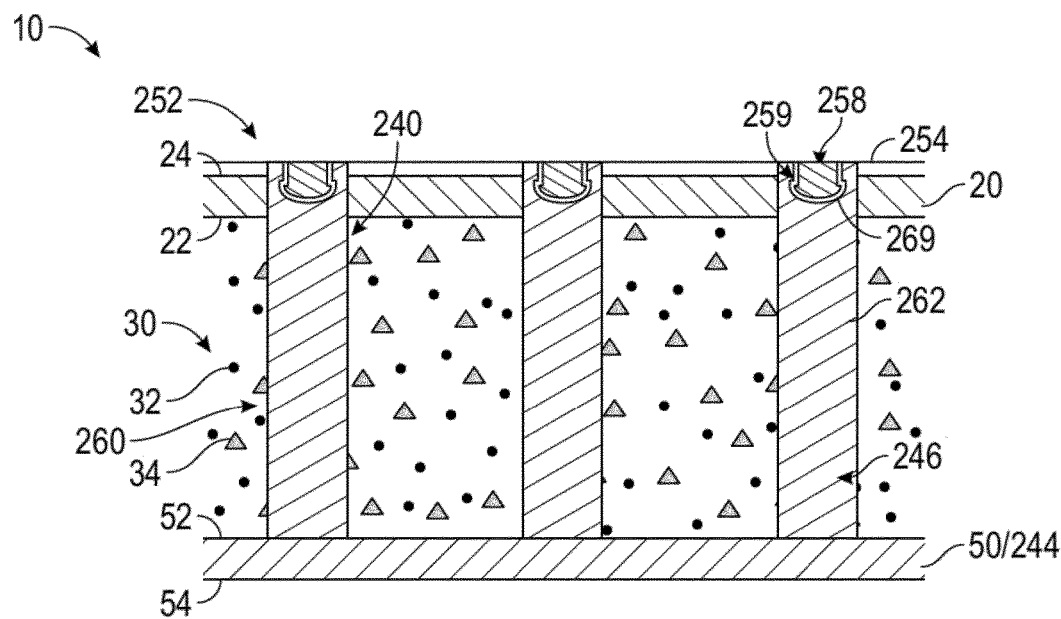

As shown in FIGS. 14P-14R, connector layer 242 and connector layer 252 are configured to interface with one another to cooperatively form connection layer 240. As shown in FIG. 14P, substrate 244 of connector layer 242 is impermeable layer 50 and substrate 254 of connector layer 252 is permeable layer 20. In another embodiment, substrate 244 of connector layer 242 is permeable layer 20 and substrate 254 of connector layer 252 is impermeable layer 50.

As shown in FIG. 14Q, substrate 244 of connector layer 242 is disposed along outer side 54 of impermeable layer 50 and substrate 254 of connector layer 252 is disposed along outer side 24 of permeable layer 20. In another embodiment, substrate 244 of connector layer 242 is disposed along outer side 24 of permeable layer 20 and substrate 254 of connector layer 252 is disposed along outer side 54 of impermeable layer 50. In some embodiments, substrate 244 and/or substrate 254 are coupled (e.g., attached, secured, etc.) to permeable layer 20 and/or impermeable layer 50 (e.g., with adhesive, double-sided tape, using a heat treatment process, mechanical couplers, etc.).

As shown in FIG. 14R, substrate 244 of connector layer 242 is impermeable layer 50 and substrate 254 of connector layer 252 is disposed along outer side 24 of permeable layer 20. In another embodiment, substrate 244 of connector layer 242 is disposed along outer side 24 of permeable layer 20 and substrate 254 of connector layer 252 is impermeable layer 50. In still another embodiment, substrate 244 of connector layer 242 is permeable layer 20 and substrate 254 of connector layer 252 is disposed along outer side 54 of impermeable layer 50. In yet another embodiment, substrate 244 of connector layer 242 is disposed along outer side 54 of impermeable layer 50 and substrate 254 of connector layer 252 is permeable layer 20.

As shown in FIGS. 14P-14R, interlocking interface 269 of female connectors 246 are positioned to receive retainer 259 of male connectors 258 to couple connector layer 242 and connector layer 252 together to cooperatively form connection layer 240. In another embodiment, male connectors 258 are replaced with female connectors that define an interlocking interface (e.g., a cap, a tightening cap, etc.) and female connectors 246 are replaced with male connectors (e.g., similar to male connectors 256, etc.) that define a retaining portion (e.g., a button, etc.) that is received within the interlocking interface (e.g., a button/cap coupling, a snap fit, etc.). According to the exemplary embodiment shown in FIGS. 14Q and 14R, female connectors 246 and male connectors 258 are positioned to extend through corresponding holes within permeable layer 20 and/or impermeable layer 50. In one embodiment, the holes within permeable layer 20 and/or impermeable layer 50 are predefined. In another embodiment, the holes are defined as connector layer 242 and/or connector layer 252 are pushed through cementitious composite 10 to engage each other. According to an exemplary embodiment, retainers 259 are configured to releasably secured male connectors 258 within interlocking interfaces 269 of female connectors 246 (e.g., with a snap fit, an interface fit, etc.) such that connector layer 252 may be removed prior to and/or after in-situ hydration of cementitious composite 10 (e.g., if desired, etc.). In some embodiments, substrate 244 and/or substrate 254 are coupled (e.g., attached, secured, etc.) to permeable layer 20 and/or impermeable layer 50 (e.g., with adhesive, double-sided tape, using a heat treatment process, mechanical couplers, etc.).

According to an exemplary embodiment, at least one end of connector 260 is configured to melt or otherwise deform during an application of heat to cementitious composite 10 (i.e., a heat treatment process) with a heating element. The heat treatment may cause the ends of connector 260 to fuse or otherwise join with permeable layer 20 and/or impermeable layer 50, respectively, upon cooling. The heating systems may provide thermal energy to cementitious composite 10 (e.g., directly or indirectly to cementitious mixture 30, permeable layer 20, impermeable layer 50, connection layer 240, etc.) to increase the temperature of cementitious composite 10 or portions thereof above the melting point of connectors 260. In some embodiments, the melting point of permeable layer 20 and/or impermeable layer 50 is less than that of connectors 260. Therefore, the heat treatment process may melt permeable layer 20 and/or impermeable layer 50 to connectors 260.

According to an exemplary embodiment, various heating systems and methods may be used to heat treat cementitious composite 10 to melt or otherwise deform connectors 260, permeable layer 20, and/or impermeable layer 50. The heating systems may provide thermal energy to at least one of outer side 24 of permeable layer 20, outer side 54 of impermeable layer 50, and directly to one or both ends of connectors 260. In one embodiment, the heating system includes a first heating element (e.g., an upper heating element, etc.) and a second heating element (e.g., a lower heating element, etc.). The first heating element may apply heat directly to permeable layer 20 and/or upper end 264 of rods 262. The second heating element may apply heat directly to impermeable layer 50 and/or lower end 266 of rods 262. In other embodiments, heating system includes either the first heating element or the second heating element. According to an exemplary embodiment, the heating system is configured to apply heat to cementitious composite 10 for a period of time (e.g., twenty seconds, two minutes, five minutes, etc.) to heat at least a portion of connectors 260 (e.g., the ends thereof, etc.), permeable layer 20, and/or impermeable layer 50 above their respective melting point to couple permeable layer 20 and impermeable layer 50 together with connectors 260. The heating process may be a continuous process (e.g., a conveyor system, a portion of cementitious composite 10 is heat treated, etc.) or a discrete process (e.g., an entire length of one or more cementitious composites 10 are heat treated at once; indexed operation where material is fed, stopped to allow a machine to perform an operation, and thereafter again feed; etc.). In some embodiments, two or more of the heat treatment processes are used in combination (e.g., in sequence; heating, compaction, and cooling; etc.).

In one embodiment, the heating system includes at least one of an upper element and a lower element. The element(s) may be configured to at least one of heat (e.g., through conductive heat transfer, radiative heat transfer, convective heat transfer, etc.), cool, and compress cementitious composite 10. The heat applied by the element(s) may melt at least one of upper end 264 and lower end 266 of rods 262 to permeable layer 20 (e.g., inner side 22, outer side 24, etc.) and impermeable layer 50 (e.g., inner side 52, outer side 54, etc.), respectively. Compression applied to cementitious composite 10 during the heat treatment may minimize deformation of cementitious composite 10. In other embodiments, the element(s) are configured to at least one of cool and compress cementitious composite 10. Cooling may cause the melted portions of cementitious composite 10 to solidify, as well as complete the bonding process between connectors 260 and permeable layer 20 and/or impermeable layer 50, respectively. The element(s) may be or include a resistance heating element, an infrared heater, a heat lamp, a plate element, a roller element, a furnace, a fan/blower, a chiller, a heat exchanger, a boiler, and/or include fluid lines for heated and/or cooled working fluid, among other possibilities.

Figure 14S:
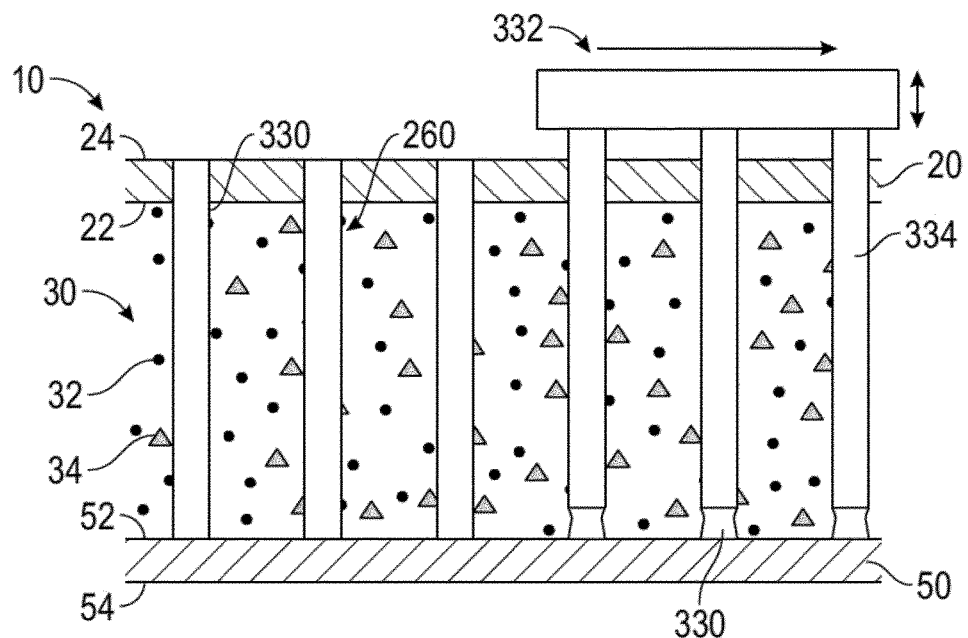
Figure 15:
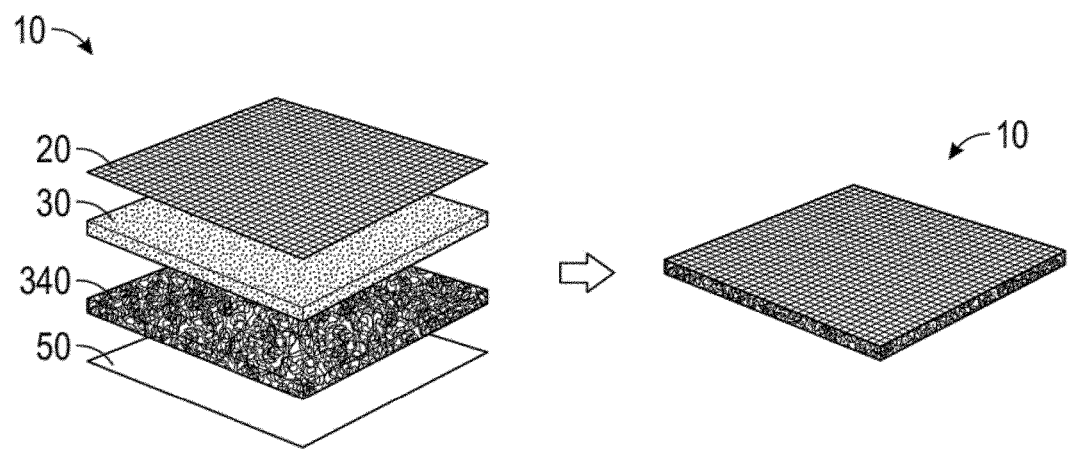
FIG. 15 is an exploded perspective view of a cementitious composite, according to still another exemplary embodiment.

As shown in FIG. 14S, an injection mechanism, shown as injection mechanism 332, is used to inject connectors 260 in a liquefied or molten form (e.g., a liquid resin, liquid metal, etc.) between permeable layer 20 and impermeable layer 50 to couple the two together. Injection mechanism 332 may include a plurality of injector tubes, shown as injectors 334. Injectors 334 may push aside or core (i.e., remove) one or more layers of cementitious composite 10. Injectors 334 may be configured to pierce through at least one of permeable layer 20 and impermeable layer 50 and deposit connectors 260 from within cementitious composite 10. In one embodiment, injectors 334 pierce through permeable layer 20 and not impermeable layer 50. Injectors 334 may inject liquefied or molten connectors, shown as liquefied connectors 330, from inner side 52 of impermeable layer 50 through permeable layer 20, sealing the holes created by injectors 334. Liquefied connectors 330 may then solidify to form connectors 260. In another embodiment, injectors 334 pierce through impermeable layer 50 and not permeable layer 20. Injectors 334 may inject liquefied connectors 330 from inner side 22 of permeable layer 20 through impermeable layer 50, sealing the holes created by injectors 334. In other embodiments, injectors 344 pierce through both permeable layer 20 and impermeable layer 50. Injectors 334 may inject liquefied connectors 330 between outer side 54 of impermeable layer 50 to outer side 24 of permeable layer 20, sealing the holes created by injectors 334.

Bunched Structure Layer

According to the exemplary embodiment shown in FIGS. 15-17B, cementitious composite 10 additionally or alternatively includes a third structure layer (e.g., a nonwoven, not woven, etc. layer), shown as structure layer 340. According to the exemplary, structure layer 340 includes one or more strands arranged in a bunched configuration having specific characteristics designed to facilitate the operation of cementitious composite 10. By way of example, such characteristics of structure layer 340 may include low density, high void space, and discontinuities, among other characteristics. In one embodiment, structure layer 340 is an independent, structural material configured to support the weight of cementitious mixture 30, thereby reducing the risk of pre-hydration delamination (e.g., separation of structure layer 340 from impermeable layer 50, etc.), while improving the strength of the cementitious composite 10 post-hydration. By way of example, structure layer 340 may be able to independently support a cementitious mix having a weight of between one and five pounds per square foot. These characteristics improve the strength and transportability, among other features, of cementitious composite 10. The structure layer 340 having strands arranged in a bunched configuration may also reduce the prevalence and/or severity of shrink-induced cracking within cementitious mixture 30. Such a reduction may be produced because the one or more bunched strands limit crack propagation by bridging crack faces within the cementitious phase.

Figure 16A:
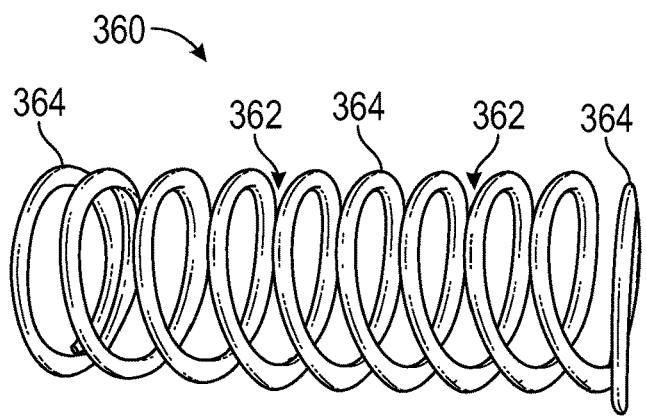
FIG. 16A is an illustration of a strand of a structural layer of the cementitious composite of FIG. 15, according to an exemplary embodiment.

As shown in FIGS. 16A-17B, structure layer 340 includes a one or more strands, shown as strands 360. As shown in FIG. 16A, strand 360 has a circular coil arrangement including a plurality of coils, shown as loops 364, separated by spaces, shown as gaps 362. In other embodiments, strand 360 has another shape and/or configuration. By way of example, strand 360 may have a square coil arrangement, a trapezoidal coil arrangement, an asymmetrical coil arrangement, a wedge-shaped coil arrangement, or another coil arrangement. By way of another example, strand 360 may have a non-coil arrangement (e.g., loops 364 are omitted, etc.) such as a wavy and/or curved arrangement, a flat arrangement, or other possible arrangements. According to an exemplary embodiment, gaps 362 facilitate intertwining loops 364 of the same strand 360 (e.g., into a bunch, etc.) and/or loops 364 of strand 360 with loops 364 of proximate strands 360. According to an exemplary embodiment, strand 360 is flexible. In other embodiments, strand 360 is semi-rigid. In some embodiments, strand 360 is deformable (e.g., plastically deformable, etc.). According to an exemplary embodiment, strand 360 includes at least one of a fibrous material, a polymeric material, and a metallic material (e.g., metal, plastic, carbon fiber, aramid glass, silicon carbide, aluminum oxide, nylon, polypropylene, coconut fiber, cellulose fiber, other synthetic materials, other natural materials, etc.). Strand 360 may include various constituent strand structures such as a monofilament (e.g., a single material strand, etc.), a multifilament (e.g., a multi-material strand, etc.), a woven yarn, a braided yarn, and/or a thread. Strand 360 may have uniform gaps 362 (e.g., same frequency of loops 364 along the length of strand 360, etc.) or variable gaps 362. The size (e.g., length, width, cross-sectional thickness, density, etc.), arrangement, and/or material of strand 360 may be selected to accommodate a particular application for cementitious composite 10.

Figure 16B:
FIG. 16B is an illustration of one or more strands of FIG. 16A arranged in a first bunched configuration, according to an exemplary embodiment.
Figure 16C:
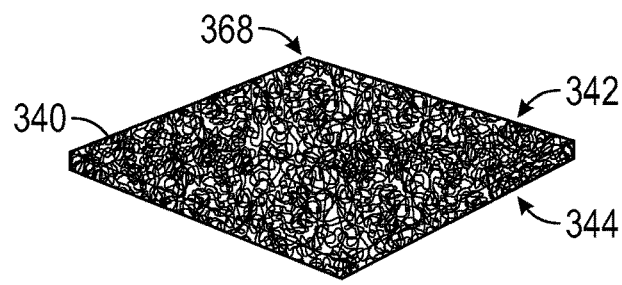
FIG. 16C is an illustration of one or more strands of FIG. 16A arranged in a second bunched configuration, according to an exemplary embodiment.

As shown in FIG. 16B, strands 360 may be arranged in a first configuration to form a bunching of strands 360, shown as bunching 366. According to an exemplary embodiment, strands 360 and/or different portions of the same strand 360 of bunching 366 disposed along one another are independent (e.g., not physically bonded, not melted or integrally formed, etc.) such that strands 360 and/or different portions of the same strand 360 are held together by friction and entanglement (e.g., of loops 364, etc.). In one embodiment, bunching 366 includes a single, continuous strand 360 intertwined with itself. In other embodiments, bunching 366 includes a plurality of discontinuous strands 360 that are intertwined with each other (e.g., intersect, overlap, or otherwise interface with one another, etc.). In one embodiment, strands 360 of bunching 366 include the same material, size (e.g., length, cross-sectional thickness, size of gaps 362, etc.), and arrangement (e.g., shape, etc.). In other embodiments, strands 360 of bunching 366 include different materials, sizes, and/or different arrangements. According to an exemplary embodiment, strands 360 are arranged into bunching 366 in a random manner (e.g., randomly distributed, distributed non-uniformly, etc.). Strands 360 may be curled, randomly configured, or otherwise oriented such that strands 360 frequently change directions and have various relative orientations. Bunching 366 may include a different density of strands 360 in various areas throughout bunching 366. In other embodiments, strands 360 are arranged into bunching 366 in an uniform manner (e.g., systematically arranged, arranged in a specified pattern, etc.). Bunching 366 may have one or more columns or other structures formed by strands 360 that are thereafter intertwined with one another. In some embodiments, strands 360 include a plurality of extensions (e.g., barbs, fibers, etc.) that facilitate in holding strands 360 in an intertwined configuration to form bunching 366. The extensions may prevent strands 360 from separating once bunched together. Such extensions may protrude from a main body of strand 360. In some embodiments, strands 360 are coated or sprayed with a coarse spray (e.g., by including an abrasive within the coating, etc.) that aids in the intertwining of strands 360 to form bunching 366. In some embodiments, an adhesive is applied to strands 360 to prevent detanglement (e.g., prevent the separation of strands 360 once bunched, etc.).

As shown in FIGS. 16C-17B, bunching 366 is formed (e.g., compressed, compacted, etc.) into a mat (e.g., a bunching layer, etc.), shown as bunching mat 368. Bunching mat 368 may form structure layer 340. According to an exemplary embodiment, bunching mat 368 is a nonwoven structure layer 340, forming a nonwoven cementitious composite 10. In one embodiment, bunching mat 368 is formed from a single bunching 366. In an alternative embodiment, bunching mat 368 is formed from a plurality of bunchings 366. The plurality of bunchings 366 may be different materials, have different densities, and/or have other distinct characteristics. According to an exemplary embodiment, a first bunching 366 may interface with one or more additional bunchings 366 having the same and/or different properties than the first bunching 366. In some embodiments, the first bunching 366 is intertwined with another bunching 366 (e.g., along one another, side-by-side, one atop the other, etc.). According to an exemplary embodiment, bunchings 366 may be coupled with one another (e.g., with an adhesive, joined, etc.). Structure layer 340 that includes different bunchings 366 may provide unique mechanical and structural properties in at least one of the lateral, the longitudinal, and the thickness direction of cementitious composite 10 (e.g., a direction orthogonal to a surface of the composite, etc.) before and after in-situ hydration. By way of example, a first bunching 366 having smaller strands 360 (e.g., short, narrow, relatively less length, etc.) may be configured to provide localized strength disposed within (e.g., intertwined, etc.), while a second bunching 366 may have longer strands 360 (e.g., greater in length, etc.), the longer-stranded bunching 366 configured to provide durability and prevent separation of structure layer 340. Together, the first and second bunchings 366 may provide both localized strength and durability for cementitious composite 10.

According to an exemplary embodiment, bunching mat 368 includes strands 360 packed together in a tightly-spaced configuration. The tightly-spaced configuration may form interstitial voids, shown as voids 348. The volume of structure layer 340 that includes voids 348 may be designed to provide a target density, weight, and/or other characteristic of structure layer 340 and/or cementitious composite 10. The amount of voids 348 may be designed by specifying a characteristic of the strands 360 (e.g., size, length, thickness, etc.), the compressive force applied to bunching 366 to form bunching mat 368, and/or the dimensions of bunching mat 368 (e.g., strands 360 compressed into a small volume versus a larger volume, etc.). The distance between intertwined portions of strands 360 may be between 0.1 micron to over 500 microns at an given location within bunching mat 368. According to an exemplary embodiment, structure layer 340 has a density of strands 360 that reduces the loss of cementitious mixture 30 during the transportation and handling of cementitious composite 10.

According to an exemplary embodiment, structure layer 340 supports (e.g., holds, contains, reinforces, etc.) cementitious mixture 30. By way of example, strands 360 of structure layer 340 may physically support cementitious mixture 30 within voids 348. The size, shape, or orientation of strands 360 that support cementitious mixture 30 may be designed to improve the structural properties and/or hydration characteristics of cementitious composite 10. By way of example, cementitious composite 10 may have less open space with more densely arranged strands 360, improving the strength of structure layer 340 but make it harder to fill.

Figure 17A:
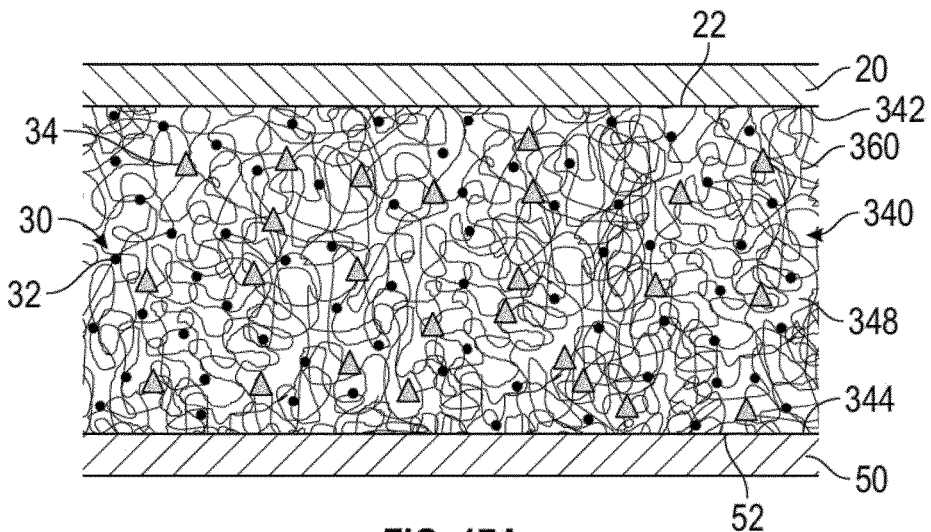
FIGS. 17A and 17B are schematic cross-sectional views of the cementitious composite of FIG. 16, according to various exemplary embodiments.
Figure 17B:
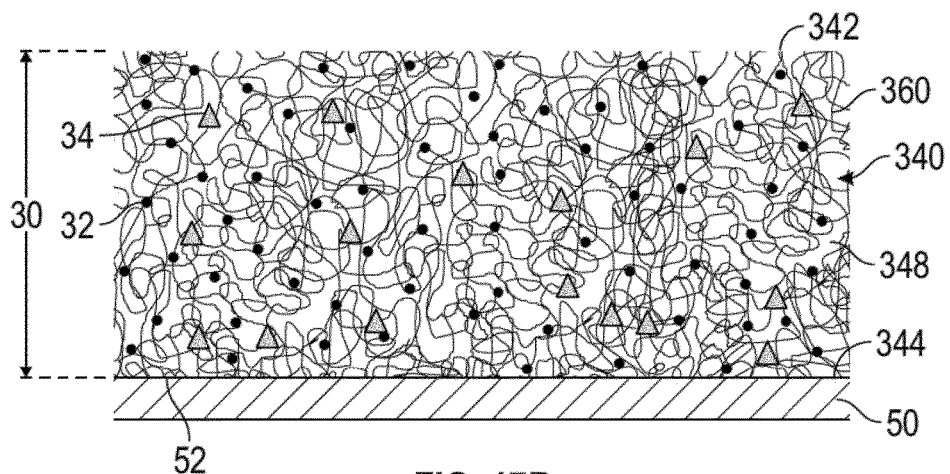
Figure 18:
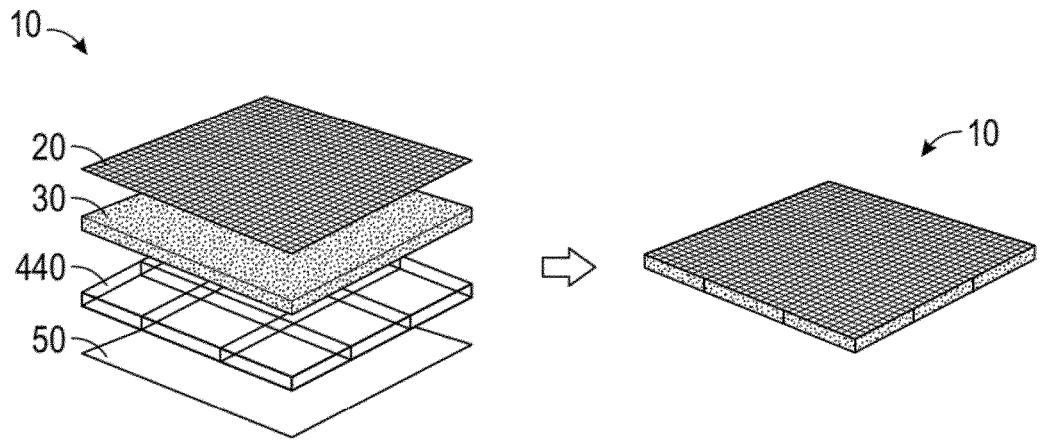
FIG. 18 is an exploded perspective view of a cementitious composite, according to still another exemplary embodiment.

As shown in FIGS. 17A and 17B, cementitious mixture 30 is disposed within at least a portion of voids 348 of structure layer 340. According to an exemplary embodiment, cementitious mixture 30 is positioned within voids 348 using gravity, vibration, compaction, or any combination of gravity, vibration, and compaction. The extent that cementitious mixture 30 is compacted may impact the ability of water to flow through cementitious mixture 30, the time required for hydration, setting and hardening of cementitious mixture 30, the strength of cementitious composite 10, the uniformity of the cementitious mixture 30, and/or the risk of cementitious material migrating through permeable layer 20.

As shown in FIGS. 16C-17B, structure layer 340 includes a first side, shown as top surface 342, and an opposing second side, shown as bottom surface 344. Top surface 342 and bottom surface 344 may be separated by the thickness of structure layer 340. In one embodiment, structure layer 340 has a thickness of between five millimeters and one hundred millimeters, for example, fifteen millimeters. As shown in FIGS. 17A and 17B, bottom surface 344 of structure layer 340 is positioned along inner side 52 of impermeable layer 50. According to an exemplary embodiment, bottom surface 344 of structure layer 340 is coupled (e.g., attached, joined, bonded etc.) to inner side 52 of impermeable layer 50 using heat (e.g., heat welded, melted, bonded in a furnace, etc.), an adhesive, a chemical reaction, an intermediate coupling material, or still another process. In one embodiment, bottom surface 344 of structure layer 340 is coupled to inner side 52 of impermeable layer 50 prior to cementitious mixture 30 being deposited along impermeable layer 50 and within structure layer 340.

As shown in FIG. 17A, inner side 22 of permeable layer 20 is positioned along top surface 342 of structure layer 340. In some embodiments, structure layer 340 includes a scrim liner and/or a coating layer disposed along top surface 342. According to an exemplary embodiment, at least a portion of structure layer 340 is exposed from cementitious mixture 30 (e.g., at least a portion of one or more strands 360 is exposed, etc.), thereby forming an exposed portion of structure layer 340. In one embodiment, the exposed portion protrudes from cementitious mixture 30. For example, various strands 360 may protrude (e.g., 0.5 millimeters, 1 millimeter, 2 millimeters, etc.) from cementitious mixture 30. A portion of each strand 360 may protrude from cementitious mixture 30 or portions of a subset of strands 360 may protrude from (e.g., vertically, from the sides of, etc.) from cementitious mixture 30. The lengths of strands 360 protruding from cementitious mixture 30 may define the exposed portion of structure layer 340. According to one embodiment, the exposed portion of structure layer 340 includes strands 360 extending vertically (e.g., from the top of, etc.) and/or horizontally (e.g., from the side of, etc.) from cementitious mixture 30. Such strands 360 may be disposed in a random arrangement and extend in various directions from cementitious mixture 30. In other embodiments, structure layer 340 has a defined pattern (e.g., diagonally intersecting, honeycomb, etc.), permeable layer 20 being coupled to top surface 342 according to a corresponding bonding pattern. The exposed portion may facilitate the bonding of various other layers of cementitious composite 10 to structure layer 340.

In one embodiment, inner side 22 of permeable layer 20 is coupled to the exposed portion of top surface 342 of structure layer 340 (e.g., permeable layer 20 bonded to the lengths of strands 360 protruding from cementitious mixture 30, etc.). By way of example, inner side 22 of permeable layer 20 may be coupled to top surface 342 of structure layer 340 with heat (e.g., heat welded, melted, bonded in a furnace, etc.), an adhesive, a chemical reaction, an intermediate coupling material, or still another process. In one embodiment, the exposed portion of structure layer 340 is cleaned (e.g., with pressurized air, with a brush, an adhesive dust capturing material similar to a lint roller, etc.) to remove cementitious material or other debris from the exposed portion of structure layer 340 prior to coupling. In another embodiment, cementitious mixture 30 is compacted within structure layer 340 (e.g., uniformly, evenly, etc.), thereby reducing the prevalence of cementitious material on the exposed portion of structure layer 340.

According to an exemplary embodiment, structure layer 340 has independent mechanical properties apart from those of the other layers of cementitious composite 10. By way of example, such mechanical properties may include tensile strength, elongation at break, and tear strength, among other known properties. Structure layer 340 may have strands 360 with a target thickness and/or length, and/or a coupling between strands 360 designed to provide target mechanical properties. Strands 360 may have a composition that provides a target mechanical property. The modulus of elasticity and geometry of structure layer 340 may affect the flexibility of cementitious composite 10. Such a structure layer 340 having one of a lower modulus of elasticity or more open geometry may increase the pliability (e.g., lower radius of curvature, etc.) of cementitious composite 10 (e.g., for shipping, to contain cementitious material, etc.).

According to an alternative embodiment, structure layer 340 includes void patterns (e.g., shapes cut through structure layer 340, three dimensional voids formed within structure layer 340, etc.). Such void patterns may be formed in structure layer 340 through cutting, forming, or another process. The void patterns may be formed during the primary manufacturing of structure layer 340 or subsequently as a secondary manufacturing process. According to an exemplary embodiment, the void patterns are randomly distributed or formed in sequence (e.g., a honeycomb, etc.). The void patterns may decrease the time required to dispose cementitious mixture 30 in structure layer 340, improve the physical properties of cementitious composite 10 after in-situ hydration, and/or provide other advantages.

According to an alternative embodiment, a coating may be disposed around at least a portion of the fibers. By way of example, the coating may be configured to improve various properties (e.g., strength, durability, etc.) of structure layer 340. As still a further example, the coating may improve the coupling strength of strands within structure layer 340, of structure layer 340 to permeable layer 20 and impermeable layer 50, and of structure layer 340 to cementitious mixture 30 after in-situ hydration. By way of example, the coating may include an abrasive coating (e.g., similar to that provided with a Scotch-Brite® scouring pad, etc.), a coating to provide resistance to ultraviolet light, a coating to protect strands 360 from the cementitious materials (e.g., improved alkaline resistance), and/or still another known coating.

According to an alternative embodiment, cementitious composite 10 includes a scrim lining (e.g., reinforcing material, geotextile, geogrid, another nonwoven material, a woven material, etc.) coupled to (e.g., fused, integrally formed, joined, etc.) structure layer 340. A scrim lining may be coupled to one or more surfaces of structure layer 340 or disposed within structure layer 340. The scrim lining may be a similar material as permeable layer 20 to improve bonding between permeable layer 20 and structure layer 340 (e.g., when the scrim is disposed along the bonding interface, etc.). The scrim lining may improve the tensile strength of structure layer 340 and cementitious composite 10 both before and after in-situ hydration. By way of example, a loosely assembled structure layer 340 may have a tendency to separate, and a scrim lining may reinforce structure layer 340 to prevent such separation.

Grid Structure Layer

According to the exemplary embodiment shown in FIGS. 18-21B, cementitious composite 10 additionally or alternatively includes a fourth structure layer (e.g., a nonwoven, not woven, fiberless, nonfibrous, etc. layer), shown as structure layer 440. According to an exemplary embodiment, structure layer 440 has a grid configuration with specific characteristics designed to facilitate the operation of cementitious composite 10. By way of example, such characteristics of structure layer 440 may include low density and high void space, among other characteristics. In one embodiment, structure layer 440 is an independent, free standing, structural material configured to support the weight of cementitious mixture 30 between permeable layer 20 and impermeable layer 50, thereby reducing the risk of pre-hydration delamination (e.g., separation of structure layer 440 from impermeable layer 50, etc.), while improving the strength of the cementitious composite 10 post-hydration. By way of example, structure layer 440 may independently support a cementitious mix having a weight of between one and five pounds per square foot. These characteristics improve the strength and transportability, among other features, of cementitious composite 10. The structure layer 440 arranged in a grid configuration may also reduce the prevalence and/or severity of shrink-induced cracking within cementitious mixture 30. Such a reduction may be produced because the grid of structure layer 440 limits crack propagation by bridging crack faces within the cementitious phase.

According to an exemplary embodiment, structure layer 440 is flexible. In other embodiments, structure layer 440 is semi-rigid. By way of example, structure layer 440 has a predefined shape (e.g., curved, etc.) such that cementitious composite 10 takes the shape of structure layer 440. In some embodiments, structure layer 440 is deformable (e.g., plastically deformable, etc.). According to an exemplary embodiment, structure layer 440 includes at least one of a polymeric material, a metallic material, and a composite material (e.g., metal, plastic, carbon fiber, aramid glass, silicon carbide, aluminum oxide, nylon, polypropylene, coconut fiber, cellulose fiber, other synthetic materials, other natural materials, etc.).

According to an exemplary embodiment, structure layer 440 may have independent mechanical properties apart from those of the other layers of cementitious composite 10. By way of example, such mechanical properties may include tensile strength, elongation at break, and tear strength, among other known properties. Structure layer 440 may have portions with a target thickness, length, and/or coupling designed to provide target mechanical properties. Structure layer 440 may have a composition that provides a target mechanical property. The modulus of elasticity and geometry of structure layer 440 may affect the flexibility of cementitious composite 10. A structure layer 440 having one of a lower modulus of elasticity or more open geometry may increase the pliability (e.g., lower radius of curvature, etc.) of cementitious composite 10 (e.g., for shipping, to contain cementitious material, etc.).

As shown in FIGS. 19A-19D and 21A, structure layer 440 includes a grid, shown as grid 460, including walls, show as walls 462. In one embodiment, walls 462 forms a single, continuous structure. In another embodiment, walls 462 are selectively coupled to form grid 460. By way of example, walls 462 may be adhesively coupled, welded, mechanically coupled (e.g., with fasteners, snap-fit, etc.), integrally formed, and/or otherwise coupled to form grid 460. In one embodiment, walls 462 of grid 460 include the same material, size (e.g., length, cross-sectional thickness, height, etc.), and arrangement (e.g., shape, etc.). In other embodiments, walls 462 of grid 460 include different materials, sizes, and/or different arrangements. As shown in FIGS. 19A-19D and 21A, walls 462 are arranged in an intersecting configuration such that walls 462 define a plurality of spaces, shown as cavities 464.

According to an exemplary embodiment, the volume of structure layer 440 that includes cavities 464 may impact the density, weight, and other characteristics of structure layer 440 and cementitious composite 10. The volume of cavities 464 may be varied with at least one of the characteristics of walls 462 (e.g., size, length, height, thickness, etc.), the spacing between walls 462, and the arrangement of walls 462 (e.g., shape of cavities 464, etc.). According to an exemplary embodiment, structure layer 440 having a greater density may reduce the loss of cementitious mixture 30 during the transportation and handling of cementitious composite 10. In some embodiments, walls 462 of grid 460 include barbs, fibers, and/or an abrasive coating that provide for better bonding with cementitious mixture 30 (e.g., post-hydration, etc.).

Figure 19A:
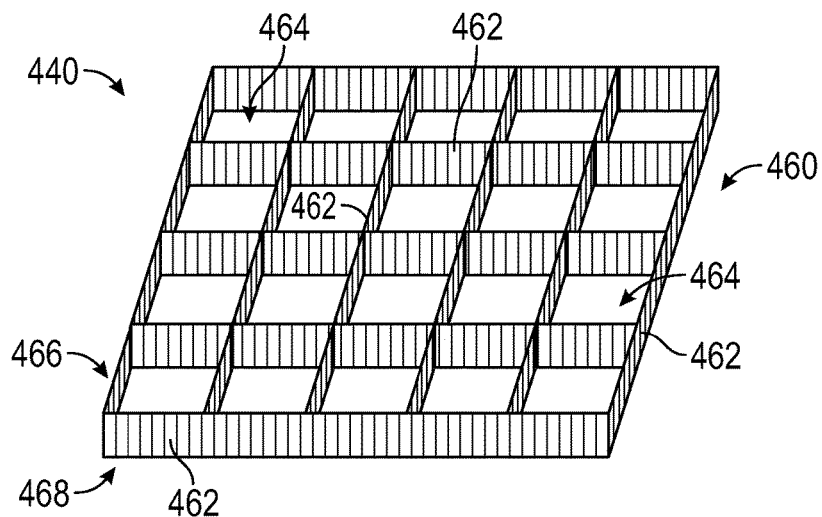
FIG. 19A is a schematic illustration of a grid for use with the cementitious composite of FIG. 18, according to an exemplary embodiment.
Figure 19B:
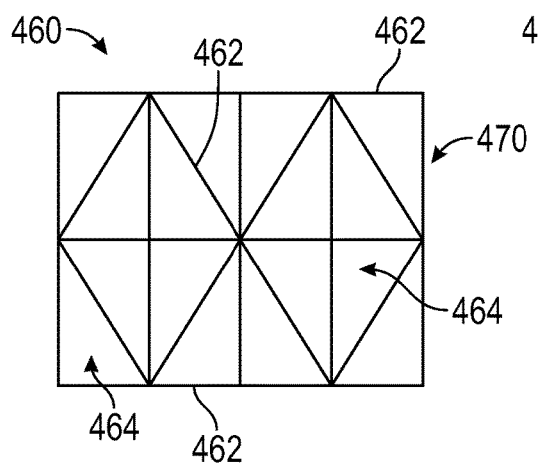
FIGS. 19B-19D are schematic cross-sectional views of the grid of FIG. 19A, according to various exemplary embodiments.
Figure 19C:
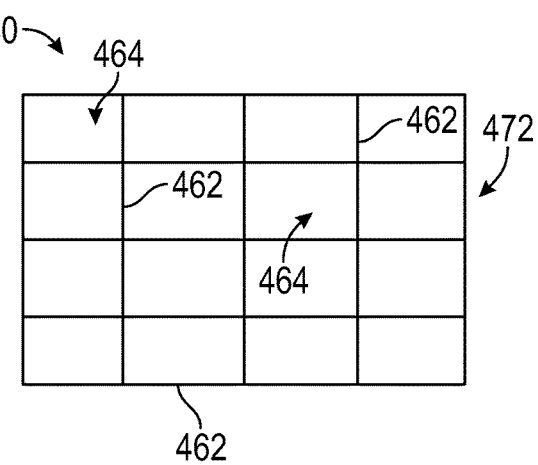
Figure 19D:
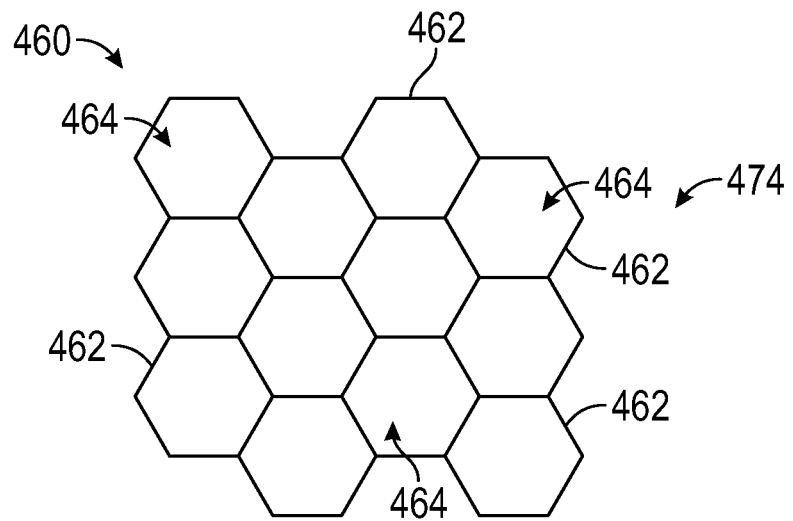

As shown in FIGS. 19A-19D, walls 462 of grid 460 may be arranged in a plurality of configurations to define differently-shaped cavities 464. As shown in FIG. 19B, walls 462 are arranged in a first configuration, shown as triangular configuration 470. Triangular configuration 470 includes walls 462 arranged such that cavities 464 have a triangular cross-sectional shape. In some embodiments, walls 462 arranged in triangle configuration 470 angle inward such that walls 462 meet for form a point (e.g., a pyramid shape, etc.). Such an arrangement may facilitate bending and/or rolling cementitious composite 10. As shown in FIG. 19C, walls 462 are arranged in a second configuration, shown as rectangular configuration 472. Rectangular configuration 472 includes walls 462 arranged such that cavities 464 have a rectangular cross-sectional shape (e.g., rectangular, square, etc.). As shown in FIG. 19D, walls 462 are arranged in a third configuration, shown as honeycomb configuration 474. Honeycomb configuration 474 includes walls 462 arranged such that cavities 464 have a hexagonal or honeycomb cross-sectional shape. In other embodiments, grid 460 includes walls 462 arranged in another configuration (e.g., a diamond configuration, a circular configuration, an asymmetrical configuration, a trapezoidal configuration, a wavy configuration, etc.) such that cavities 464 have such cross-sectional shapes (e.g., diamond shaped, circular, asymmetrical, trapezoidal, wavy, etc.). According to an exemplary embodiment, walls 462 are arranged such that cavities 464 are uniformly shaped and sized throughout structure layer 440 (e.g., cavities 464 are all identical, etc.). In an alternative embodiment, walls 462 are arranged such that cavities 464 are non-uniformly shaped and/or sized (e.g., certain cavities 464 are trapezoidal and certain cavities 464 are honeycomb-shaped, certain cavities 464 are twice as large as other cavities 464, etc.). According to an exemplary embodiment, walls 462 are oriented vertically (e.g., walls 462 are perpendicular to impermeable layer 50 and/or permeable layer 20, etc.). In an alternative embodiment, walls 462 are oriented at an angle (e.g., relative to impermeable layer 50 and/or permeable layer 20, etc.). Certain walls 462 may be oriented at a different angle than other walls 462 of grid 460 (e.g., slant towards one another, slant away from one another, etc.). By way of example, walls 462 may form an alternating structure (e.g., that defines a plurality of alternating hills or ridges and valleys or depressions, etc.). In some embodiments, cavities 464 are formed by the plurality of alternating depressions defined by grid 460 (e.g., where the ridges of the alternating structure close off one side of cavities 464, etc.).

In some embodiments, grid 460 includes a supplementary grid disposed within one or more of cavities 464 of grid 460. The supplementary grid may divide the one or more of cavities 464 into smaller cavities, providing increased strength. According to an exemplary embodiment, the supplementary grid is shaped to correspond with the arrangement of walls 462 and the corresponding shape of cavities 464 of grid 460 (e.g., a honeycomb-shaped cavity and a honeycomb-shaped supplementary grid, etc.). In one embodiment, the cavities of the supplementary grid have the same as the shape as the respective cavity 464 that the supplementary grid is disposed within (e.g., cavity 464 is honeycomb-shaped and the cavities of the supplementary grid are also honeycomb-shaped, etc.). In other embodiments, the cavities of the supplementary grid have a different shape than the respective cavity 464 that the supplementary grid is disposed within (e.g., cavity 464 is honeycomb-shaped and the cavities of the supplementary grid are circular, etc.).

In one embodiment, structure layer 440 includes a single grid 460. In an alternative embodiment, structure layer 440 includes a plurality of grids 460. The plurality of grids 460 may be different materials, have different densities, have different wall arrangements, have different walls properties (e.g., thickness, density, height, etc.), have different cavity properties (e.g., shape, size, volume, etc.), and/or have other distinct characteristics. According to an exemplary embodiment, a first grid 460 may interface with one or more additional grids 460 having the same and/or different properties than the first grid 460. In some embodiments, the first grid 460 is serially coupled with another grid 460 (e.g., along a longitudinal edge, along a lateral edge, etc.). In other embodiments, the first grid 460 is layered (e.g., stacked, etc.) with another grid 460. According to an exemplary embodiment, the various grids 460 may be coupled with one another (e.g., with an adhesive, joined, etc.). Structure layer 440 that includes different grids 460 may provide unique mechanical and structural properties in at least one of the lateral, the longitudinal, and the thickness direction of cementitious composite 10 (e.g., a direction orthogonal to a surface of the composite, etc.) before and after in-situ hydration. By way of example, a first grid 460 with smaller cavities 464 may be configured to provide localized strength, while a second grid 460 having larger cavities 464 may be configured to provide durability. Together, the first and second grids 460 may provide both localized strength and durability for cementitious composite 10.

According to an exemplary embodiment, grid 460 supports (i.e., holds, contains, reinforces) cementitious mixture 30. By way of example, walls 462 of grid 460 may physically support cementitious mixture 30 within cavities 464. The size, shape, and/or orientation of walls 462 that support cementitious mixture 30 may be designed to improve the structural properties and/or hydration characteristics of cementitious composite 10. By way of example, a slightly less-open space with more-densely arranged walls 462 (i.e., smaller cavities 464) may improve the strength of structure layer 440 but make it harder to fill.

Figure 21A:
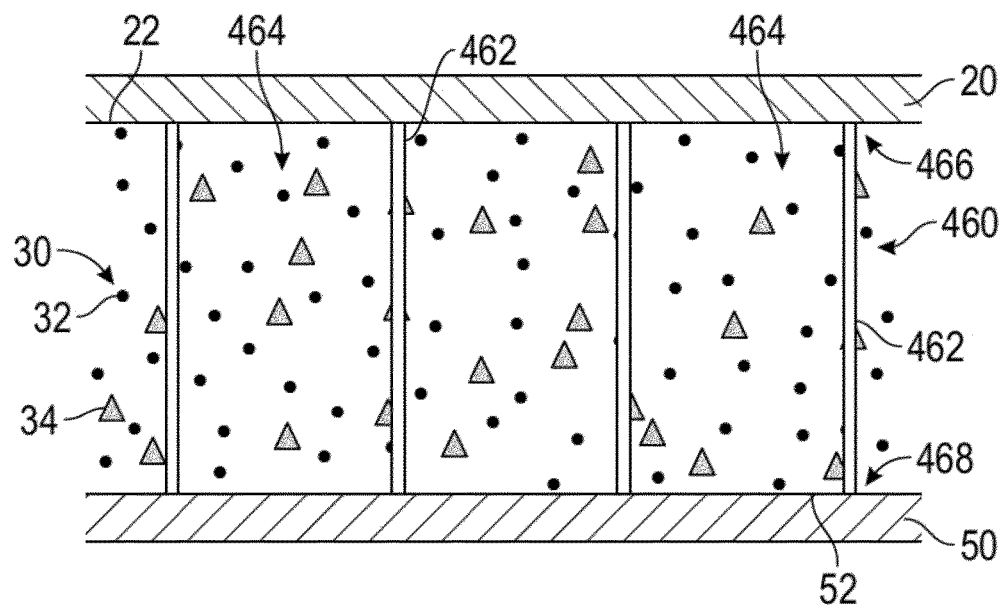
FIGS. 21A and 21B are schematic cross-sectional views of the cementitious composite of FIG. 18, according to various exemplary embodiments.

As shown in FIG. 21A, cavities 464 are configured to receive and hold the constituents of cementitious mixture 30 such that cementitious mixture 30 is disposed within at least a portion of the cavities 464 of grid 460. In some embodiments, only a portion of cavities 464 receive the cementitious materials of cementitious mixture 30 (e.g., some cavities 464 are empty, etc.). According to an exemplary embodiment, cementitious mixture 30 is positioned within cavities 464 using gravity, vibration, compaction, or any combination of gravity, vibration, and compaction. The extent that cementitious mixture 30 is compacted may impact the ability of water to flow through cementitious mixture 30, the time required for hydration, setting and/or hardening of cementitious mixture 30, the strength of cementitious composite 10, the uniformity of the cementitious mixture 30, and/or the risk of cementitious material migrating through permeable layer 20. In some embodiments, walls 462 define apertures or voids (e.g., shapes cut through walls 462, voids formed within walls 462, etc.) that facilitate the movement of the cementitious materials of cementitious mixture 30 from one cavity 464 to an adjacent cavity 464. The voids may be cut or formed in walls 462. The voids may be formed during the primary manufacturing of grid 460 or formed subsequently as a secondary manufacturing process. In some embodiments, the voids are randomly distributed or formed in sequence (e.g., a honeycomb, etc.). The voids may decrease the time required to dispose cementitious mixture 30 in structure layer 440, improve the physical properties of cementitious composite 10 after in-situ hydration, and/or provide other advantages.

As shown in FIGS. 19A and 21A, grid 460 includes a first side, shown as top surface 466, and an opposing second side, shown as bottom surface 468. Top surface 466 and bottom surface 468 may be separated by the thickness of walls 462. In one embodiment, walls 462 have a height of between five millimeters and one hundred millimeters, for example, fifteen millimeters. In one embodiment, walls 462 have a thickness of between one-tenth of one millimeter and five millimeters. According to an exemplary embodiment, grid 460 is an independent structure of cementitious composite 10 that is selectively coupled (e.g., with an adhesive, a heat treatment process, a chemical reaction, an intermediate coupling material, etc.) to at least one of permeable layer 20 and impermeable layer 50. As shown in FIG. 21A, bottom surface 468 of grid 460 is positioned along inner side 52 of impermeable layer 50. According to an exemplary embodiment, bottom surface 468 of grid 460 is coupled (e.g., attached, joined, bonded, etc.) to inner side 52 of impermeable layer 50 using heat (e.g., heat welded, melted, bonded in a furnace, etc.), an adhesive, a chemical reaction, an intermediate coupling material, or still another process. In one embodiment, bottom surface 468 of grid 460 is coupled to inner side 52 of impermeable layer 50 prior to cementitious mixture 30 being deposited along impermeable layer 50 and within cavities 464 of grid 460. In an alternative embodiment, grid 460 extends from (e.g., is integral with, rises from, etc.) inner side 52 of impermeable layer 50.

As shown in FIG. 21A, top surface 466 of grid 460 is positioned along inner side 22 permeable layer 20. According to an exemplary embodiment, top surface 466 of grid 460 is coupled (e.g., attached, joined, bonded, etc.) to inner side 22 of permeable layer 20 using heat (e.g., heat welded, melted, infrared laser, bonded in a furnace, etc.), an adhesive, a chemical reaction, an intermediate coupling material, or still another process. In one embodiment, top surface 466 of grid 460 is coupled to inner side 22 of permeable layer 20 after depositing cementitious mixture 30 along impermeable layer 50 and within cavities 464 of grid 460. In an alternative embodiment, grid 460 extends from (e.g., is integrally formed with, rises from, etc.) inner side 22 of permeable layer 20. In one embodiment, an exposed portion of walls 462 (e.g., a portion that extends from cementitious mixture 30, top surface 466, etc.) is cleaned (e.g., with pressurized air, with a brush, etc.) to remove cementitious material or other debris from the exposed portion of walls 462 prior to coupling. In another embodiment, cementitious mixture 30 is compacted within grid 460 (e.g., uniformly, evenly, etc.), thereby reducing the prevalence of cementitious material on the exposed portion of grid 460.

As shown in FIGS. 20A-20I and 21B, structure layer 440 has a grid configuration (e.g., skeleton, space frame, microlattice structure, etc.), shown as geogrid 480. Geogrid 480 includes at least one layer (e.g., two, three, four, etc. layers), shown as strand layers 482. As shown in FIGS. 20A-20I and 21B, each strand layer 482 includes a plurality of strands, shown as strands 484, that are interconnected at joints, shown as nodes 486, to cooperatively form strand layer 482. As shown in FIGS. 20A, 20H, 20I, and 21B, strand layers 482 are attached in a spaced-apart configuration by coupling members (e.g., rods, extensions, beams, strands, trusses, etc.), shown a struts 488. According to an exemplary embodiment, struts 488 extend from nodes 486 of one strand layer 482 to corresponding nodes 486 of another strand layer 482. In some embodiments, geogrid 480 includes three or more strand layers 482 attached (e.g., stacked, etc.) by struts 488. According to an exemplary embodiment, struts 488 extend vertically from nodes 486 (e.g., perpendicular to strand layers 482, etc.). In other embodiments, struts 488 extend horizontally along a plane of strand layers 482. In other embodiments, struts 488 extend at an angle from strand layers 482 (e.g., forming a truss arrangement, etc.). In still other embodiments, struts 488 extends vertically, horizontally, at an angle, or combinations thereof In some embodiments, multiple struts 488 extend from a single node 486. In some embodiments, certain nodes 486 do not include a corresponding strut 488 (e.g., not all nodes 486 have a strut 488 extending therefrom, etc.). In still other embodiments, one or more struts 488 are attached to strands 484 and/or adjacent struts 488 (i.e., have an end not connected to a node 486).

According to an exemplary embodiment, struts 488 couple strand layers 482 together such that geogrid 480 has a uniform thicknesses (e.g., strand layers 482 are parallel, etc.). In other embodiments, struts 488 couple strand layers 482 together such that geogrid 480 has a variable thickness. By way of example, the length of struts 488 may increase along a longitudinal and/or lateral length of strand layers 482 such that geogrid 480 is structured at an incline (e.g., a ramp, the upper strand layer 482 is angled relative to the lower strand layer 482, etc.). By way of another example, struts 488 near the edge longitudinal edge of geogrid 480 may be smaller in length than struts 488 near the center of geogrid 480 such that the upper strand layer 482 has a curved arrangement (e.g., may facilitate water run off after installation and in-situ hydration of cementitious composite 10, etc.). By way of yet another example, struts 488 may be variably sized across geogrid 480 such that geogrid 480 has a desired, pre-formed shape.

In one embodiment, struts 488 are integrally formed with strand layers 482 such that geogrid 480 is a single, continuous structure. In other embodiments, struts 488 are attached to nodes 486 with at least one of an adhesive, a heat treatment process, a chemical reaction, and an intermediate coupling material and/or fastener. According to an exemplary embodiment, strand layers 482 of geogrid 480 include the same material, size (e.g., length, cross-sectional thickness, etc.), and arrangement (e.g., shape, pattern, etc.). In other embodiments, strand layers 482 of geogrid 480 include different materials, sizes, and/or different arrangements. According to an exemplary embodiment, struts 488 include the same material as strand layers 482, facilitating increased bond strength of struts 488 at nodes 486. In other embodiments, struts 488 include a different material than strand layers 482. By way of example, strand layers 482 may include a material that increases bond strength between strand layers 482 and at least one of permeable layer 20 and impermeable layer 50, and struts 488 may include a second material that increases flexibility of cementitious composite 10. According to an exemplary embodiment, geogrid 480 is flexible. In other embodiments, geogrid 480 is semi-rigid such that at least one of strand layers 482 and struts 488 are rigid. By way of example, at least one of the strand layers 482 may be formed into a predefined shape (e.g., curved, etc.) such that cementitious composite 10 takes the shape of geogrid 480. By way of another example, struts 488 may be flexible such that geogrid 480 is compressible.

As shown in FIGS. 20A-20I and 21B, geogrid 480 includes a void space (e.g., open space, air gaps, etc.), shown as void space 490, that is selected for particular density, weight, and other characteristics of structure layer 440 and cementitious composite 10. In one embodiment, the volume of geogrid 480 includes a majority of void space 490 (e.g., 55%, 75%, 80%, 90%, 95%, 99%, 99.9%, etc.). The amount of volume of void space 490 may be based on at least one of the characteristics of strands 484 (e.g., size, length, height, thickness, shape, etc.), the spacing between strands 484, the arrangement of strands 484 (e.g., shape of strand layers 482, etc.), the characteristics of struts 488 (e.g., size, length, thickness, shape, etc.), and the number of struts 488 within geogrid 480 (e.g., density of struts 488 per unit of volume, etc.). According to an exemplary embodiment, a denser geogrid 480 may reduce the loss of cementitious mixture 30 during the transportation and handling of cementitious composite 10 and/or increase the strength of geogrid 480. In some embodiments, strand layers 482 of geogrid 480 include barbs, fibers, and/or an abrasive coating that provide for better bonding with cementitious mixture 30 (e.g., post-hydration, etc.).

Figure 20A:
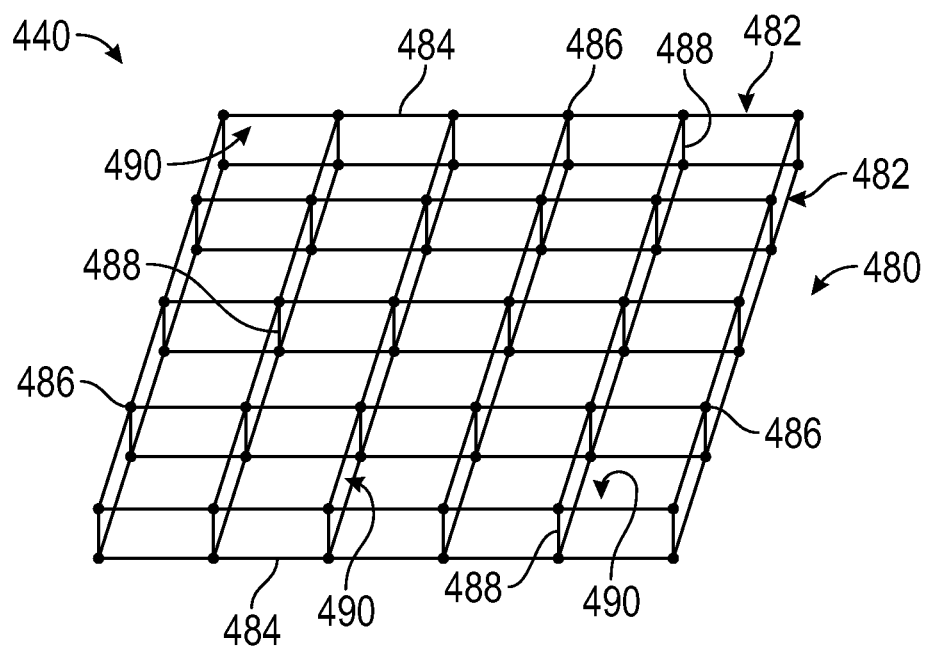
FIG. 20A is a schematic illustration of a grid for use with the cementitious composite of FIG. 18, according to another exemplary embodiment.
Figure 20B:
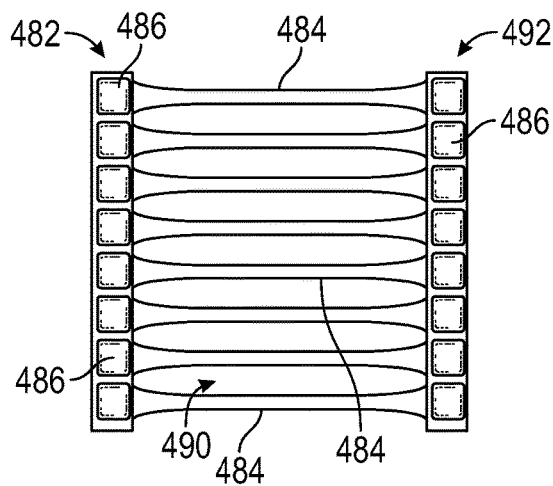
FIGS. 20B-20G are schematic cross-sectional views of the grid of FIG. 20A, according to various exemplary embodiments.
Figure 20C:
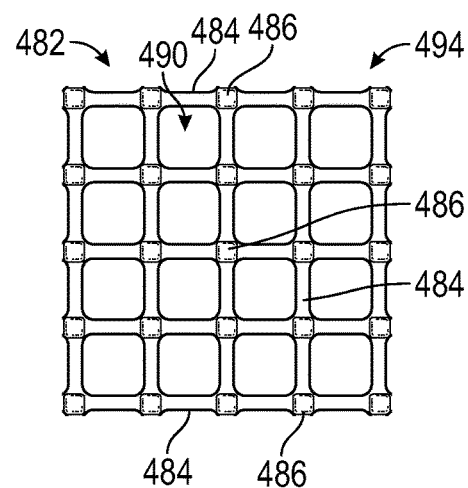
Figure 20D:
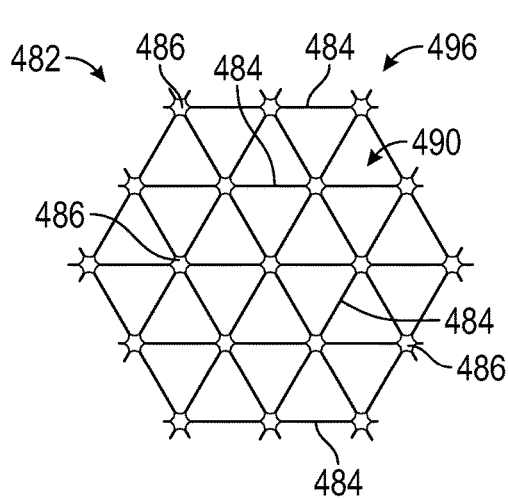
Figure 20E:
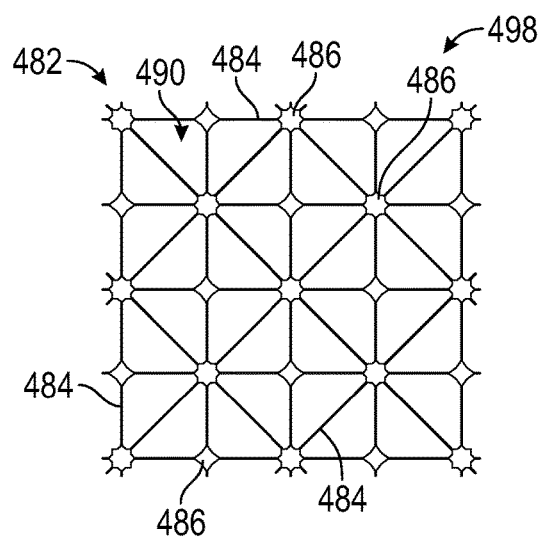
Figure 20F:
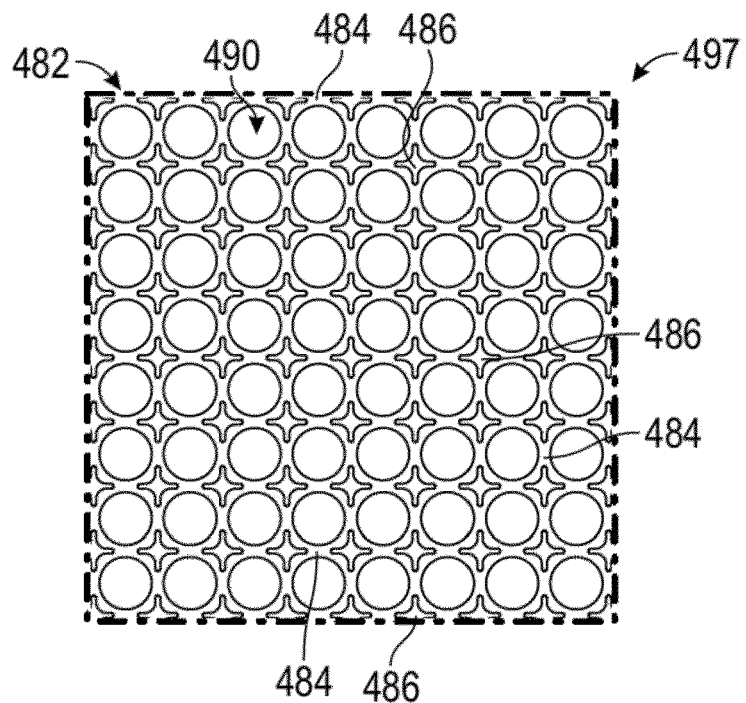
Figure 20G:
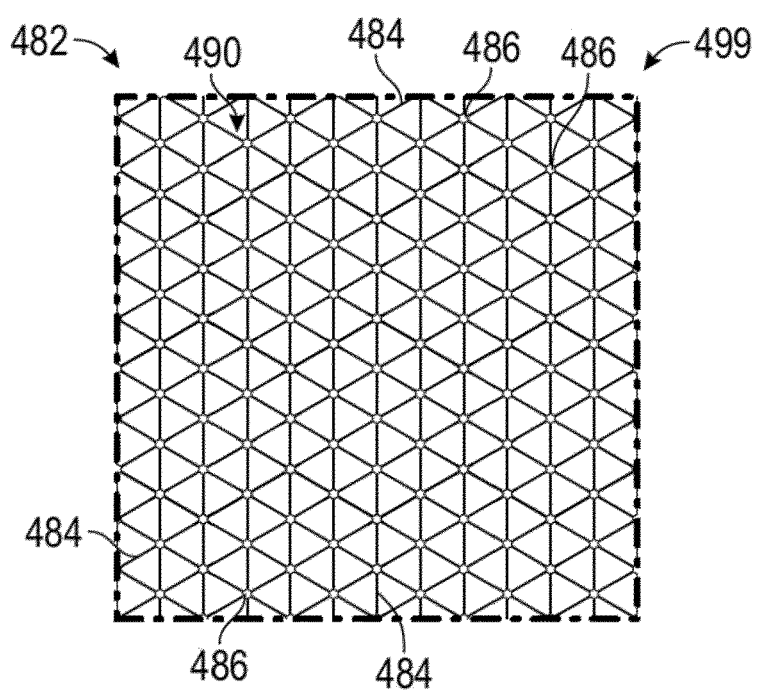

As shown in FIGS. 20A-20I, strands 484 of geogrid 480 are connected at nodes 486 in a plurality of different configurations such that strand layers 482 have different arrangements. As shown in FIG. 20B, strands 484 are arranged in a first configuration, shown as uniaxial configuration 492. Uniaxial configuration 492 includes strands 484 arranged such that strands 484 extend horizontally across strand layer 482 from one node 486 on a first lateral side to a second node 486 on a second opposing lateral side, with nodes 486 on each lateral side of strand layer 482 serially attached in a longitudinal direction. Uniaxial configuration 492 defines void spaces 490 within strand layer 482 as elongated voids. As shown in FIG. 20C, strands 484 are arranged in a second configuration, shown as biaxial configuration 494. Biaxial configuration 494 includes strands 484 arranged in a rectangular configuration such that void spaces 490 within strand layer 482 are rectangularly-shaped (e.g., rectangular, square, etc.). As shown in FIG. 20D, strands 484 are arranged in a third configuration, shown as triaxial configuration 496. Triaxial configuration 496 includes strands 484 arranged in a honeycomb configuration where each honeycomb is divided into triangles (e.g., equilateral triangles, etc.) such that void spaces 490 within strand layer 482 are triangularly-shaped. As shown in FIG. 20E, strands 484 are arranged in a fourth configuration, shown as four axial or quaxial configuration 498. Quaxial configuration 498 includes strands 484 arranged in a square configuration, where each square is divided into smaller squares, and each of the smaller squares are divided into triangles (e.g., right triangles, etc.) such that void spaces 490 within strand layer 482 are triangularly-shaped. As shown in FIG. 20F, strands 484 are arranged in a fifth configuration, shown as biaxial configuration 497. Biaxial configuration 497 includes strands 484 arranged in a circular configuration such that void spaces 490 within strand layer 482 are circular-shaped. As shown in FIG. 20G, strands 484 are arranged in a sixth configuration, shown as hexagonal configuration 499. Hexagonal configuration 499 includes strands 484 arranged in a hexagon configuration such that void spaces 490 within strand layer 482 are hexagonally-shaped.

In other embodiments, strand layer 482 includes strands 484 arranged in another configuration (e.g., a diamond configuration, a circular configuration, an asymmetrical configuration, a trapezoidal configuration, a wavy configuration, etc.) such that void spaces 490 are shaped according to the arrangement of strands 484 (e.g., diamond shaped, circular, asymmetrical, trapezoidal, wavy, etc.). According to an exemplary embodiment, strands 484 are arranged such that void spaces 490 are uniformly shaped and sized across strand layer 482 (e.g., void spaces 490 are identical, etc.). In an alternative embodiment, strands 484 are arranged such that void spaces 490 are non-uniformly shaped and/or sized throughout strand layer 482 (e.g., certain void spaces 490 are trapezoidal and certain void spaces 490 are honeycomb-shaped, certain void spaces 490 are twice as large as other void spaces 490, etc.).

Figure 20H:
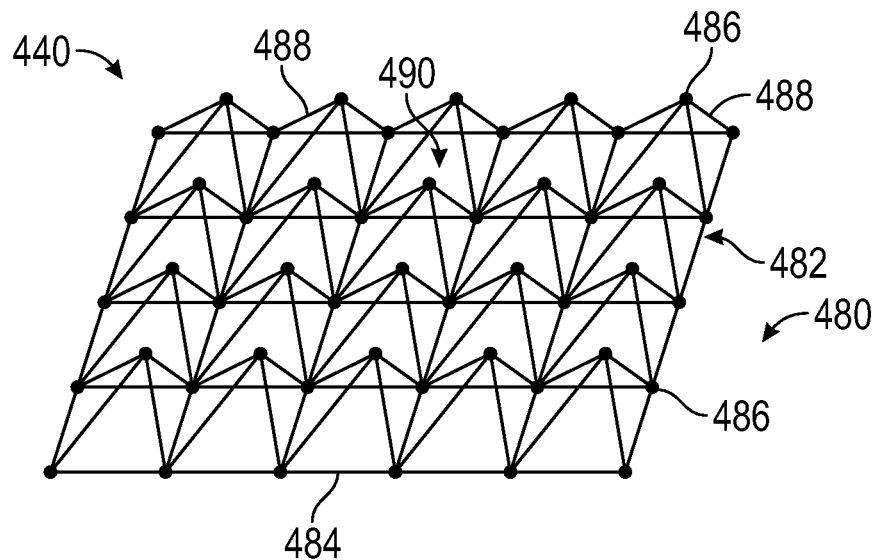
FIGS. 20H and 20I are schematic illustrations of the grid of FIG. 20A, according to various other exemplary embodiments.
Figure 20I:
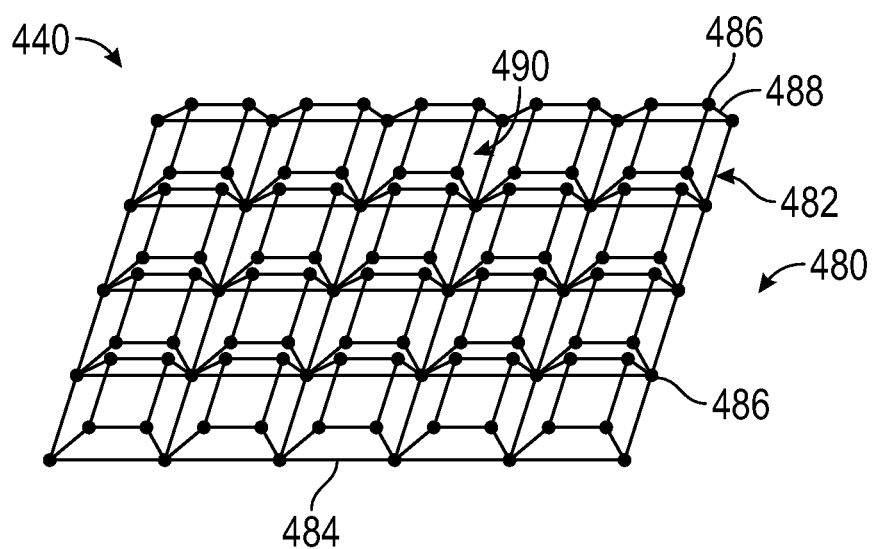

As shown in FIGS. 20H and 20I, geogrid 480 is arranged such that nodes 486 of one of strand layers 482 (e.g., a top strand layer adjacent to permeable layer 20, etc.) are spaced apart. Such spacing may facilitate greater flexibility and bending capability of geogrid 480 and cementitious composite 10. As shown in FIG. 20H, a plurality of struts 488 (e.g., four, etc.) extend from a bottom strand layer 482 and meet at a single node 486. Such an arrangement of geogrid 480 may thereby form a plurality of interconnected pyramids. The space formed between adjacent pyramids may increase the bending capability of geogrid 480. As shown in FIG. 20I, the plurality of pyramids have a flat upper strand layer 482. The pyramid arrangement having flat tops may also increase the bending capability of geogrid 480, while also increasing the bonding capability of the upper strand layer 482 with permeable layer 20 and/or impermeable layer 50.

In one embodiment, structure layer 440 includes a single geogrid 480. In an alternative embodiment, structure layer 440 includes a plurality of geogrids 480. The plurality of geogrids 480 may be different materials, have different densities, have different strand arrangements, have different strand properties (e.g., thickness, density, height, etc.), have different void space properties (e.g., shape, size, volume, etc.), have different strut characteristics and/or properties, and/or have other distinct characteristics. According to an exemplary embodiment, a first geogrid 480 may interface with one or more additional geogrids 480 having the same and/or different properties than the first geogrid 480. In some embodiments, the first geogrid 480 is serially coupled with another geogrid 480 (e.g., along a longitudinal edge, along a lateral edge, etc.). In other embodiments, the first geogrid 480 is layered (e.g., stacked, etc.) with another geogrid 480. According to an exemplary embodiment, the various geogrids 480 may be attached to one another (e.g., with an adhesive, joined, heat treated to fuse, integrally formed, etc.). Structure layer 440 that includes different geogrids 480 may provide unique mechanical and structural properties in at least one of the lateral, the longitudinal, and the thickness direction of cementitious composite 10 (e.g., a direction orthogonal to a surface of the composite, etc.) before and/or after in-situ hydration. By way of example, a first geogrid 480 with less void space 490 may be configured to provide localized strength, while a second geogrid 480 with more void space 490 may be configured to provide durability. Together, the first and second geogrids 480 may provide both localized strength and durability for cementitious composite 10.

According to an exemplary embodiment, geogrid 480 supports (i.e., holds, contains, reinforces) cementitious mixture 30. By way of example, strands 484 and/or struts 488 of geogrid 480 may physically support cementitious mixture 30. The size, shape, arrangement, and/or orientation of strands 484 and/or struts 488 that support cementitious mixture 30 may be designed to improve the structural properties and/or hydration characteristics of cementitious composite 10. By way of example, a slightly less-open space with more densely arranged strands 484 and/or struts 488 (i.e., less void space 490) may improve the strength of structure layer 440 but make it harder to fill.

Figure 21B:
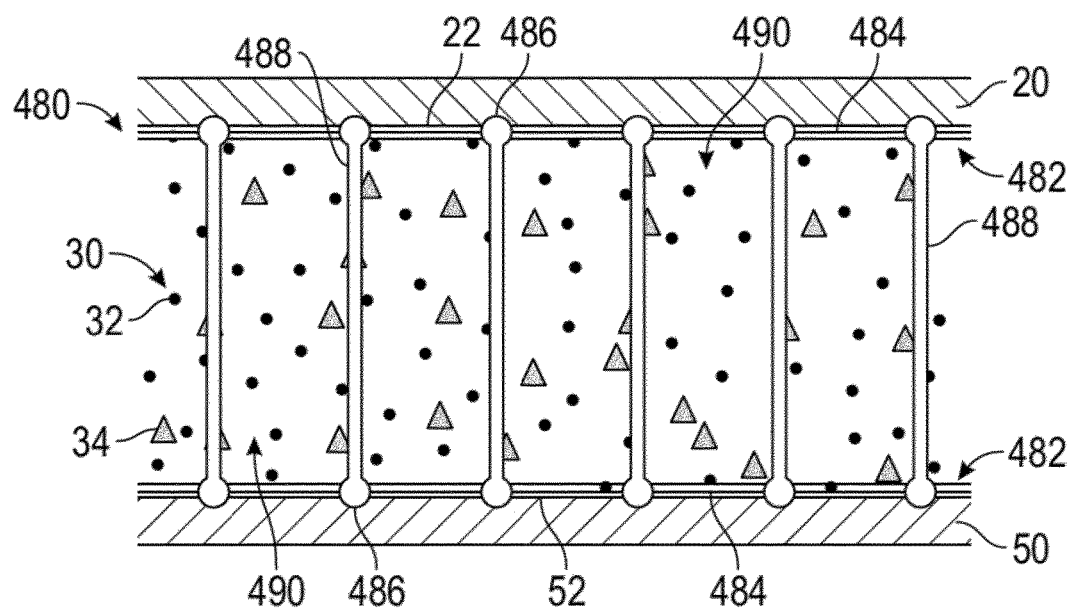

As shown in FIG. 21B, void spaces 490 are configured to receive and hold the constituents of cementitious mixture 30 such that cementitious mixture 30 is disposed within at least a portion of void spaces 490 of geogrid 480. According to an exemplary embodiment, cementitious mixture 30 is positioned within void spaces 490 using gravity, vibration, compaction, or any combination of gravity, vibration, and compaction. The extent that cementitious mixture 30 is compacted may be selected to provide a target ability of water to flow through cementitious mixture 30, time required for hydration, setting, and hardening of cementitious mixture 30, strength of cementitious composite 10, uniformity of the cementitious mixture 30, and/or the risk that cementitious material migrates through permeable layer 20.

As shown in FIG. 21B, geogrid 480 includes a first strand layer 482 (e.g., bottom strand layer, lower strand layer, etc.) and a second strand layer 482 (e.g., top strand layer, lower strand layer, etc.) separated by the length of struts 488. In one embodiment, struts 488 have a length of between five millimeters and one hundred millimeters, for example, fifteen millimeters. According to an exemplary embodiment, geogrid 480 is an independent structure of cementitious composite 10 that is selectively coupled (e.g., with an adhesive, a heat treatment process, a chemical reaction, an intermediate coupling material, etc.) to at least one of permeable layer 20 and impermeable layer 50. In some embodiments, cementitious composite 10 includes connectors 260 that extend through void spaces 490 of geogrid 480 (e.g., the structure layer includes a combination of geogrid 480 and connectors 260, etc.). As shown in FIG. 21B, the first strand layer 482 of geogrid 480 is positioned along inner side 52 of impermeable layer 50. According to an exemplary embodiment, first strand layer 482 of geogrid 480 is coupled (e.g., attached, joined, bonded, etc.) to inner side 52 of impermeable layer 50 using heat (e.g., heat welded, melted, bonded in a furnace, etc.), an adhesive, a chemical reaction, an intermediate coupling material, or still another process. In one embodiment, first strand layer 482 of geogrid 480 is coupled to inner side 52 of impermeable layer 50 prior to cementitious mixture 30 being deposited along impermeable layer 50 and within void spaces 490 of geogrid 480. In an alternative embodiment, geogrid 480 extends from (e.g., is integrally formed with, rises from, etc.) inner side 52 of impermeable layer 50.

As shown in FIG. 21B, the second strand layer 482 of geogrid 480 is positioned along inner side 22 of permeable layer 20. According to an exemplary embodiment, the second strand layer 482 of geogrid 480 is coupled (e.g., attached, joined, bonded, etc.) to inner side 22 of permeable layer 20 using heat (e.g., heat welded, melted, bonded in a furnace, etc.), an adhesive, a chemical reaction, an intermediate coupling material (e.g., double-sided tape, etc.), or still another process. In one embodiment, the second strand layer 482 of geogrid 480 is coupled to inner side 22 of permeable layer 20 after depositing cementitious mixture 30 along impermeable layer 50 and within void spaces 490 of geogrid 480. In an alternative embodiment, geogrid 480 extends from (e.g., is integral with, rises from, etc.) inner side 22 of permeable layer 20. In some embodiments, geogrid 480 includes one or more additional strand layers 482 disposed between the first and second strand layers 482. In one embodiment, the second strand layer 482 is cleaned (e.g., with pressurized air, with a brush, etc.) to remove cementitious material or other debris from nodes 486 and/or strands 484 of the second strand layer 482 prior to coupling. In another embodiment, cementitious mixture 30 is compacted within geogrid 480 (e.g., uniformly, evenly, etc.), thereby reducing the prevalence of cementitious material on the second strand layer 482.

According to an alternative embodiment, geogrid 480 does not include strand layers 482. By way of example, struts 488 may be arranged in a space frame or microlattice configuration, where each strut 488 connects at nodes 486 to other struts 488 to form a frame and/or truss arrangement. The nodes 486 that form the outer faces of geogrid 480 may be coupled to permeable layer 20 and/or impermeable layer 50.

According to another alternative embodiment, a strand layer 482 is coupled to at least one of top surface 466 and bottom surface 468 of grid 460. Coupling strand layer 482 to the top surface 466 and/or the bottom surface 468 of grid 460 may increase the frequency of points at which structure layer 440 is coupled to impermeable layer 50 and/or permeable layer 20, respectively, thereby increasing the bond strength between structure layer 440 and impermeable layer 50 and/or permeable layer 20. In one embodiment, strand layer 482 includes the same material as walls 462 of grid 460. In other embodiments, strand layer 482 includes a different material than walls 462 of grid 460. Strand layer 482 disposed along at least one of top surface 466 and bottom surface 468 of grid 460 may reduce the risk of cementitious mixture 30 migrating from cementitious composite 10 (e.g., by dividing cavities 464 into smaller cavities with strands 484, etc.). Strand layer 482 disposed along at least one of top surface 466 and bottom surface 468 of grid 460 may improve the tensile strength of grid 460 and cementitious composite 10 both before and after in-situ hydration.

According to an alternative embodiment, a coating may be disposed around at least a portion of structure layer 440. By way of example, the coating may be configured to improve various properties (e.g., strength, durability, etc.) of structure layer 440. As still a further example, the coating may improve the coupling strength of strands 484, struts 488, and/or walls 462 within structure layer 440, of structure layer 440 to permeable layer 20 and/or impermeable layer 50, and of structure layer 440 to cementitious mixture 30 after in-situ hydration. By way of example, the coating may include an abrasive coating (e.g., similar to that provided with a Scotch-Brite® scouring pad, etc.), a coating to provide resistance to ultraviolet light, a coating to protect strands 484, struts 488, and/or walls 462 from the cementitious materials (e.g., improved alkaline resistance), and/or still another known coating.

Tube Structure Layer

Figure 22A:
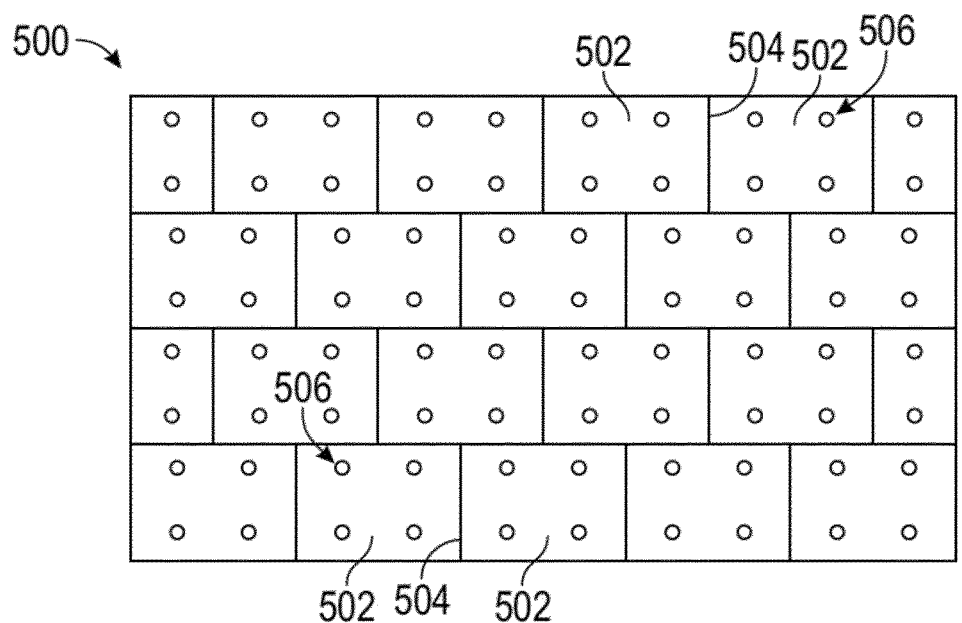
FIGS. 22A and 22B are various views of a finish layer for a cementitious composite, according to an exemplary embodiment.
Figure 22B:
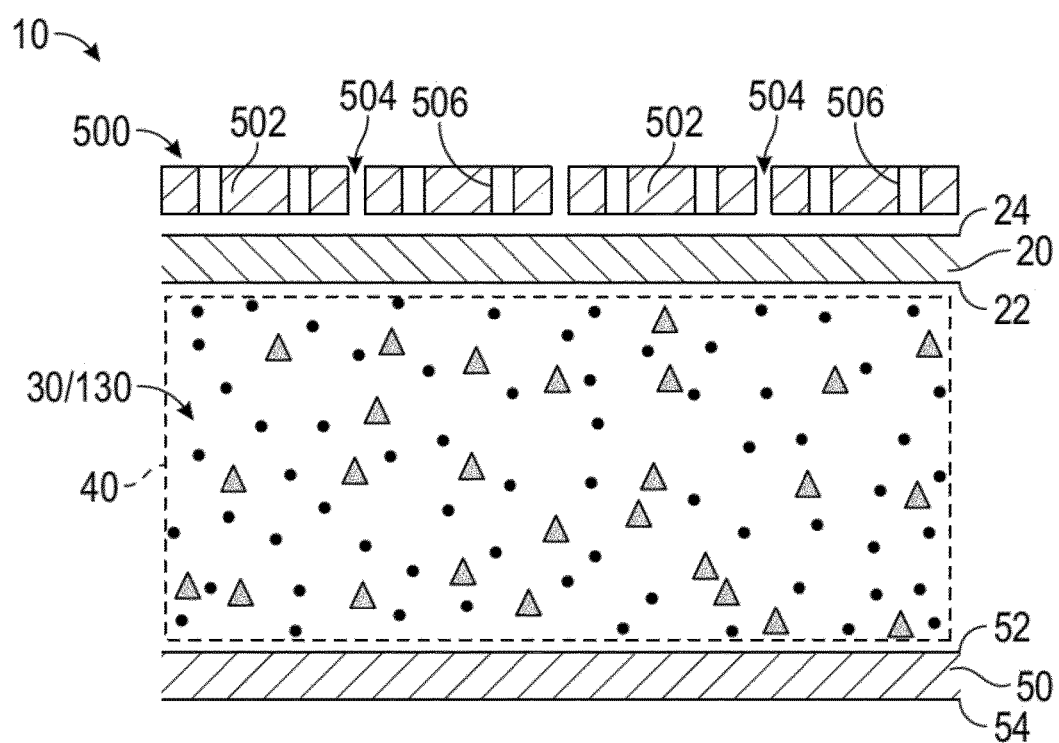
Figure 22C:
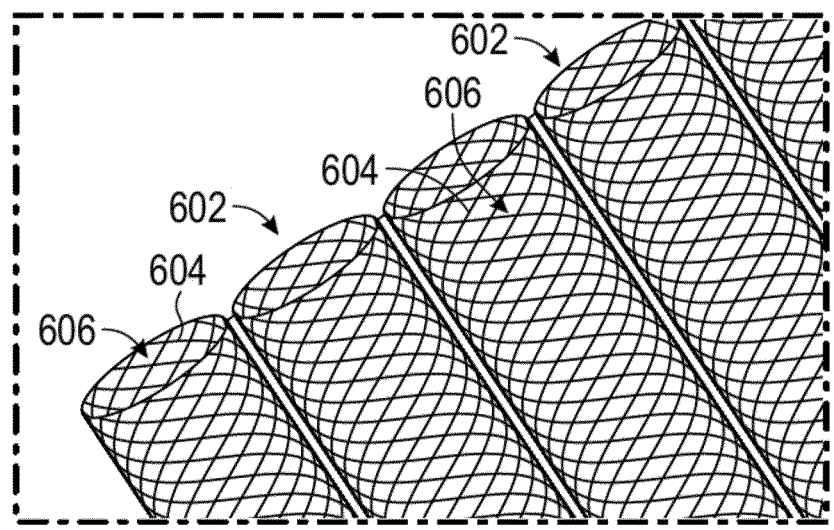
FIG. 22C is a schematic illustration of a tube layer for use with a cementitious composite, according to an exemplary embodiment.

According to the exemplary embodiment shown in FIG. 22C, cementitious composite 10 additionally or alternatively includes a fifth structure layer, shown as structure layer 600. As shown in FIG. 22C, structure layer 600 include a plurality of tubular members (e.g., hollow tubes, etc.), shown as tubes 602. In other embodiments, the structure layer 600 includes a plurality of wavy members. As shown in FIG. 22C, each of the tubes 602 have a wall, shown as sidewall 604, that defines a plurality of apertures, shown as apertures 606. Tubes 602 may thereby be permeable. In one embodiment, tubes 602 are manufactured from a permeable fabric. The permeable fabric may include woven or knitted fabrics. In another embodiment, tubes 602 are manufactured from a strand layer (e.g., similar to strands layer 482, etc.) to form a tubular grid (e.g., geogrid, etc.). According to an exemplary embodiment, tubes 602 may be arranged (e.g., in an orderly and/or structured fashion, etc.) to form an independent, self-supporting structure layer 600 (e.g., not woven with permeable layer 20 and/or impermeable layer 50, etc.). Permeable layer 20 and/or impermeable layer 50 may be coupled to ends of tubes 602 or along sidewall 604 of tubes 602.

3D Kitted/Woven Structure Layer

Figure 22D:
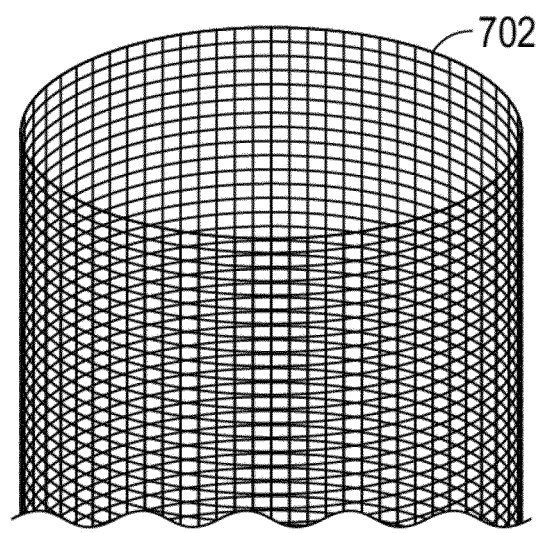
FIG. 22D is a schematic illustration of a three-dimensional ("3D") knitted/woven layer for use with a cementitious composite, according to an exemplary embodiment.

According to the exemplary embodiment shown in FIG. 22D, cementitious composite 10 additionally or alternatively includes a sixth structure layer, shown as structure layer 700. As shown in FIG. 22D, structure layer 700 includes a 3D woven or knitted structure, shown as net 702. Net 702 may be disposed between permeable layer 20 and impermeable layer 50. In one embodiments, net 702 is bunched between permeable layer 20 and impermeable layer 50. Permeable layer 20 and/or impermeable layer 50 may be coupled to the bunched net 702. In another embodiment, net 702 extends along the periphery of cementitious composite 10 (e.g., preventing cementitious mixture 30 from migrating therefrom, etc.).

Wave or Block Structure Layer

According to another exemplary embodiment, a grid and/or a fabric sheet (e.g., a woven fabric sheet, etc.) are pressed into a self-supporting structure layer having a wave or block sheet pattern. The wave or block sheet pattern may include one or more sheets. The one or more sheets may be or include a single material or a plurality of materials. The wave or block sheet pattern may define a plurality of peaks and valleys. The peaks may be coupled to one of permeable layer 20 and impermeable layer 50, and the valleys may be coupled to the other of permeable layer 20 and impermeable layer 50. The wave or block sheet pattern may be permeable.

Cementitious Mixture

Cementitious Mixture With Absorbent Material

According to the exemplary embodiment shown in FIGS. 4A-4C, 10A-14S, 17A, 17B, 21A, and 21B cementitious mixture 30 is disposed within at least a portion of (i) voids 44 of structure layer 40, (ii) between connectors 260, (iii) voids 348 of structure layer 340, and/or (iv) cavities 464 and/or void spaces 490 of structure layer 440. As shown in FIGS. 4A-4C, 10A-14S, 17A, 17B, 21A, and 21B, cementitious mixture 30 includes a mixture of constituents (e.g., materials, etc.), shown as cementitious materials 32. Cementitious materials 32 may include cement (e.g., Portland cement, Alumina cement, CSA cement, etc.) and/or supplementary cementitious materials (e.g., fly ash, silica fume, slag, metakaolin, other supplementary materials, etc.). Cementitious mixture 30 may further include aggregate materials or other filler particles (e.g., fine aggregates, coarse aggregates, sand, limestone, non-absorbent materials, etc.), shown as aggregates 34. In one embodiment, aggregates 34 are uniformly (e.g., evenly, etc.) distributed throughout cementitious mixture 30. In other embodiments, aggregates 34 are non-uniformly (e.g., randomly, unevenly, etc.) distributed throughout cementitious mixture 30. Aggregates 34 may have sizes between greater than thirty mesh (i.e., 595 microns) and less than five mesh (i.e., 4000 microns). In some embodiments, aggregates 34 have sizes between three-hundred mesh (i.e., 50 microns) and thirty mesh. The size of aggregates 34 may be selected to create a desired size and amount of void space within cementitious mixture 30. The size and amount of void space within cementitious mixture 30 may directly affect water flow during in-situ hydration of cementitious composite 10.

In some embodiments, cementitious mixture 30 includes additives (e.g., fibers, plasticizers, accelerators, retarders, viscosity modifiers, absorbers, water reducers, etc.). Such additives may be used to improve the mechanical properties (e.g., strength, setting time, curing requirements, thermal coefficient of expansion, permeability, acid resistance, etc.) or durability, among other characteristics, of the cementitious mixture 30 and/or may be used as a substitute for a portion of cementitious materials 32. According to an exemplary embodiment, the additives include a pozzolonic material (e.g., fly ash, bottom ash, silica fume, slag, metakaolin, etc.) added at a specified mix ratio.

As shown in FIGS. 4A-4C, cementitious mixture 30 includes an absorbent material, shown as absorbent material 36. According to an exemplary embodiment, absorbent material 36 is configured to absorb water and expand during in-situ hydration to lock cementitious materials 32 and/or aggregates 34 in place (e.g., increases the stability and/or viscosity of cementitious mixture 30 within structure layer 40, connection layer 240, structure layer 340, structure layer 440, etc.) to prevent washout of cementitious mixture 30 from cementitious composite 10 during hydration. Absorbent material 36 may thereby facilitate applying and topically hydrating cementitious composite 10 on slopes (e.g., hillsides, ditches, etc.) without the risk of washing out cementitious mixture 30 from the structure layer during hydration. Absorbent material 36 may additionally or alternatively improve curing of cementitious composite 10 by providing or releasing water from within cementitious mixture 30 during the curing process. Improving the curing of cementitious composite 10 may improve (e.g., increase, maximize, etc.) the strength thereof (e.g., up to double that of a cementitious composite having a mix that does not include absorbent material, etc.). Absorbent material 36 may additionally or alternatively improve one or more post-hydration and post-cure properties of cementitious composite 10 (e.g., abrasion resistance, flexural strength, puncture strength, compressive strength, etc.). Absorbent material 36 may additionally or alternatively hold water to reduce evaporation, release water over a period of time, and/or control the water to cement ratio.

According to an exemplary embodiment, cementitious mixture 30 includes approximately 0.001-5% (e.g., by weight, by volume, etc. of cementitious mixture 30) of absorbent material 36. Absorbent material 36 may include particles, pellets, powder, fiber, a membrane, microbeads, etc. In some embodiments, absorbent material 36 includes an absorbent material configured to absorb between 0.001 and 1 times its weight in water. In some embodiments, absorbent material 36 includes a superabsorbent material configured to absorb between 1 and 1000 times its weight in water. In one embodiment, the superabsorbent material is configured to absorb between 75 and 300 times its weight in water, for example approximately 200 times its weight in water. The superabsorbent material may include a superabsorbent polymer (SAP). The SAP may include sodium polyacrylate, poly-acrylic acid sodium salt, polyacrylamide copolymer, ethylenemaleic anhydride copolymer, cross-linked carboxymethylcellulose, polyvinyl alcohol copolymers, cross-linked polyethylene oxide, and/or starch grafted copolymer of polyacrylonitrile, among other possible SAPs. The superabsorbent material may additionally or alternatively include a superabsorbent clay (e.g., to form a SAP composite (SAPC), etc.). The superabsorbent clay may include montmorillonite and/or other substances used to create a SAPC.

According to an exemplary embodiment, absorbent material 36 has a particle size that may range from 1 micron to 5000 microns. In one embodiment, the majority of absorbent material 36 has a particle size between 90 microns and 300 microns at a specified mix ratio. By way of example, the specified mix ratio of absorbent material 36 may include 0-30% of particles having a size less than 90 microns (e.g., approximately 7%, etc.), 10-60% of particles having a size between 90-150 microns (e.g., approximately 37%, etc.), 25-80% of particles having a size between 150-300 microns (e.g., approximately 56%, etc.), and 0-30% of particles having a size greater than 300 microns (e.g., approximately 0%, etc.). Applicant has discovered that larger particles of absorbent material 36 (e.g., particles having a size greater than 150 microns, etc.) provide improved washout resistance relative to smaller particles of absorbent material 36 (e.g., particles less than 150 microns, etc.). By way of example, the larger particles may absorb water more quickly and form a gel-like substance during and/or post-hydration that locks cementitious materials 32 and aggregates 34 within structure layer 40, connection layer 240, structure layer 340, and/or structure layer 440 of cementitious composite 10 to prevent washout thereof. Quicker absorption of water may be advantageous as cementitious composite 10 may be topically hydrated quickly, on a slope, and/or at a relatively high pressure. Applicant has also discovered that the smaller particles of absorbent material 36 improve the curing process of cementitious composite 10 (e.g., increasing the strength thereof, etc.). Applicant has also discovered that smaller particles create a finer, less abrasive material after hydration with lower permeability.

In some embodiments, cementitious mixture 30 includes lime (e.g., hydrated lime, etc.). By way of example, cementitious mixture 30 may include absorbent material 36, lime, or both absorbent material 36 and lime. Applicant has discovered that lime stiffens and sets quickly (e.g., almost instantaneously with the proper mix ratios of lime) relative to one or more other constituents of cementitious mixture 30. Applicant has further discovered that the quick-setting lime locks one or more of the other constituents of cementitious mixture 30 in place, thereby reducing washout of cementitious mixture 30 during hydration. According to an exemplary embodiment, cementitious mixture 30 includes approximately 0.01 to greater than 30% (e.g., by weight of cementitious mixture 30) of lime. In one embodiment, cementitious mixture 30 includes approximately 2-5% (e.g., by weight of cementitious mixture 30) of lime.

In some embodiments (e.g., embodiments in which cementitious mixture includes lime, etc.), cementitious mixture 30 includes fibers (e.g., fine fibers, etc.). In other embodiments, fibers may be used in combination with the absorbent material 36 in cementitious mixture 30 without the addition of lime. The fibers may advantageously reduce cracking of cementitious composite 10. According to an exemplary embodiment, cementitious mixture 30 includes fibers having sizes between 0.05 millimeters (mm) and 20 mm. Applicant has discovered that fibers sized less than 1 mm have the greatest impact on crack prevention. According to an exemplary embodiment, cementitious mixture 30 includes approximately 0.05-2.5% (e.g., by weight of cementitious mixture 30) of fibers. In other embodiments, cementitious mixture 30 has a greater or lesser amount of fibers. The fibers may be manufactured from a synthetic material (e.g., polypropylene, polyethylene, nylon, glass, polyester, acrylic, aramid, etc.) and/or natural material (e.g., cellulose fiber, coconut fiber, grass, etc.). The fibers may be a monofilament, fibrillated, and/or have another structure. According to an exemplary embodiment, cementitious mixture 30 having lime, fibers, and/or absorbent material 36 provides improved performance of cementitious composite 10 in terms of increased washout prevention, decreased cracking, improved curing, increased strength (e.g., ultimate strength, flexural strength, puncture strength, compressive strength, etc.), etc.

According to an exemplary embodiment, the materials of cementitious mixture 30 are mixed together and thereafter disposed along or between impermeable layer 50 and/or permeable layer 20. In one embodiment, cementitious mixture 30 is positioned (i) within voids 44 of structure layer 40, (ii) between connectors 260 of connection layer 240, (iii)

within voids 348 of structure layer 340, and/or (iv) within cavities 464 and/or void spaces 490 of structure layer 440 using gravity, vibration, and/or compaction. According to an exemplary embodiment, cementitious materials 32, aggregates 34, and/or absorbent material 36 of cementitious mixture 30 substantially fill voids 44, the space between connectors 260, voids 348, cavities 464, and/or void spaces 490. Cementitious mixture 30 may be disposed into structure layer 40, connection layer 240, structure layer 340, and/or structure layer 440 and along impermeable layer 50 with a uniform thickness (e.g., 0.25", 0.5", 0.75", etc.). In some embodiments, permeable layer 20 is disposed along cementitious mixture 30 before compaction such that cementitious mixture 30 is compressed between permeable layer 20 and impermeable layer 50. The compression may be applied to facilitate even distribution of the constituents (e.g., absorbent material 36, aggregates 34, cementitious materials 32, additives, etc.) within cementitious mixture 30 and/or affect the sizing of the void space within cementitious mixture 30. Compaction may be facilitated or replaced with vibration. The compression may also increase the structural performance of the cementitious mixture 30 post-hydration. The extent that cementitious mixture 30 is compacted may impact the risk of cementitious mixture 30 washing out from cementitious composite 10 (e.g., reduce the risk of washout, etc.), the ability of water to flow through cementitious mixture 30, the time required for hydration, setting, and hardening of cementitious mixture 30, the strength of cementitious composite 10, and/or the risk of cementitious materials 32, aggregates 34, and/or absorbent materials 36 migrating out of cementitious composite 10. In some embodiments, an absorbent material (e.g., absorbent material 36, etc.) is additionally or alternatively coupled to, sprayed onto, bonded to, and/or otherwise attached to (e.g., integrally formed with, etc.) permeable layer 20, structure layer 40, connection layer 240, structure layer 340, structure layer 440, and/or impermeable layer 50. The absorbent material may improve (e.g., further improve, etc.) curing of cementitious mixture 30.

According to an exemplary embodiment, cementitious mixture 30 includes materials (e.g., cementitious materials 32, etc.) that set and harden once exposed to a fluid (e.g., water, etc.) through a hydration process. According to an exemplary embodiment, cementitious mixture 30 is disposed and/or compressed between permeable layer 20 and impermeable layer 50, and undergoes a normal setting and hardening process after in-situ hydration. The setting process may begin once cementitious mixture 30 interacts with a fluid (e.g., water, etc.). Such hydration and setting processes change cementitious mixture 30 from a flexible to a rigid material. While setting produces a rigid material, curing may improve the strength of cementitious composite 10. According to an exemplary embodiment, cementitious mixture 30 has a compressive strength of up to ten thousand or more pounds per square inch. According to an alternative embodiment, cementitious mixture 30 is modified with high performance cementitious ingredients and additives to achieve strength values in excess of ten thousand pounds per square inch.

According to an exemplary embodiment, water is added to cementitious mixture 30 to initiate the hydration processes. An operator may topically apply water to the surface of cementitious composite 10 in-situ to hydrate cementitious mixture 30. In some embodiments, cementitious composite 10 accommodates hydration even when positioned on a horizontal, positioned at an angle, or positioned over a curved surface without undermining the strength of cementitious composite 10. According to an exemplary embodiment, cementitious composite 10 may be hydrated even if positioned at up to a 90 degree angle relative to level. In these or other embodiments, cementitious mixture 30 may set without segregating from cementitious composite 10. In embodiments where permeable layer 20 does not dissolve quickly, cementitious composite 10 may be hydrated in an inverted position. By way of example, cementitious composite 10 may be implemented in a tunnel application where the cementitious composite 10 is used to form the walls and/or ceiling of the tunnel.

The characteristics of the hydrated cementitious composite 10 may be affected by at least one of (i) the particle size of absorbent material 36, aggregates 34, and/or cementitious materials 32 of cementitious mixture 30 and (ii) the size, shape, diameter, material composition, pattern, structure (e.g., bunching, nonwoven, not woven, grid, interconnecting particles, connectors, etc.) of the structure layer (e.g., structure layer 40, connection layer 240, structure layer 340, structure layer 440, etc.). By way of example, particle size and density may affect the homogeneity of cementitious mixture 30 thereby impacting various properties (e.g., strength, flexibility, etc.) of cementitious composite 10. According to an exemplary embodiment, cementitious materials 32 of cementitious mixture 30 have an approximately equal particle size (e.g., within 150 microns, etc.). According to an alternative embodiment, cementitious materials 32 of cementitious mixture 30 may have different sizes (e.g., a variation of more than 150 microns, etc.) that vary between 0.5 and 450 microns. A cementitious mixture 30 having differentially-sized particles may improve packing and reduce open space within cementitious mixture 30, as well as substantially fill voids 44 of structure layer 40, space between connectors 260, voids 348 of structure layer 340, cavities 464 of structure layer 440, and/or void spaces 490 of structure layer 440.

According to an exemplary embodiment, cementitious mixture 30 is cured using an external curing process. By way of example, such external curing may include water ponding. According to various alternative embodiments, the external curing process includes water spraying, wet burlap, sheeting, curing compounds, absorbent sands, and accelerated curing, among other known methods. In some embodiments, permeable layer 20 is formed of a hydrophilic material (e.g., paper, cellulose based materials, etc.) that may improve curing by holding water to prolong exposure of cementitious mixture 30 to a fluid. In some embodiments, permeable layer 20 includes a water soluble material which holds water and only dissolves with warm or hot water (e.g., greater than 70, 80, 90, 100, 110, 120, 130, etc. degrees Fahrenheit, etc.). Such a permeable layer 20 may thereby hold water for a desired period of time while hydrating cementitious mixture 30 and may thereafter be removed (e.g., disintegrated, detached, etc.) using warm or hot water. According to an alternative embodiment, permeable layer 20 is formed of a coating material having fewer apertures to improve curing by reducing the evaporation of water from cementitious mixture 30.

According to still another alternative embodiment, cementitious mixture 30 is cured using an internal curing process. According to an exemplary embodiment, cementitious mixture 30 is cured using internal water curing where cementitious mixture 30 includes a component that serves as a curing agent to the cementitious mixture. Such a component may include either absorbent material 36, an aggregate, or a new component (e.g. an additive, superabsorbent polymer, special aggregate, etc.) introduced into cementitious mixture 30 during the manufacturing process. Further, hydrophilic additives (e.g., absorbent material 36, superabsorbent polymers, etc.) may improve curing by facilitating the ingress of water within cementitious mixture 30. According to an alternative embodiment, structure layer 40, connection layer 240, structure layer 340, and/or structure layer 440 are hydrophilic (e.g., absorbent, etc.) and facilitates the absorption of water into cementitious mixture 30.

In some embodiments, cementitious mixture 30 includes interconnection particles (e.g., beads, pellets, strands, etc.; made of a resin, a polymer, elastomeric polymer, PVC, polypropylene, polyethylene, a metal or metal alloy having a low melting point, etc.) that form an interconnected layer, i.e., similar to structure layer 40, after activation (e.g., heating, etc.). The interconnected layer may reinforce the cementitious mixture 30 post-hydration, reducing crack propagation and improving the strength of the cementitious composite 10. The interconnection particles may be configured to melt, fuse, or otherwise deform (e.g., expand, etc.) in response to activation. By way of example, the interaction particles may melt during an application of heat to cementitious composite 10 (i.e., a heat treatment process) with an activation system (e.g., a heating system, etc.). The activation may cause the interaction particles (e.g., in proximity to one another before activation, etc.) to fuse or otherwise join together at bonding locations. The interconnection particles may melt, expand, or otherwise change shape to form structure layer 40 (e.g., a web, a nonwoven layer, a not woven layer, an interconnected layer, etc.). Structure layer 40 may have structural strands post-activation (e.g., upon cooling, etc.). Heating systems may provide thermal energy to cementitious composite 10 (e.g., directly or indirectly to cementitious mixture 30, permeable layer 20, impermeable layer 50, etc.) to increase the temperature of cementitious composite 10 or portions thereof above the melting point of the interconnecting particles such that the interconnecting particles melt and/or expand to form structure layer 40.

Cementitious Mixture With Interconnection Particles

In some embodiments, cementitious composite 10 additionally or alternatively includes a second cementitious mixture. According to the exemplary embodiment shown in FIGS. 5-7D, cementitious composite 10 includes a second cementitious mixture, shown as cementitious mixture 130. According to an exemplary embodiment, cementitious mixture 130 eliminates the need for a structure layer (e.g., structure layer 40, connection layer 240, structure layer 340, structure layer 440, etc.). However, cementitious mixture 130 may be used in combination with a structure layer (e.g., structure layer 40, connection layer 240, structure layer 340, structure layer 440, etc.). As shown in FIGS. 6A-7D, cementitious mixture 130 includes a mixture of constituents (e.g., materials, etc.), shown as cementitious materials 136. Cementitious materials 136 may include cement (e.g., Portland cement, etc.) and/or supplementary cementitious materials (e.g., fly ash, silica fume, slag, metakaolin, etc.). Cementitious mixture 130 includes interconnection particles, shown as beads 132, that form an interconnected layer after activation. In some embodiments, cementitious mixture 30 includes beads 132. The interconnected layer reinforces the cementitious mixture 130 post-hydration, reducing crack propagation and improving the strength of the cementitious composite 10. In one embodiment, beads 132 are uniformly (e.g., evenly, etc.) distributed throughout cementitious mixture 130. In other embodiments, beads 132 are non-uniformly (e.g., randomly, unevenly, etc.) distributed throughout cementitious mixture 130. In one embodiment, cementitious mixture 130 includes between five and twenty percent beads 132 by weight. In other embodiments, cementitious mixture 130 includes more than twenty percent beads 132 by weight. According to an exemplary embodiment, beads 132 have a size between one and four hundred microns. In other embodiments, beads 132 have a size greater than 400 microns. According to an exemplary embodiment, beads 132 include a polymeric material (e.g., a resin, a polymer, elastomeric polymer, PVC, polypropylene, polyethylene, etc.). In other embodiments, beads 132 include a metal (e.g., a metal or metal alloy having a low melting point, etc.). In one embodiment, beads 132 are spherical in shape. In other embodiments, beads 132 have a fibrous shape and may have a length between one-hundredth of a millimeter and twenty millimeters. Beads 132 having a fibrous shape may have multiple fiber extensions extending from a main body of each bead 132. In still other embodiments, beads 132 are still otherwise shaped (e.g., cylindrical, pellet-shaped, square, ellipsoidal, pill-shaped, etc.).

As shown in FIGS. 6A-7D, cementitious mixture 130 includes aggregate materials or other filler particles or additives (e.g., fine aggregates, coarse aggregates, sand, limestone, shrinking additives, disintegrating additives, porous additives, heat-sensitive products, etc.), shown as aggregates 134. In one embodiment, aggregates 134 are uniformly (e.g., evenly, etc.) distributed throughout cementitious mixture 130. In other embodiments, aggregates 134 are non-uniformly (e.g., randomly, unevenly, etc.) distributed throughout cementitious mixture 130. Aggregates 134 may have varying sizes ranging from less than thirty mesh (i.e., 595 microns) to greater than five mesh (i.e., 4000 microns). The size and shape of void space within cementitious mixture 130 may be related to the size and shape of the constituents thereof. According to an exemplary embodiment, the sizes of aggregates 134 are selected to create a desired size and/or amount of void space, shown as voids 138, within cementitious mixture 130. The size and amount of voids 138 within cementitious mixture 130 may directly affect water flow during in-situ hydration of cementitious composite 10. The size and amount of voids 138 may additionally or alternatively directly impact the shape of the interconnected layer formed by beads 132.

In some embodiments, cementitious mixture 130 includes additives (e.g., fibers, plasticizers, accelerators, retarders, super absorbent polymers, viscosity modifiers, etc.). Such additives may be used to improve the mechanical properties (e.g., strength, setting time, curing requirements, thermal coefficient of expansion, etc.) or durability, among other characteristics, of the cementitious mixture 130 or may be used as a substitute for a portion of cementitious materials 136. According to an exemplary embodiment, the additive includes a pozzolonic material (e.g., fly ash, bottom ash, silica fume, slag, metakaolin, etc.) added at a specified mix ratio.

According to an exemplary embodiment, the mixture of materials of cementitious mixture 130 is mixed together and thereafter disposed along or between impermeable layer 50 and/or permeable layer 20. In one embodiment, cementitious mixture 130 is disposed along impermeable layer 50 with a uniform thickness (e.g., 0.25", 0.5", 0.75", etc.). In some embodiments, cementitious mixture 130 is compressed onto impermeable layer 50. In other embodiments, permeable layer 20 is disposed along cementitious mixture 130 before compaction such that cementitious mixture 130 is compressed between permeable layer 20 and impermeable layer 50. The compression may be applied to facilitate even distribution of the constituents (e.g., beads 132, aggregates 134, cementitious materials 136, additives, etc.) within cementitious mixture 130 and/or vary the size and/or shape of voids 138 within cementitious mixture 130. Compression may be facilitated or replaced with vibration. The compression may also increase the structural performance of the cementitious mixture 130 post-hydration. The extent that cementitious mixture 130 is compacted may impact the ability of water to flow through cementitious mixture 130, the time required for hydration, setting, and hardening of cementitious mixture 130, the strength of cementitious composite 10, and/or the risk of cementitious mixture 130 migrating through permeable layer 20.

As shown in FIGS. 6A-7D, beads 132 are configured to melt, fuse, or otherwise deform (e.g., expand, etc.) in response to activation. By way of example, beads 132 may melt during an application of heat to cementitious composite 10 (i.e., a heat treatment process) with an activation system, shown as heating system 150. By way of another example, beads 132 may expand during an application of heat in one or more directions. Beads 132 may be oriented a certain way such that the expansion thereof creates a target final structure (e.g., expanded portions of beads 132 may protrude into adjacent voids and/or openings within cementitious mixture 130, etc.). As shown in FIGS. 6C-6E, the activation causes beads 132 (e.g., beads 132 in proximity to one another before activation, etc.) to fuse or otherwise join together at bonding locations, shown as interconnection points 144. Beads 132 may melt, expand, or otherwise change shape to form a structural layer (e.g., a web; an interconnected layer; a nonwoven, not woven, fiberless, nonfibrous, etc. layer), shown as interconnecting structure 140. Interconnecting structure 140 has structural strands, shown as strands 148, post-activation (e.g., upon cooling, etc.). Heating systems 150 may provide thermal energy to cementitious composite 10 (e.g., directly or indirectly to cementitious mixture 130, permeable layer 20, impermeable layer 50, etc.) to increase the temperature of cementitious composite 10 or portions thereof above the melting point of beads 132 such that beads 132 melt and/or expand to form interconnecting structure 140. In one embodiment, the melting point of beads 132 is between three hundred and five hundred degrees Fahrenheit. In other embodiments, the melting point of beads 132 is less than three hundred degrees Fahrenheit or more than five hundred degrees Fahrenheit. In still another embodiment, the material of beads 132 is selected to have a melting point of less than or equal to the melting point of permeable layer 20 and/or impermeable layer 50.

Strands 148 of interconnecting structure 140 may have varying densities throughout cementitious mixture 130 (e.g., based on the number of beads 132 in a given area of cementitious mixture 130, etc.). The thickness, density, shape, and/or quality of strands 148 may be related to the shape and size of voids 138, which are themselves related to at least the amount and size of aggregates 134 and the compressive force applied to cementitious composite 10. According to an exemplary embodiment, larger aggregates 134 are included within cementitious mixture 130 to create larger voids 138 to facilitate greater movement of the melted or expanding beads 132 within cementitious mixture 130 when forming interconnecting structure 140.

Figure 6A:
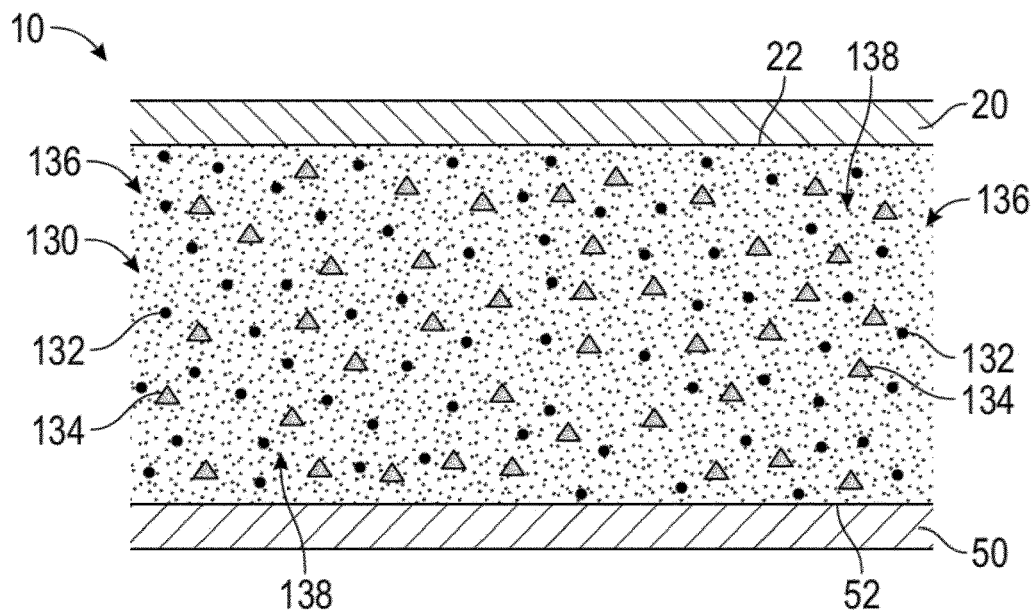
FIG. 6A is a schematic cross-sectional view of the cementitious composite of FIG. 5 prior to activation, according to an exemplary embodiment.
Figure 6B:
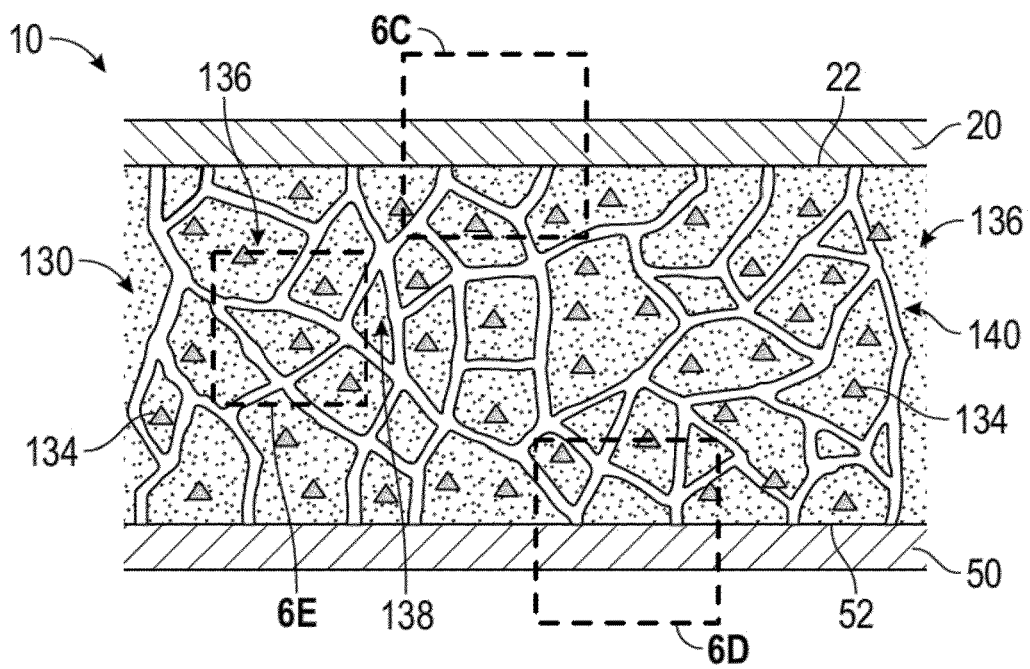
FIG. 6B is a schematic cross-sectional view of the cementitious composite of FIG. 5 following activation, according to an exemplary embodiment.
Figure 6C:
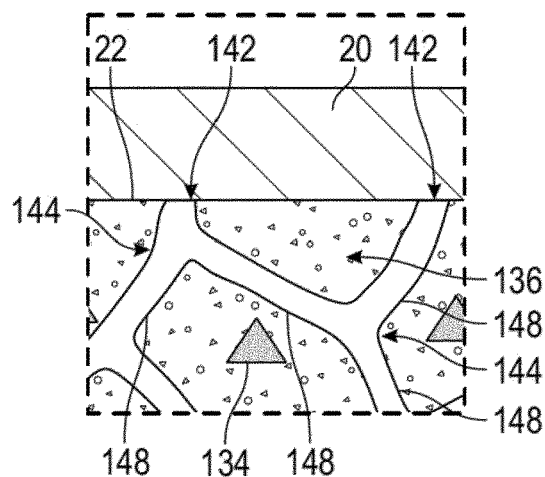
FIGS. 6C-6G are schematic detailed cross-sectional views of the cementitious composite of FIG. 6B, according to an exemplary embodiment.
Figure 6D:
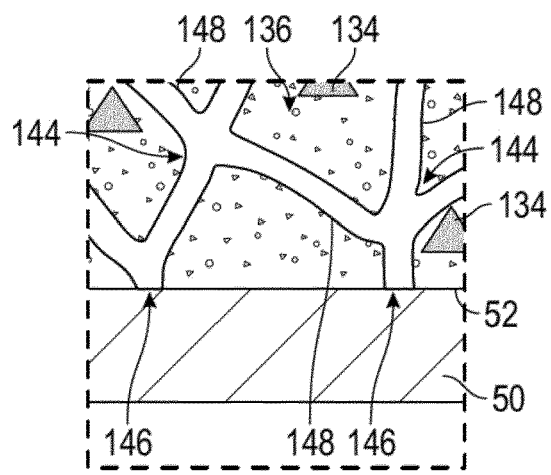
Figure 6E:
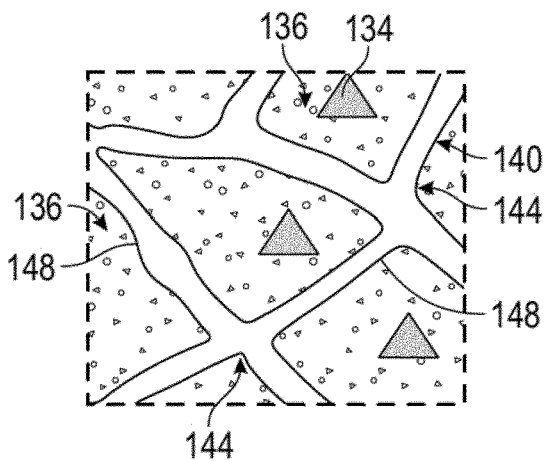
Figure 6F:
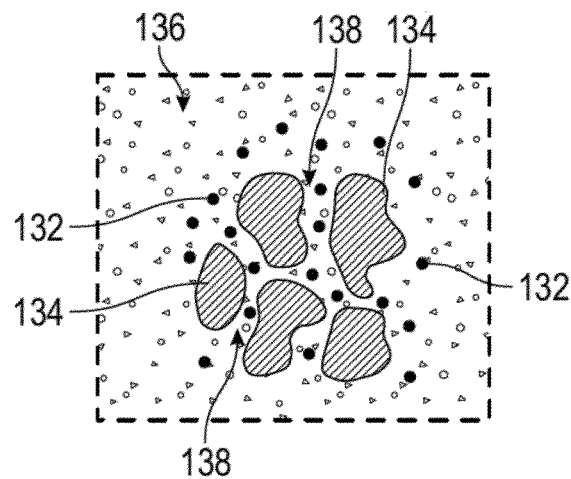
Figure 6G:
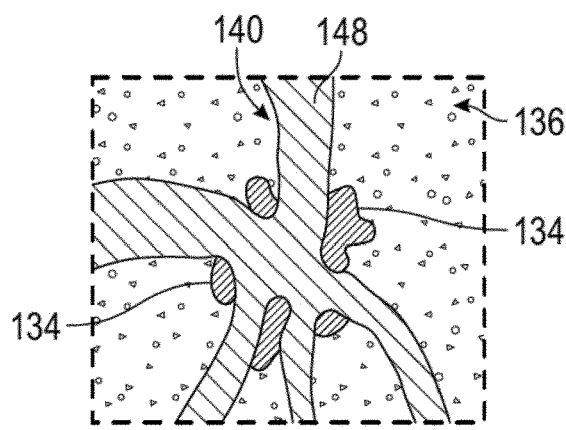

In some embodiments, aggregates 134 are reactive to heat such that aggregates 134 disintegrate and/or shrink to create channels (e.g., expand voids 138, etc.) within cementitious mixture 130 during an activation process (e.g., heating process, etc.). The channels within cementitious mixture 130 may provide a passage for beads 132, post-activation, to melt, expand, and/or otherwise deform to form interconnecting structure 140. Aggregates 134 may include a heat sensitive and/or reactive material that heats and/or otherwise burns at a relatively low temperature (e.g., relative to beads 132, permeable layer 20, impermeable layer 50, etc.; 150, 180, 200, 250, 300, etc. degrees Fahrenheit; etc.). As shown in FIG. 6F, aggregates 134 have a first size (e.g., pre-activation size, etc.). The size of voids 138 between aggregates 134 pre-activation may relate to the selected size of aggregates 134, the compressive force applied to cementitious mixture 130, and/or the quantity of aggregates 134 relative to beads 132 and/or cementitious materials 136. As shown in FIG. 6G, aggregates 134 have a second size (e.g., post-activation size, etc.) after an activation process (e.g., a heating process, etc.). The size of voids 138 between aggregates 134 post-activation may relate to the selected size of aggregates 134, a designed shrinkage amount of aggregates 134, the compressive force applied to cementitious mixture 130, and/or the quantity of aggregates 134 relative to beads 132 and/or cementitious materials 136. Such reactive aggregates may have a designed shrinkage amount resulting from activation that facilitates increased flow (or expansion) of the activated beads 132 within voids 138. The designed shrinkage amount of aggregates 134 may range from 1% to 99% shrinkage (e.g., 20%, 40%, 60%, 90%, etc.) from the initial, first size of aggregates 134. In other embodiments, such reactive aggregates 134 may disintegrate when activated. In some embodiments, beads 132 include an expansive additive such that beads 132 expand when activated (e.g., heated, etc.) to better fill voids 138 of cementitious mixture 130. In some embodiments, cementitious mixture 130 includes additives that are heat conductive (e.g., slag, metal fibers, other fine melts, etc.) to increase heat transfer through the interior of cementitious mixture 130 to melt, expand, or otherwise deform beads 132. In some embodiments, compression is applied to cementitious composite 10 during the application of heat to reduce activation-induced deformation of cementitious composite 10 (e.g., due to thermal expansion, etc.). In some embodiments, compression is increased as beads 132 melt, expand, or otherwise deform. Compression may control the expansion of beads 132.

According to an exemplary embodiment, interconnecting structure 140 forms a structure layer that supports (e.g., holds, contains, reinforces, etc.) cementitious mixture 130. By way of example, strands 148 of interconnecting structure 140 may physically support cementitious mixture 130 (e.g., by filling voids 138, by forming around the constituent particles of cementitious mixture 130, etc.). The size, shape, orientation, and/or quantity of beads 132 that form strands 148 may be designed to provide target structural properties and/or hydration characteristics of cementitious composite 10. By way of example, fewer voids 138 may produce a greater density of strands 148 and improve the strength of cementitious mixture 130 but make it harder to hydrate.

According to an exemplary embodiment, strands 148 of interconnecting structure 140 attach to at least one of permeable layer 20 and impermeable layer 50 as a result of activation. By way of example, heat may be applied to cementitious composite 10 when cementitious mixture 130 is disposed on top of impermeable layer 50, and strands 148 of interconnecting structure 140 attach to impermeable layer 50. By way of another example, heat may be applied to cementitious composite 10 when cementitious mixture 130 is disposed between permeable layer 20 and impermeable layer 50, and strands 148 of interconnecting structure 140 may form therebetween and attach to permeable layer 20 and impermeable layer 50 (e.g., thereby coupling permeable layer 20 and impermeable layer 50 together, etc.). According to an exemplary embodiment, interconnecting structure 140 is a nonwoven layer such that the formation of interconnecting structure 140 within cementitious mixture 130 creates a nonwoven cementitious composite 10.

As shown in FIGS. 6B-6D and 7A-7D, strands 148 of interconnecting structure 140 may attach to inner side 22 of permeable layer 20 at bonding points, shown as bonding points 142, and/or inner side 52 of impermeable layer 50 at bonding points, shown as bonding points 146. Strands 148 may fuse to or into permeable layer 20 and/or impermeable layer 50. By way of example, at least one of permeable layer 20 and impermeable layer 50 may have a braided, etched, or otherwise roughened surface to receive the material of beads 132 to form bonding points 142 and/or bonding points 146. In some embodiments, inner side 22 of permeable layer 20 includes fibrous elements extending therefrom. The fibrous elements along inner side 22 of permeable layer 20 may have a density that facilitates increased bonding between permeable layer 20 and strands 148 of interconnecting structure 140 at bonding points 142. In some embodiments, inner side 52 of impermeable layer 50 includes fibrous elements extending therefrom. The fibrous elements along inner side 52 of impermeable layer 50 may have a density that facilitates increased bonding between impermeable layer 50 and strands 148 of interconnecting structure 140 at bonding points 146.

The frequency at which bonding points 142 between strands 148 and inner side 22 of permeable layer 20 occur, bonding points 146 between strands 148 and inner side 52 of impermeable layer 50 occur, and/or the frequency at which interconnection points 144 between proximate strands 148 occur (e.g., the frequency of bonding, etc.) may be related to at least one of the composition of cementitious mixture 130 (e.g., percentage of beads 132, aggregates 134, cementitious materials 136, etc.), the size of aggregates 134, the amount of heat applied to cementitious composite 10, an expansion coefficient of beads 132, and the compressive force applied to cementitious composite 10 prior to and/or during activation, particularly where such factors impact the size and/or shape of voids 138. The frequency of bonding may thereby vary from, for example, ten bonding points per square inch to ten bonding points per one-tenth of a square inch. The thickness of and/or the frequency of bonding of strands 148 to permeable layer 20 and/or impermeable layer 50 maintains a high peel strength (e.g., strength of the bond between strands 148 and permeable layer 20 and/or impermeable layer 50, etc.) such that permeable layer 20 and/or impermeable layer 50 remain attached thereto.

As shown in FIGS. 7A-7D, various heating systems 150 and methods may be used to heat treat cementitious composite 10 to melt, cool, or deform beads 132 to form interconnecting structure 140. Heating systems 150 may include one or more heating and/or cooling elements. In other embodiments, still other systems are used to activate beads 132. Heating system 150 may provide thermal energy to at least one of cementitious mixture 130, a second side of permeable layer 20, shown as outer side 24, and a second side of impermeable layer 50, shown as outer side 54. In one embodiment, heating system 150 includes a first heating element (e.g., an upper heating element, etc.) and a second heating element (e.g., a lower heating element, etc.). The first heating element may apply heat directly to permeable layer 20 (i.e., and indirectly to cementitious mixture 130 due to conduction) or directly to cementitious mixture 130 (e.g., if permeable layer 20 is omitted or coupled to cementitious mixture 130 following heat treatment, etc.). The second heating element may apply heat directly to impermeable layer 50 (i.e., and indirectly to cementitious mixture 130 due to conduction). In other embodiments, heating system 150 includes either the first heating element or the second heating element such that either (i) the permeable layer 20 or cementitious mixture 130 is directly heated by the first heating element or (ii) the impermeable layer 50 is directly heated by the second heating element. In an alternative embodiment, heating system 150 is configured to heat cementitious mixture 130 internally. According to an exemplary embodiment, heating system 150 is configured to apply heat to cementitious composite 10 for a period of time (e.g., twenty seconds, two minutes, five minutes, etc.) to heat beads 132 above their melting point to thereby form interconnecting structure 140 within cementitious mixture 130 and attach interconnecting structure 140 to at least one of permeable layer 20 and impermeable layer 50. The activation process may be continuous (e.g., a conveyor system, a portion of cementitious composite 10 is heat treated, etc.) with flow occurring as indicated by directional arrows in FIGS. 7A-7D. In other embodiments, the activation is a discrete process (e.g., an entire length of one or more cementitious composites 10 is heated treated at once; indexed operation where material is fed, stopped to allow a machine to perform an operation, and thereafter again fed; etc.). In some embodiments, two or more of the heat treatment processes shown in FIGS. 7A-7D are used in combination (e.g., in sequence; heating, compaction, and cooling; etc.). In some embodiments, two or more cementitious composites 10 are attached together with heat, adhesive, mechanically, etc. to create a thicker and/or longer material. In some embodiments, cementitious composite 10 is punctured to facilitate water permeating therethrough.

Figure 7A:
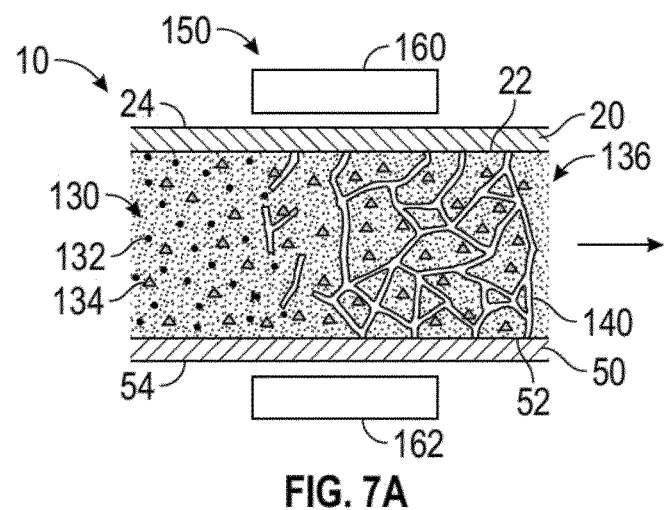
FIGS. 7A-7D are schematic cross-sectional views of methods for activating the cementitious composite of FIG. 5, according to various exemplary embodiments.

As shown in FIG. 7A, heating system 150 includes a first (e.g., an upper, etc.) heating element, shown as heating element 160, and a second (e.g., a lower, etc.) heating element, shown as heating element 162. In one embodiment, heating element 160 and/or heating element 162 are configured to both heat (e.g., through conductive heat transfer, radiative heat transfer, etc.) and compress cementitious composite 10. The heat may melt beads 132 to form interconnecting structure 140 and attach to permeable layer 20 and impermeable layer 50 to strands 148 at bonding points 142 and bonding points 146, respectively (e.g., in parallel with the formation of interconnecting structure 140, subsequent to the formation of interconnecting structure 140, etc.). Compression applied to cementitious composite 10 during the heat treatment may reduce deformation of cementitious composite 10. In other embodiments, elements are configured to cool cementitious composite 10. The cooling applied may cause interconnecting structure 140 to solidify, as well as complete the bonding process at bonding points 142 and/or bonding points 146 between strands 148 and permeable layer 20 and/or impermeable layer 50, respectively. Heating element 160 and/or heating element 162 may be or include a resistance heating element, apply microwaves, or include fluid lines for a heated and/or a cooled working fluid, among other systems.

Figure 7B:
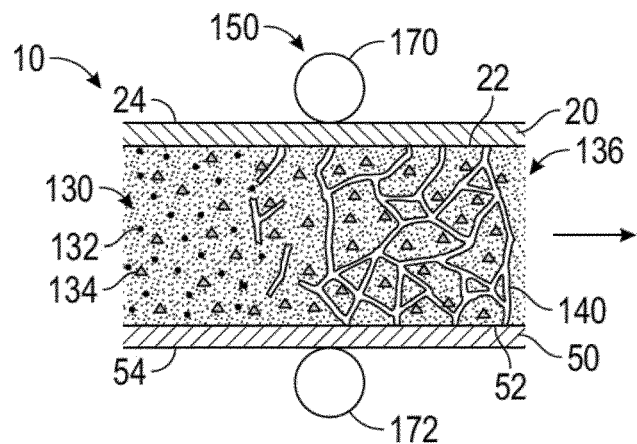

As shown in FIG. 7B, heating system 150 includes a first (e.g., an upper, etc.) heating element, shown as roller 170, and a second (e.g., a lower, etc.) heating element, shown as roller 172. In some embodiments heating system 150 includes a plurality of rollers 170 and/or rollers 172. In one embodiment, roller 170 and/or roller 172 are configured to both heat (e.g., through conductive heat transfer, radiative heat transfer, etc.) and compress cementitious composite 10. The heat may melt beads 132 to form interconnecting structure 140 and attach permeable layer 20 and impermeable layer 50 to strands 148 at bonding points 142 and bonding points 146, respectively (e.g., in parallel with the formation of interconnecting structure 140, subsequent to the formation of interconnecting structure 140, etc.). Compression applied to cementitious composite 10 during the application of heat may reduce deformation of cementitious composite 10. In other embodiments, roller 170 and/or roller 172 are configured to cool cementitious composite 10. The cooling may cause interconnecting structure 140 to solidify, as well as complete the bonding process at bonding points 142 and/or bonding points 146 between strands 148 and permeable layer 20 and/or impermeable layer 50, respectively. Roller 170 and/or roller 172 may be or include an electrical heating or cooling element or receive heated and/or cooled working fluid, among other systems.

Figure 7C:
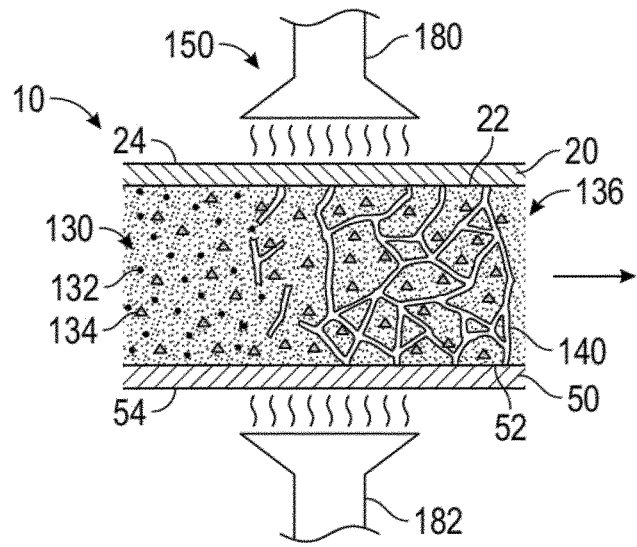

As shown in FIG. 7C, heating system 150 includes a first (e.g., an upper, etc.) heating element, shown as convective element 180, and a second (e.g., a lower, etc.) heating element, shown as convective element 182. In some embodiments heating system 150 includes a plurality of convective elements 180 and/or convective elements 182. Convective element 180 and/or convective element 182 may be configured to at least one of heat and cool cementitious composite 10 with convective heat transfer (e.g., with a heated air flow, a cooled air flow, etc.). The heat may melt beads 132 to form interconnecting structure 140 and attach permeable layer 20 and impermeable layer 50 to strands 148 at bonding points 142 and bonding points 146, respectively. The cooling may cause interconnecting structure 140 to solidify, as well as complete the bonding process at bonding points 142 and/or bonding points 146 between strands 148 and permeable layer 20 and/or impermeable layer 50, respectively. Convective element 180 and/or convective element 182 may be or include a fan/blower, a heat exchanger, and/or a boiler to heat or cool the air flow provided to cementitious composite 10, among other systems.

Figure 7D:
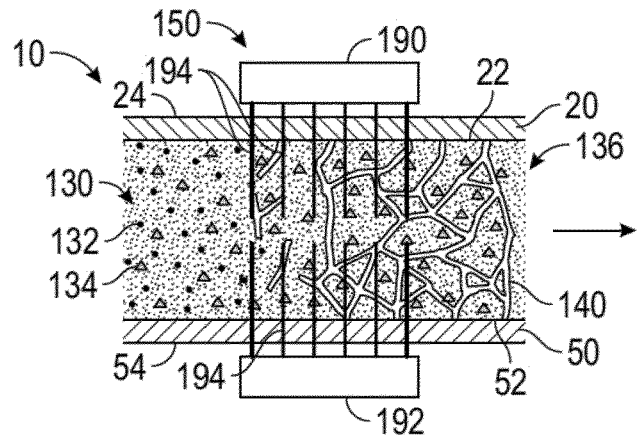
Figure 8:
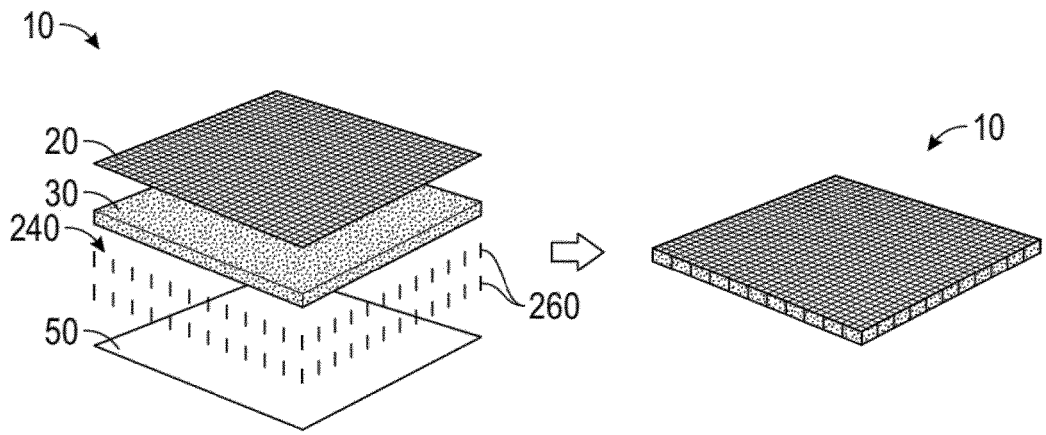
FIG. 8 is an exploded perspective view of a cementitious composite, according to yet another exemplary embodiment.

As shown in FIG. 7D, heating system 150 includes a first (e.g., an upper, etc.) heating element, shown as press 190, and/or a second (e.g., a lower, etc.) heating element, shown as press 192. Press 190 and/or press 192 may include a plurality of extensions, shown as needles 194. Needles 194 may be configured in a high density arrangement. Needles 194 may be configured to puncture at least one of permeable layer 20 and impermeable layer 50, and extend into the interior of cementitious mixture 130. In an alternative embodiment, needles 194 of press 192 or press 192 itself are omitted such that impermeable layer 50 is not punctured (i.e., remains impermeable).

In one embodiment, press 190 and/or press 192 are configured to compress cementitious composite 10 such that needles 194 extend into cementitious mixture 130. The needles 194 may be configured to at least one of heat and cool cementitious mixture 130, while press 190 and/or press 192 may be configured to at least one of heat and cool permeable layer 20 and/or impermeable layer 50 (e.g., similar to heating element 160, etc.). Heat applied by needles 194 may melt and/or expand beads 132 to form interconnecting structure 140 and attach permeable layer 20 and impermeable layer 50 to strands 148 at bonding points 142 and bonding points 146, respectively (e.g., in parallel with the formation of interconnecting structure 140 forms, etc.). Needles 194 may also create pathways within cementitious mixture 130 for beads 132 to melt and/or expand into. Compression applied to cementitious composite 10 by press 190 and/or press 192 during the application of heat by needles 194 may reduce deformation of cementitious composite 10. The cooling may solidify interconnecting structure 140, as well as complete the bonding process at bonding points 142 and/or bonding points 146 between strands 148 and permeable layer 20 and/or impermeable layer 50, respectively. Needles 194 may be or include resistance heating elements or include fluid lines for a heated and/or a cooled working fluid, among other systems.

According to an exemplary embodiment, interconnecting structure 140 is flexible. Permeable layer 20, interconnecting structure 140, and impermeable layer 50 may each be flexible. According to an exemplary embodiment, such a combination of flexible layers facilitates rolling and transporting cementitious composite 10, reducing the amount of cementitious mixture 130 that migrates through permeable layer 20. According to an alternative embodiment, interconnecting structure 140 is semi-rigid (e.g., when beads 132 include a fusible metal, etc.). Thus, cementitious composite 10 may be arranged in another configuration (e.g., various sheets that may be stacked, a sheet having a preformed shape, etc.).

According to an exemplary embodiment, cementitious mixture 130 includes materials (e.g., cementitious materials 136, etc.) that set and harden once exposed to a fluid (e.g., water, etc.) through a hydration process. According to an exemplary embodiment, cementitious mixture 130 is disposed and/or compressed between permeable layer 20 and impermeable layer 50 and undergoes a normal setting and hardening process after in-situ hydration. The setting process may begin once cementitious mixture 130 interacts with a fluid (e.g., water, etc.). Such hydration and setting processes change cementitious mixture 130 from a powder to a solid material. While setting produces a rigid material, curing may improve the strength of cementitious composite 10. According to an exemplary embodiment, cementitious mixture 130 has a compressive strength of up to five thousand pounds per square inch. According to an alternative embodiment, cementitious mixture 130 is modified with high performance cementitious ingredients and additives to achieve strength values in excess of five thousand pounds per square inch.

According to an exemplary embodiment, water is added to cementitious mixture 130 to initiate the hydration processes. An operator may topically apply water to the surface of cementitious composite 10 in-situ to hydrate cementitious mixture 130. In some embodiments, in-situ hydration may occur where cementitious composite 10 is horizontal, positioned at an angle, or positioned over a curved surface without undermining the strength of cementitious composite 10. According to an exemplary embodiment, cementitious composite 10 may be hydrated even if positioned at up to a 90 degree angle relative to level. In these or other embodiments, cementitious mixture 130 may set without separating from cementitious composite 10.

The characteristics of the hydrated cementitious composite 10 may be affected by the particle size of aggregates 134, beads 132 (i.e., interconnecting structure 140), and/or cementitious materials 136 of cementitious mixture 130. By way of example, particle size and density may affect the homogeneity of cementitious mixture 130 thereby impacting various properties (e.g., strength, flexibility, etc.) of cementitious composite 10. According to an exemplary embodiment, cementitious materials 136 of cementitious mixture 130 have an approximately equal particle size (e.g., within 150 microns, etc.). According to an alternative embodiment, cementitious materials 136 of cementitious mixture 130 have different sizes (i.e., a variation of more than 150 microns, etc.) that vary between 0.5 and 450 microns. A cementitious mixture 130 having differentially sized particles may improve packing and minimize open space within cementitious mixture 130.

According to an exemplary embodiment, cementitious mixture 130 is cured using an external curing process. By way of example, such external curing may include water ponding. According to various alternative embodiments, the external curing process includes water spraying, wet burlap, sheeting, curing compounds, curing sprays, absorbent sands, and accelerated curing, among other known methods. According to an alternative embodiment, permeable layer 20 formed of a hydrophilic material (e.g., paper, cellulose based materials, etc.) may improve curing by holding water to prolong exposure of cementitious mixture 130 to a fluid. According to an alternative embodiment, permeable layer 20 formed of a coating material having fewer apertures may improve curing by reducing the evaporation of water from cementitious mixture 130.

According to still another alternative embodiment, cementitious mixture 130 is cured using an internal curing process. According to an exemplary embodiment, cementitious mixture 130 is cured using internal water curing where cementitious mixture 130 includes a component that serves as a curing agent to the cementitious mixture. Such a component may include either an aggregate or a new component (e.g. an additive, super absorbent polymer, special aggregate, etc.) introduced into cementitious mixture 130 during the manufacturing process. Further, hydrophilic additives (e.g., super absorbent polymers, etc.) may improve curing by facilitating the ingress of water within cementitious mixture 130. According to an alternative embodiment, interconnecting structure 140 is hydrophilic (e.g., absorbent, etc.) and facilitates the absorption of water into cementitious mixture 130.

Permeable Layer

According to the exemplary embodiment shown in FIGS. 2-4A, 5-6C, 7A-8, 10A-10C, 11A-11C, 12A-12C, 13-15, 17A, 18, 21A, 21B, and 22B, permeable layer 20 facilitates the dispersion of a fluid (e.g., water, etc.) into cementitious composite 10 while retaining cementitious mixture 30 and/or cementitious mixture 130. Permeable layer 20 may include specified characteristics that manage the flow of the fluid through permeable layer 20. According to an exemplary embodiment, the specified characteristics allow for the hydration of cementitious mixture 30 and/or cementitious mixture 130 without allowing cementitious materials 32, aggregates 34, absorbent material 36, aggregates 134, cementitious materials 136, and/or additives to migrate from cementitious composite 10 (e.g., during handling before in-situ hydration, during in-situ hydration, etc.). In other embodiments, the specified characteristics may also maintain the mix ratio of cementitious mixture 30 and/or cementitious mixture 130 during the hydration and hardening processes. Further, permeable layer 20 may maintain the level of compaction of cementitious mixture 30 and/or cementitious mixture 130 by applying consistent pressure to cementitious mixture 30 and/or cementitious mixture 130, respectively. According to an exemplary embodiment, less than 10 percent by weight of cementitious mixture 30 and/or cementitious mixture 130 migrates through permeable layer 20 prior to in-situ hydration. In some embodiments, up to 10 percent by weight of cementitious mixture 30 and/or cementitious mixture 130 may migrate through permeable layer 20 while maintaining adequate performance of cementitious composite 10 after in-situ hydration.

According to an exemplary embodiment, permeable layer 20 includes a woven or nonwoven polyolefin (e.g., polypropylene, etc.). Permeable layer 20 may include the same or a similar material as structure layer 40, interconnecting structure 140 (e.g., beads 132, etc.), connectors 260 of connection layer 240, strands 360 of structure layer 340, grid 460 of structure layer 440, geogrid 480 of structure layer 440, structure layer 600, and/or structure layer 700. Manufacturing both permeable layer 20 and structure layer 40, interconnecting structure 140 (e.g., beads 132, etc.), connectors 260 of connection layer 240, strands 360 of structure layer 340, grid 460 of structure layer 440, geogrid 480 of structure layer 440, structure layer 600, and/or structure layer 700 from similar materials facilitates the coupling of permeable layer 20 to structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 (e.g., by melting, ultrasonic welding, adhesive, etc.) and increases bond strength between permeable layer 20 and structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700. According to an alternative embodiment, permeable layer 20 and structure layer 40, interconnecting structure 140 (e.g., beads 132, etc.), connectors 260 of connection layer 240, strands 360 of structure layer 340, grid 460 of structure layer 440, geogrid 480 of structure layer 440, structure layer 600, and/or structure layer 700 include different materials but may still be coupled together (e.g., with an adhesive, by melting the two together, etc.). By way of example, permeable layer 20 may include a sand blasting fabric having a resistance to ultraviolet light (e.g., white FR/UV sandblasting fabric 27600 as manufactured by TenCate, NW6 polypropylene fabric manufactured by Colbond, etc.). According to an exemplary embodiment, permeable layer 20 has a weight of approximately six ounces per square yard. According to an alternative embodiment, permeable layer 20 includes Grade 354 Airtex as manufactured by Georgia-Pacific, which has a weight of between 0.16 and 0.32 ounces per square foot.

According to an exemplary embodiment, permeable layer 20 includes a plurality of apertures, among other features, having a specified shape, area, frequency, and/or spacing. By way of example, the apertures may have a specified shape (e.g., circular, ovular, rectangular, etc.), depending on the particular application of cementitious composite 10. According to an exemplary embodiment, the size of the apertures may also be specified. By way of example, oversized apertures may allow sieving of cementitious mixture 30 and/or cementitious mixture 130 prior to in-situ hydration. In contrast, undersized apertures may provide too slow or incomplete hydration of cementitious mixture 30 and/or cementitious mixture 130. According to an exemplary embodiment, the apertures are designed to prevent particles less than fifteen microns from migrating from cementitious composite 10 and have an area of between 0.001 and 3 square millimeters. According to an exemplary embodiment, the frequency of the apertures may be specified to facilitate the transfer of water into cementitious mixture 30 and/or cementitious mixture 130. According to an exemplary embodiment, permeable layer 20 includes between one and twelve thousand apertures per square inch. According to an alternative embodiment, permeable layer 20 is a permeable material that does not include apertures (e.g., a fibrous material, paper, etc.).

According to an exemplary embodiment, permeable layer 20 is coupled to structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 during the manufacturing process. Such a permeable layer 20 may be designed as a removable product that does not remain coupled with structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 throughout the life of cementitious composite 10. According to an exemplary embodiment, permeable layer 20 includes a containment sheet (e.g., biodegradable paper, water soluble plastic, etc.) that secures cementitious mixture 30 and/or cementitious mixture 130 during the transportation of cementitious composite 10. In some embodiments, the containment sheet may be removed before or after the cementitious composite 10 is in place in the field. Such removal of the containment sheet may occur either before or after in-situ hydration. In either embodiment, permeable layer 20 may include flow channels (e.g., perforations, etc.) designed to facilitate the flow of water into cementitious mixture 30 and/or cementitious mixture 130. In some embodiments, outer side 24 of permeable layer 20 has a texture and/or defines channels that are conducive to the transport of water (e.g., to remove water from outer side 24, to direct water from outer side 24, etc.). According to an alternative embodiment, permeable layer 20 is not removed and erodes in the field from weathering without compromising the structural performance of cementitious composite 10. According to an alternative embodiment, permeable layer 20 is treated with a coating (e.g., for ultraviolet resistance, etc.) to extend service life in the field.

According to an exemplary embodiment, permeable layer 20 includes a water soluble material (e.g., a cold water soluble material, etc.). In some embodiments, the water soluble material is a fabric material or a film material, and such fabric material may be woven or nonwoven. In one embodiment, the fabric material is a cold water soluble nonwoven material manufactured from partially hydrolyzed polyvinyl alcohol fibers (a PVA fabric). The PVA fabric may be impermeable to cementitious materials, thereby reducing the migration of cementitious mixture 30 and/or cementitious mixture 130 from cementitious composite 10. In some embodiments, the PVA fabric is permeable to water. In other embodiments, the PVA fabric substantially retains water until the water soluble material disintegrates. In still other embodiments, the PVA fabric is substantially impermeable to water until the water soluble material disintegrates. According to an exemplary embodiment, permeable layer 20 has a surface (e.g., a nonwoven surface, etc.) having a roughness selected to facilitate bonding (e.g., a large surface roughness such that strands 42, stands 148, connectors 260, strands 360, grid 460, geogrid 480, tubes 602, net and/or 702 better bond to inner side 22 of permeable layer 20, etc.). According to another exemplary embodiment, permeable layer 20 is treated with a coating to facilitate bonding (e.g., a fusible water soluble embroidery stabilizer, "Wet N Gone Fusible®", etc.).

According to an exemplary embodiment, inner side 22 of permeable layer 20 is bonded to structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 after a heat treatment process. In one embodiment, permeable layer 20 has a melting point that is greater than the melting point of structure layer 40, interconnecting structure 140 (e.g., beads 132, etc.), connectors 260 of connection layer 240, strands 360 of structure layer 340, grid 460 of structure layer 440, geogrid 480 of structure layer 440, structure layer 600, and/or structure layer 700. By way of example, PVA fabric may have a melting point of between 356 and 374 degrees Fahrenheit. Permeable layer 20 (e.g., a PVA fabric, etc.) may be placed in contact with portions of structure layer 40, interconnecting structure 140 (e.g., strands 148, etc.), connectors 260 of connection layer 240, strands 360 of structure layer 340, grid 460 of structure layer 440, a geogrid 480 of structure layer 440, structure layer 600, and/or structure layer 700 that may protrude from cementitious mixture 30 and/or cementitious mixture 130. Heat may be subsequently applied (e.g., topically, etc.) to permeable layer 20 (e.g., with a heated roller, with a heated air stream, with a hot plate, with a furnace, etc.) to melt the ends of the portions of the structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 without melting permeable layer 20, thereby bonding permeable layer 20 with structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700.

By way of example, the applied heat may deform the portions of structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 disposed along inner side 22 of permeable layer 20 (e.g., a PVA fabric, etc.). The portions of structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700 internal to cementitious mixture 30 and/or cementitious mixture 130 may remain intact (i.e., may not melt) even after the application of heat. The permeable layer 20 may be in contact with cementitious mixture 30 and/or cementitious mixture 130 (e.g., may fuse against cementitious mixture 30, etc.) after heating, thereby retaining cementitious mixture 30 and/or cementitious mixture 130, and restricting movement of cementitious materials 32, aggregates 34, absorbent material 36, aggregates 134, cementitious materials 136, and/or additives within cementitious composite 10. By way of example, a heated roller or plate may be used to both heat permeable layer 20 and compress cementitious composite 10. By way of another example, a temperature neutral roller or a cooled roller may be used to apply compression to permeable layer 20 after the application of heat. Such an additional roller may also cool permeable layer 20. According to an alternative embodiment, permeable layer 20 has a melting point that is less than or equal to the melting point of structure layer 40, interconnecting structure 140 (e.g., beads 132, etc.), connectors 260 of connection layer 240, strands 360 of structure layer 340, grid 460 of structure layer 440, geogrid 480 of structure layer 440, structure layer 600, and/or structure layer 700.

In one embodiment, permeable layer 20 is positioned along a top surface of structure layer 40, interconnecting structure 140, connection layer 240, structure layer 340, structure layer 440, structure layer 600, and/or structure layer 700. According to another embodiment, permeable layer 20 is positioned along the top surface and at least one side surface of structure layer 40, interconnecting structure 140, connection layer 240, structure layer 340, structure layer 440, structure layer 600, and/or structure layer 700. Permeable layer 20 may be (i) bonded with only the top surface of structure layer 40, interconnecting structure 140, connection layer 240, structure layer 340, structure layer 440, structure layer 600, and/or structure layer 700, (ii) bonded with only at least one side surface of structure layer 40, interconnecting structure, connection layer 240, structure layer 340, structure layer 440, structure layer 600, and/or structure layer 700, or (iii) along both the top surface and at least one side surface of structure layer 40, interconnecting structure 140, connection layer 240, structure layer 340, structure layer 440, structure layer 600, and/or structure layer 700, according to various alternative embodiments.

According to another embodiment, permeable layer 20 is bonded with impermeable layer 50. By way of example, permeable layer 20 may include a material having a first melting point (e.g., PVA having a melting point of between 356 and 374 degrees Fahrenheit, etc.), and impermeable layer 50 may include a material having a second melting point (e.g., a polypropylene material having a melting point of between 266 and 340 degrees Fahrenheit, etc.). In one embodiment, the first melting point is greater than the second melting point such that the application of heat to the seam between permeable layer 20 and impermeable layer 50 melts impermeable layer 50 to form a bond without melting permeable layer 20. In another embodiment, the second melting point is greater than the first melting point such that the application of heat to the seam between permeable layer 20 and impermeable layer 50 melts permeable layer 20 to form a bond without melting impermeable layer 50. In still another embodiment, permeable layer 20 and impermeable layer 50 have the same melting point. In yet another alternative embodiment, the application of heat melts a coupling material (e.g., a material having a melting point below that of permeable layer 20 and impermeable layer 50, etc.) to form a bond.

Permeable layer 20 may abut or partially overlap impermeable layer 50. Double-sided tape and/or adhesive may be applied to a periphery of permeable layer 20 to secure permeable layer 20 to impermeable layer 50. By way of example, impermeable layer 50 may include a flange extending laterally outward from structure layer 40, interconnecting structure 140, connection layer 240, structure layer 340, structure layer 440, structure layer 600, and/or structure layer 700, and permeable layer 20 may extend down the sides of structure layer 40, interconnecting structure 140, connection layer 240, structure layer 340, structure layer 440, structure layer 600, and/or structure layer 700 and along the flange of impermeable layer 50. Such overlap may facilitate bonding the two layers together. In one embodiment, permeable layer 20 is bonded to impermeable layer 50, thereby forming a sealed pocket that envelopes (i) cementitious mixture 30 and/or cementitious mixture 130 and (ii) structure layer 40, interconnecting structure 140, connection layer 240, structure layer 340, structure layer 440, structure layer 600, and/or structure layer 700. Alternatively, permeable layer 20 may be folded under impermeable layer 50 to seal the edges of cementitious composite 10 such that cementitious mixture 30 and/or cementitious mixture 130 does not migrate from cementitious composite 10 through the edges during handling. The permeable layer 20 may be secured to the bottom of impermeable layer 50 using adhesive, by applying heat, and/or mechanically (e.g., with fasteners, etc.).

In some embodiments, inner side 22 of permeable layer 20 is coated with an adhesive configured to attach the permeable layer 20 to the top surface of structure layer 40, interconnecting structure 140, connection layer 240, structure layer 340, structure layer 440, structure layer 600, and/or structure layer 700. The adhesive coating may be a water soluble adhesive that includes a curing agent. In other embodiments, the inner side 22 is coated with another type of curing agent (e.g., without adhesive, etc.). By way of example, the water soluble adhesive and/or the curing agent may be absorbed by cementitious mixture 30 and/or cementitious mixture 130 during in-situ hydration. Such absorption of the adhesive and/or the curing agent during hydration may improve the properties (e.g., flexural strength, etc.) of cementitious composite 10 upon setting, curing, hardening, etc. In one embodiment, the curing agent is mixed with the water soluble adhesive and thereafter applied. In another embodiment, the curing agent is positioned underneath the water soluble adhesive (e.g., between inner side 22 of permeable layer 20 and the water soluble adhesive, etc.).

In some embodiments, the water soluble material of permeable layer 20 is treated to provide a desired disintegration time. By way of example, permeable layer 20 may be treated with paint, glued fibers, glued sand, water soluble adhesives, and/or other materials to modify (e.g., increase, decrease, etc.) the disintegration time of the permeable layer 20 during in-situ hydration. Such treatment of the permeable layer 20 may provide the desired disintegration time to (i) enhance the curing properties of cementitious composite 10, (ii) further prevent and/or reduce the washout of cementitious mixture 30 and/or cementitious mixture 130 from cementitious composite 10, and/or (iii) prevent premature exposure of the cementitious mixture 30 and/or cementitious mixture 130 to the surrounding environment (e.g., sun exposure, wind exposure, etc.). The treated permeable layer 20 (e.g., including fibers, sand, etc.) may be washed away from cementitious composite 10 post-in-situ hydration and/or pressed into cementitious composite 10 post-in-situ hydration to thereby become a permanent part thereof.

Cementitious composite 10 may be positioned and hydrated in-situ. According to an exemplary embodiment, permeable layer 20 is a water soluble material (e.g., PVA fabric, etc.). After installation of cementitious composite 10, an operator may apply water topically to hydrate cementitious mixture 30 and/or cementitious mixture 130. In one embodiment, the water soluble material prevents displacement of cementitious mixture 30 and/or cementitious mixture 130 (i.e., prevents the cementitious material from washing away) until the water soluble material disintegrates. Such protection may facilitate the use of higher-pressure water sources during the hydration process. A disintegration time for the water soluble material may be selected to facilitate hydration. By way of example, the disintegration time may be less than one minute. According to an exemplary embodiment, water soluble material is positioned along the sides of structure layer 40, interconnecting structure 140, connection layer 240, structure layer 340, structure layer 440, structure layer 600, and/or structure layer 700 such that, upon application of water, the water soluble fabric disintegrates. Upon the application of water, cementitious mixture 30 and/or cementitious mixture 130 begins its initial setting period.

In one embodiment, cementitious materials 32, absorbent material 36, cementitious materials 136, and/or additives positioned along the water soluble material may begin to lock, set, or "gel" within structure layer 40, interconnecting structure 140, connection layer 240, structure layer 340, structure layer 440, structure layer 600, and/or structure layer 700 to prevent washout of the mix (e.g., cementitious materials 32, aggregates 34, aggregates 134, cementitious materials 136, etc. positioned along a middle portion of cementitious mixture 30 and/or cementitious mixture 130, etc.). In another embodiment, the mix of cementitious materials 32 and/or absorbent material 36 within cementitious mixture 30 and/or cementitious materials 136 within cementitious mixture 130 are designed to partially diffuse such that a small portion of the mix flows laterally outward before or during the initial setting. Such lateral flow may facilitate the coupling of adjacent panels or rolls of cementitious composite 10 (e.g., panels or rolls positioned along one another, panels or rolls touching one another, panels or rolls spaced two millimeters or another distance from one another, etc.). By way of example, cementitious materials 32, absorbent material 36, cementitious material 136, and/or additives along the permeable layers of two adjacent panels may begin to gel during the initial setting period and bond together, thereby fusing the adjacent panels or rolls. By way of another example, cementitious materials 32, absorbent material 36, cementitious material 136, and/or additives from adjacent panels or rolls may mix together and harden to form a rigid joint. In some embodiments, the composition of cementitious mixture 30 and/or cementitious mixture 130 are designed to facilitate such lateral coupling. In one embodiment, the water soluble material facilitates the transport of water into cementitious composite 10. By way of example, the water soluble material may include apertures to facilitate water flow, a woven configuration that transports the water into cementitious mixture 30 and/or cementitious mixture 130, or still another structure. By way of another example, the surface of cementitious mixture 30 and/or cementitious mixture 130 positioned along the water soluble material may begin to gel and (i) retain (e.g., reduce the migration of, contain, limit movement of, etc.) cementitious materials 32, aggregates 34, aggregates 134, cementitious materials 136, and/or additives positioned within a middle portion of cementitious mixture 30 and/or cementitious mixture 130 and/or (ii) facilitate the flow of water into cementitious mixture 30 and/or cementitious mixture 130. Cementitious materials 32, absorbent material 36, cementitious materials 136, and/or additives within cementitious mixture 30 and/or cementitious mixture 130 may be activated during and following the disintegration process of the water soluble material. After the disintegration time, cementitious composite 10 may have a bare surface (e.g., cementitious mixture 30 is exposed after hardening, etc.).

According to still another alternative embodiment, permeable layer 20 may include a coating (e.g., elastomeric coatings, acrylic coatings, butyl rubber coatings, hypalon® coatings, neoprene® coatings, silicone coatings, modified asphalt coatings, acrylic lacquer coatings, urethane coatings, polyurethane coatings, polyurea coatings, one of various coatings approved for potable water, any combination of two or more coating materials, etc.). Such a coating may be applied through various known techniques (e.g., spraying, etc.) in one of a single and plural component form such that the material dries (i.e., sets, cures) into one of a permeable and impermeable coating. According to an exemplary embodiment, permeable layer 20 is AquaVers 405 as manufactured by Versaflex and has a thickness of between 0.07 and 2.0 millimeters. According to an alternative embodiment, the coating is another material having a low modulus of elasticity and a percent elongation of between 5 and 1000 percent. According to an alternative embodiment, a primer may be applied to a side of structure layer 40, interconnecting structure 140, connection layer 240, structure layer 340, structure layer 440, structure layer 600, and/or structure layer 700 before permeable layer 20 is sprayed on to improve bond strength (e.g., epoxy primers, acrylic primers, etc.). According to an alternative embodiment, additional treatment coatings may be applied to permeable layer 20 (e.g., to change the texture, color, etc. of permeable layer 20). In some embodiments, the additional treatment coating may be applied after an initial coating is applied. In still other embodiments, the additional treatment coating is applied over the various other materials discussed above for permeable layer 20 (e.g., woven or nonwoven polyolefin, etc.).

According to an exemplary embodiment, coating materials used for permeable layer 20 include three dimensional voids. Such a three dimensional void may include a sidewall configured to secure cementitious mixture 30 and/or cementitious mixture 130 within cementitious composite 10. According to an exemplary embodiment, the three dimensional void is cone shaped. Such a cone shaped three dimensional void includes a larger cross sectional area along an outer surface of permeable layer 20 to draw water inward and a smaller cross sectional area proximate to cementitious mixture 30 and/or cementitious mixture 130 prevent cementitious mixture 30 and/or cementitious mixture 130 from migrating out of cementitious composite 10. According to an alternative embodiment, the three dimensional void may have another shape (e.g., tetrahedral, etc.). Apertures having various shapes (e.g., triangle, circle, oval, diamond, square, rectangle, octagon, etc.) may also be formed in the coating.

Where permeable layer 20 includes a coating, three dimensional voids or apertures (e.g., tetrahedral shaped, diamond shaped, etc.) may partially close when cementitious composite 10 is rolled. Partially closing the apertures may better secure cementitious mixture 30 and/or cementitious mixture 130 (e.g., during transportation, etc.). Certain shapes (e.g., tetrahedral, diamond, etc.) may close more securely than other shapes. As the radius of curvature increases from rolling, tension on permeable layer 20 increases and deforms the coating in the direction of the curve. Such deformation decreases the size (e.g., diameter, etc.) of the three dimensional voids or apertures in direction opposite of the curve. According to an exemplary embodiment, three dimensional void or aperture returns to its original shape and size when unrolled.

According to an alternative embodiment, forming three dimensional voids or apertures with a material removal tool (e.g., laser, electron beam, a blade, etc.) fully removes the coating material in the three dimensional void or aperture. Such a process may prevent the three dimensional voids or apertures from closing or refilling. Apertures otherwise formed (e.g., with a point, etc.) may become refilled and require subsequent processing.

According to an alternative embodiment, permeable layer 20 is manufactured from a coating material that dries water-permeable such that apertures are not necessary to facilitate the transfer of hydration water. However, perforations may be added to permeable layer 20 including a water-permeable material to further promote the hydration of cementitious mixture 30 and/or cementitious mixture 130. According to an alternative embodiment, a side of structure layer 40, interconnecting structure 140, connection layer 240, structure layer 340, structure layer 440, structure layer 600, and/or structure layer 700 is not entirely covered by the coating but nonetheless contains cementitious mixture 30 and/or cementitious mixture 130 and allows for hydration (e.g., without the need for separate three dimensional voids or apertures).

According to an exemplary embodiment, permeable layer 20 is sprayed onto a side of structure layer 40, interconnecting structure 140, connection layer 240, structure layer 340, structure layer 440, structure layer 600, and/or structure layer 700, and apertures are thereafter defined within permeable layer 20 (e.g., with a roller having points, a plate having points, etc.). Whether provided as a sheet, a product applied through spraying, or another product, permeable layer 20 may also include a texture (e.g., by including an abrasive within the coating, etc.) or coefficient of friction designed to allow for improved traction for objects (e.g., vehicles, people, etc.) moving across permeable layer 20. According to an alternative embodiment, permeable layer 20 may have a smooth surface, a surface designed to facilitate the flow of water into cementitious composite 10, or a decorative finish.

Impermeable Layer

Referring to the exemplary embodiment shown in FIGS. 2-4B, 5-6B, 6D, 7A-8, 10A, 10B, 10D-11B, 11D-12B, 12D-15, 17A-18, 21A, 21B and 22B, impermeable layer 50 includes a material capable of retaining cementitious mixture 30 and hydration water without degrading after interacting with cementitious mixture 30 (e.g., cementitious materials 32, etc.) and/or cementitious mixture 130 (e.g., cementitious materials 136, etc.). Impermeable layer 50 may serve as a base to place cementitious mixture 30 over. In one embodiment, impermeable layer 50 includes a plastic based material (e.g., polypropylene, PVC, polyolefin, polyethylene, etc.). In some embodiments, impermeable layer 50 includes the same material as structure layer 40, interconnecting structure 140 (e.g., beads 132, etc.), connectors 260 of connection layer 240, strands 360 of structure layer 340, grid 460 of structure layer 440, and/or geogrid 480 of structure layer 440. Manufacturing both impermeable layer 50 and structure layer 40, interconnecting structure 140 (e.g., beads 132, etc.), connectors 260 of connection layer 240, strands 360 of structure layer 340, grid 460 of structure layer 440, geogrid 480 of structure layer 440, structure layer 600, and/or structure layer 700 from similar materials facilitates increasing bond strength between impermeable layer 50 and structure layer 40, interconnecting structure 140 (e.g., strands 148, etc.), connectors 260 of connection layer 240, strands 360 of structure layer 340, grid 460 of structure layer 440, geogrid 480 of structure layer 440, structure layer 600, and/or structure layer 700.

As shown in FIGS. 4A, 4B, 6B, 6D, 7A-7D, 10A, 10B, 10D-11B, 11D-12B, 12D-14S, 17A, 17B, 21A, 21B, and 22B, inner side 52 of impermeable layer 50 is coupled along a bottom surface of structure layer 40, interconnecting structure 140, connection layer 240, structure layer 340, structure layer 440, structure layer 600, and/or structure layer 700. Where impermeable layer 50 is positioned along the bottom surface of structure layer 40, interconnecting structure 140, connection layer 240, structure layer 340, structure layer 440, structure layer 600, and/or structure layer 700, impermeable layer 50 may experience a portion of the flexural and tensile stresses. Such a position may improve the strength and ductility of cementitious composite 10. In some embodiments, impermeable layer 50 is a sheet that includes a flexible material (e.g., to facilitate rolling cementitious composite 10, etc.) that is capable of being coupled with structure layer 40, interconnecting structure 140, connection layer 240, structure layer 340, structure layer 440, structure layer 600, and/or structure layer 700 without allowing a fluid to seep through. According to an alternative embodiment, impermeable layer 50 may be integrally formed with or otherwise coupled to structure layer 40, interconnecting structure 140, connection layer 240, structure layer 340, structure layer 440, structure layer 600, and/or structure layer 700. According to an alternative embodiment, impermeable layer 50 may protect cementitious mixture 30 from exposure to certain chemicals (e.g., from sulfate introduced by soils in the field, etc.). In some embodiments, outer side 54 of impermeable layer includes protrusions (e.g., extensions, barbs, etc.). The protrusions may facilitate securing cementitious composite 10 to various substrates (e.g., dirt, grass, gravel, etc.). In some embodiments, outer side 54 is coated with an adhesive and covered by a removable liner. The removable liner may be removed during installation such that the adhesive on outer side 54 of impermeable layer 50 attaches cementitious composite to a respective substrate.

According to an alternative embodiment, impermeable layer 50 includes a geomembrane. Such a geomembrane may include various materials (e.g., synthetic sheeting, single-ply membrane, another type of membrane used for waterproofing, etc.). According to an exemplary embodiment, the geomembrane includes a polyolefin film having a thickness of between 0.075 and 2.5 millimeters. According to an exemplary embodiment, impermeable layer 50 includes extruded polypropylene or a reinforced polypropylene that provides improved puncture resistance and tensile strength relative to other materials. Reinforced materials (e.g., externally reinforced with nonwoven polyester fabric, internally reinforced with polyester scrim, reinforced with a woven fabric, reinforced with a non-woven fabric, a geogrid, or otherwise reinforced) allow for the use of a thinner membrane thereby reducing the overall weight or thickness of cementitious composite 10. Specific exemplary polypropylene films include TT422 and TG 4000 as manufactured by Colbond or UltraPly TPO XR 100 as manufactured by Fireston. In other embodiments, the film includes a coated membrane, such as Transguard 4000 as manufactured by Reef Industries.

According to an alternative embodiment, impermeable layer 50 may include another material (e.g., bituminous geomembrane, ethylene propylene diene monomer, low-density polyethylene, high-density polyethylene, polyvinyl chloride, polyurea and polypropylene, etc.). The material selected for impermeable layer 50 may have characteristics that improve the pliability, installation procedures, lifespan, and/or performance of cementitious composite 10. By way of example, polyvinyl chloride is flexible and may conform to uneven surfaces without tearing. According to an exemplary embodiment, a specific manufacturing technique, tensile strength, and/or ductility may be selected for impermeable layer 50 to best suit a particular application of cementitious composite 10.

According to still another alternative embodiment, impermeable layer 50 may include a coating (e.g., elastomeric coatings, acrylic coatings, butyl rubber coatings, hypalon® coatings, neoprene® coatings, silicone coatings, modified asphalt coatings, acrylic lacquer coatings, urethane coatings, polyurethane coatings, polyurea coatings, one of various coatings approved for potable water, any combination of two or more coating materials, etc.) that may be applied through various known techniques (e.g., spraying, etc.). It should be understood that the thickness, material selections, and other discussion regarding permeable layer 20 are applicable to impermeable layer 50. In one embodiment, impermeable layer 50 has a thickness of between four and one hundred millimeters, for example, ten millimeters. According to an exemplary embodiment, permeable layer 20, impermeable layer 50, and the side portions of cementitious composite 10 include the same coating material. According to an alternative embodiment, permeable layer 20 and impermeable layer 50 include different coating materials. In either embodiment, permeable layer 20 and impermeable layer 50 may be applied simultaneously or successively.

According to still another alternative embodiment, cementitious composite 10 does not include an impermeable layer 50 and instead includes an additional permeable layer. Such a permeable layer may allow cementitious composite 10 to fuse with substrates (e.g., existing concrete structures, etc.). By way of example, a permeable material may allow cementitious mixture 30 to partially diffuse post-in-situ hydration and bond with a substrate below. External curing processes, internal curing processes (e.g., curing performed with compounds such as liquid polymer additives, etc.), or various additives in cementitious mixture 30, may further improve the bond between cementitious composite 10 and a substrate.

Finish Layer

According to the exemplary embodiment shown in FIGS. 22A and 22B, cementitious composite 10 includes a secondary layer, shown as finish layer 500. As shown in FIGS. 22A and 22B, finish layer 500 includes a plurality of finishing pieces, shown as finishing blocks 502. Finishing blocks 502 may include tile, stone, brick, brick pavers, porcelain, clay pavers, wood, glass, vinyl, and/or other outdoor flooring materials. According to an exemplary embodiment, finishing blocks 502 are coupled to outer side 24 of permeable layer 20. Finishing blocks 502 may be coupled (e.g., attached, joined, bonded etc.) to outer side 24 of permeable layer 20 with an adhesive, an intermediate coupling material (e.g., double-sided tape, etc.), a mechanical attachment (e.g., snap fit, etc.), and/or still another coupling material. In some embodiments, finishing blocks 502 are additionally or alternatively coupled to structure layer 40.

As shown in FIGS. 22A and 22B, finish layer 500 has a plurality of apertures, shown as seams 504, formed between each finishing blocks 502. Each finishing block 502 defines one or more through-holes, shown as passages 506. In other embodiments, finishing blocks 502 do not define passages 506. According to an exemplary embodiment, seams 504 and/or passages 506 facilitate hydrating cementitious mixture 30 and/or cementitious mixture 130 in-situ.

Manufacture

Figure 23:
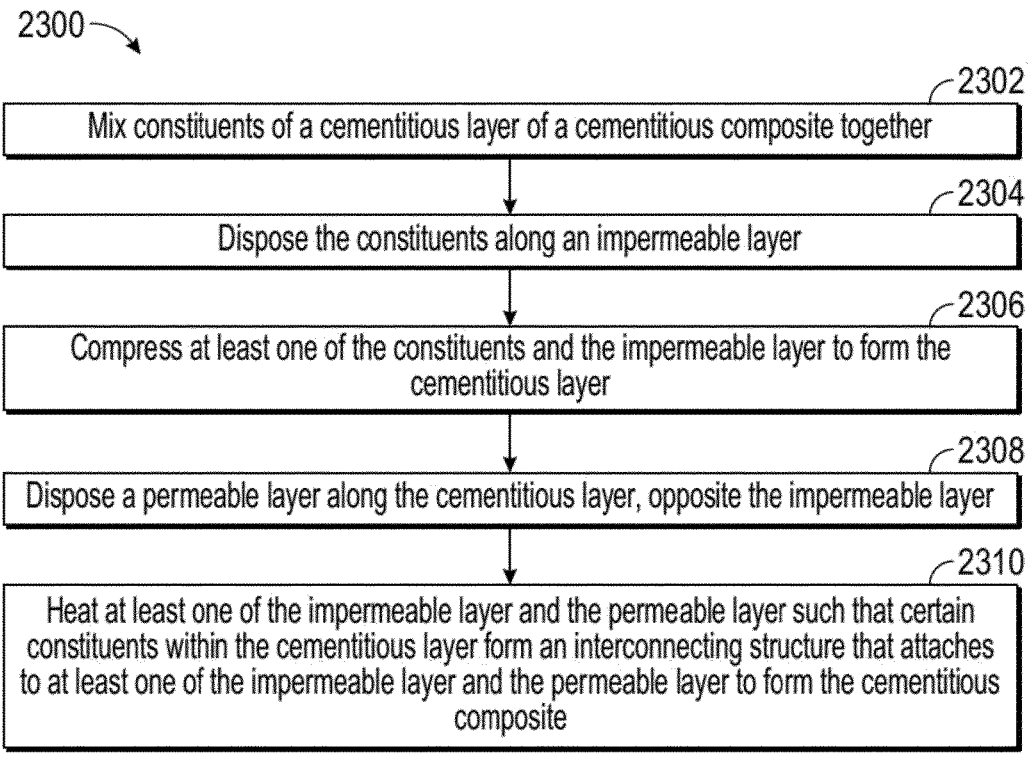
FIG. 23 is a flow diagram of a method for manufacturing the cementitious composite of FIG. 5, according to an exemplary embodiment.
Figure 24:
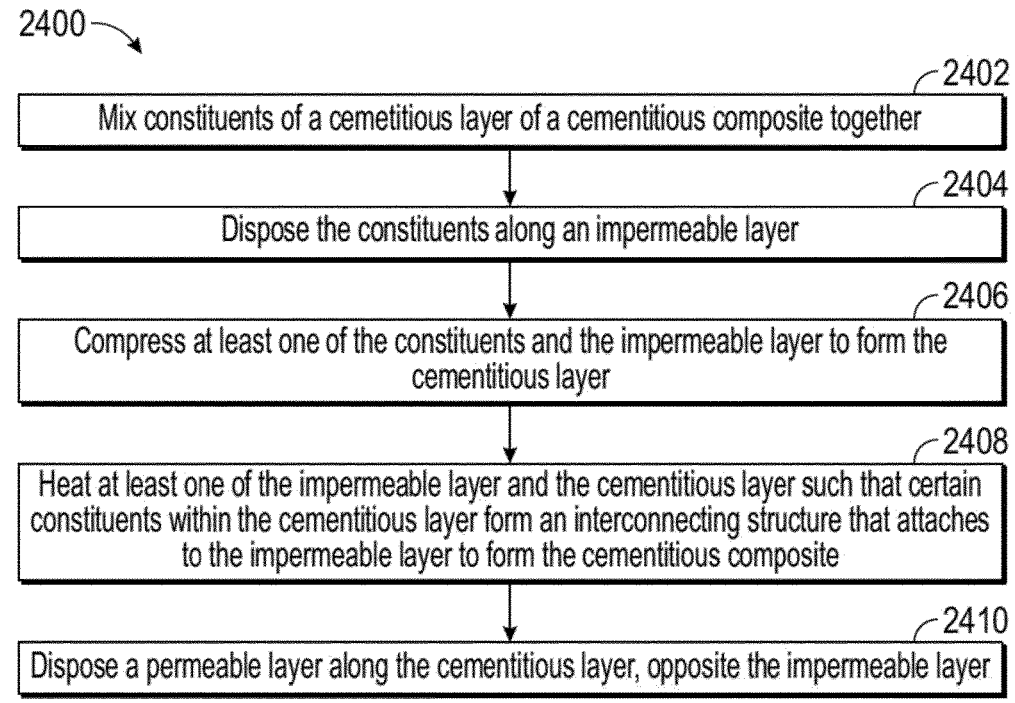
FIG. 24 is a flow diagram of a method for manufacturing the cementitious composite of FIG. 5, according to another exemplary embodiment.
Figure 25:
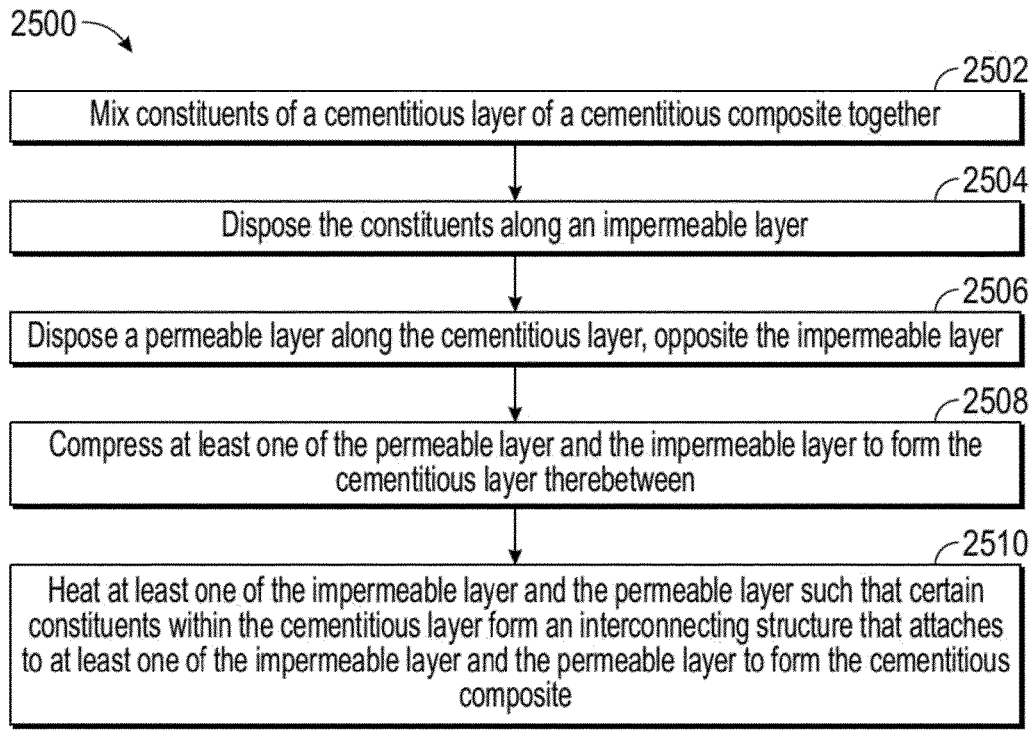
FIG. 25 is a flow diagram of a method for manufacturing the cementitious composite of FIG. 5, according to yet another exemplary embodiment.

Referring to FIGS. 23-25, cementitious composite 10 may be manufactured using a line assembly machine, which may operate continuously or may engage in an indexed operation mode where material is fed, stopped (e.g., to allow the machine to perform an operation) and thereafter again feed. According to an exemplary embodiment, FIGS. 23-25 are various methods for manufacturing cementitious composite 10 of FIGS. 5-7D.

Referring now to FIG. 23, a method 2300 for manufacturing a cementitious composite mat is shown, according to an exemplary embodiment. At process 2302, constituents (e.g., beads 132, aggregates 134, cementitious materials 136, additives, etc.) of a cementitious layer (e.g., cementitious mixture 130, etc.) of a cementitious composite mat (e.g., cementitious composite 10, etc.) are mixed together. The mixing may evenly distribute the constituents. The constituents may be mixed together in a container or hopper. At process 2304, the constituents of the cementitious layer are disposed along a first layer (e.g., a base layer, impermeable layer 50, permeable layer 20, etc.). By way of example, the hopper or container may include a dispenser/distributor that deposits the constituents onto the first layer as the first layer passes below the dispenser. The dispenser/distributor may be shaped (e.g., rectangular, adjustable, etc.) to facilitate even distribution of the constituents onto the first layer. In one embodiment, the first layer passes over a vibratory table configured to vibrate to further facilitate even distribution and/or compaction of the constituents to form a uniform cementitious layer.

At process 2306, at least one of the constituents and the first layer are compressed to compact the constituents into the cementitious layer. According to an exemplary embodiment, the first layer having received the constituents from the dispenser thereafter passes over a compactor. In one embodiment, the compactor includes rollers. In some embodiments, the rollers are configured to compress the constituents with a pressure of between 200 and 10,000 pounds per square inch. Such rollers may replace the vibratory table or may be positioned before, after, or with the vibratory table. Rollers may also move the first layer and cementitious layer. In other embodiments, the compactor includes a hydraulic press or other type of physical compactor. In an alternative embodiment, compactor incorporates a vacuum system configured to draw cementitious material into a prescribed shape. In another alternative embodiment, the compactor incorporates a compressed air system.

At process 2308, a second layer (e.g., a top layer, permeable layer 20, impermeable layer 50, etc.) is disposed along the cementitious layer, opposite the first layer. The second layer may include a film, sheet, or other configuration of material applied to form an upper containment layer around the cementitious layer. By way of example, the second layer may include a water soluble material (e.g., a cold water soluble material, etc.). In some embodiments, the water soluble material is a fabric material. Such a fabric material may be woven or nonwoven. In one embodiment, the fabric material is a cold water soluble nonwoven material manufactured from partially hydrolyzed polyvinyl alcohol fibers (e.g. a PVA fabric, etc.). Such a film or sheet may be melted, welded, adhesively secured, mechanically coupled (e.g., with wire, clips, etc.), or otherwise bonded to the cementitious layer. The second layer may be applied as part of a continuous process, where the first layer and second layer are moved at a common speed. In an alternative embodiment, the second layer is an impermeable material that is disposed along the cementitious layer and thereafter punctured (e.g., to make the second layer permeable, etc.).

In an alternative embodiment, a coating may be deposited along the cementitious layer, opposite the first layer by a sprayer to form the permeable layer. As discussed above, such a coating may include elastomeric coatings, acrylic coatings, butyl rubber coatings, hypalon® coatings, neoprene® coatings, silicone coatings, modified asphalt coatings, acrylic lacquer coatings, urethane coatings, polyurethane coatings, polyurea coatings, one of various coatings approved for potable water, any combination of two or more coating materials, or still other coatings. In some embodiments, the coating is configured to secure the constituents. A single sprayer may be configured on a track to move across the cementitious layer or one or more spray units may be stationary and configured to apply a coating to at least one of the top, sides, and ends of the cementitious layer.

At process 2310, at least one of the first layer and the second layer are heated. In some embodiments, the cementitious layer is additionally heated with needles (e.g., needles 194, etc.). The heat treatment causes certain constituents within the cementitious layer (e.g., beads 132, etc.) to form an interconnecting structure (e.g., interconnecting structure 140, etc.). The interconnecting structure may attach to at least one of the first layer and the second layer to form the cementitious composite mat. According to an exemplary embodiment, the first layer and/or the second layer are bonded to the interconnecting structure with the application of heat (e.g., with a heated roller, with a heated air stream, with a hot plate, with a furnace, etc.) as part of the continuous process. Pressure may be applied to the first layer and/or the second layer (e.g., with a roller) as part of the heating processes or after heating (e.g., with a cooling roller) to produce a tight composite material (e.g., a cementitious composite with low void space between the first layer and the second layer, etc.). In one embodiment, the second layer is applied along only a top surface of the cementitious layer. In another embodiment, the second layer is also applied to the sides of the cementitious layer. Bonding may be uniform or random across the top and sides of the cementitious layer. The second layer may be attached to the sides of the cementitious composite to form a clean edge (e.g., attached with heat bonding, an adhesive, mechanically, double-sided tape, etc.) such that the edge is straight (e.g., at 90 degrees, at approximately 90 degrees, at between 85 and 95 degrees, to facilitate joining two cementitious composites together in the field, etc.).

According to an exemplary embodiment, a sealing system is configured to seal the sides and ends of the cementitious composite mat. Such a sealing system may include additional sprayers or use the primary sprayers configured to apply a coating to the sides and ends of the cementitious layer, a roller configured to fold a portion of the first layer and/or the second layer over the sides and ends, or another system. According to an exemplary embodiment, sealing the sides and ends the cementitious layer further contains the constituents within the cementitious composite mat and prevents the constituents from migrating from the cementitious composite mat (e.g., during handling, transportation, installation, etc.).

According to an exemplary embodiment, a take-up roll and/or winder is configured to roll the cementitious composite mat around a core. According to an exemplary embodiment, the core is coupled to a driver to rotate and apply a driving force that draws the cementitious composite mat. According to an exemplary embodiment, the cementitious composite mat is vacuum sealed as an entire roll or otherwise packaged with air tight and/or water tight packaging. According to an alternative embodiment, sheets of cementitious composite mat may be vacuum sealed individually or as a stacked group. Such sealing facilitates transportation and handling of the cementitious composite mat.

Referring now to FIG. 24, a method 2400 for manufacturing a cementitious composite mat is shown, according to another exemplary embodiment. At process 2402, constituents (e.g., beads 132, aggregates 134, cementitious materials 136, additives, etc.) of a cementitious layer (e.g., cementitious mixture 130, etc.) of a cementitious composite mat (e.g., cementitious composite 10, etc.) are mixed together. At process 2404, the constituents of the cementitious layer are disposed along a first layer (e.g., a base layer, impermeable layer 50, permeable layer 20, etc.). At process 2406, at least one of the constituents and the first layer are compressed to compact the constituents into the cementitious layer. At process 2408, at least one of the first layer and the cementitious layer are heated. The heat transfer causes certain constituents within the cementitious layer (e.g., beads 132, etc.) to form an interconnecting structure (e.g., interconnecting structure 140, etc.). The interconnecting structure may attach to the first layer to form the cementitious composite mat. At process 2410, a second layer (e.g., a top layer, permeable layer 20, impermeable layer 50, etc.) is disposed along the cementitious layer, opposite the first layer (e.g., as a sheet, as a spray, etc.). By way of example, the second layer may be bonded to the cementitious layer using heat (e.g., heat welded, melted, bonded in a furnace, etc.), an adhesive, a chemical reaction, an intermediate coupling material, or still another process.

Referring now to FIG. 25, a method 2500 for manufacturing a cementitious composite mat is shown, according to still another exemplary embodiment. At process 2502, constituents (e.g., beads 132, aggregates 134, cementitious materials 136, additives, etc.) of a cementitious layer (e.g., cementitious mixture 130, etc.) of a cementitious composite mat (e.g., cementitious composite 10, etc.) are mixed together. At process 2504, the constituents of the cementitious layer are disposed along a first layer (e.g., a base layer, impermeable layer 50, permeable layer 20, etc.). At process 2506, a second layer (e.g., a top layer, permeable layer 20, impermeable layer 50, etc.) is disposed along the cementitious layer, opposite the first layer (e.g., as a sheet, as a spray, etc.). At process 2508, at least one of the first layer and the second layer are compressed to compact the constituents into the cementitious layer therebetween. At process 2510, at least one of the first layer and the second layer are heated. The heat transfer causes certain constituents within the cementitious layer (e.g., beads 132, etc.) to form an interconnecting structure (e.g., interconnecting structure 140, etc.). The interconnecting structure may attach to the at least one of the first layer and the second layer to form the cementitious composite mat.

Referring to FIGS. 26-29, cementitious composite 10 may be manufactured using a line assembly machine, which may operate continuously (or may engage in an indexed operation mode where material is fed, stopped (e.g., to allow the machine to perform an operation) and thereafter again feed. According to an exemplary embodiment, FIGS. 26-29 are various methods for manufacturing cementitious composite 10 of FIGS. 8-14S.

Figure 26:
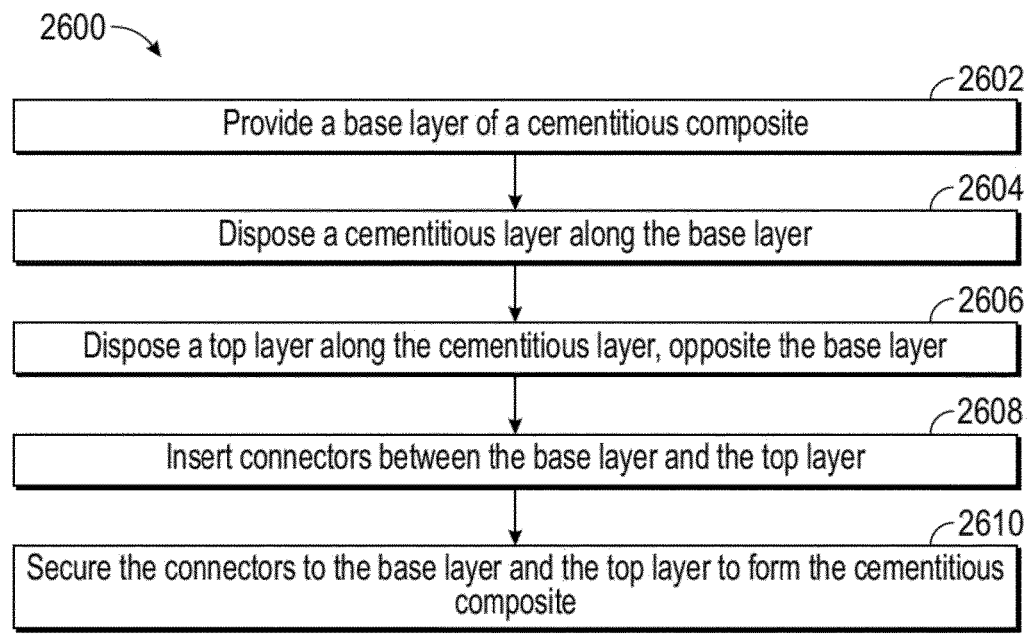
FIG. 26 is a flow diagram of a method for manufacturing the cementitious composite of FIG. 8, according to an exemplary embodiment.

Referring now to FIG. 26, a method 2600 for manufacturing a cementitious composite mat is shown, according to an exemplary embodiment. At process 2602, a base layer (e.g., impermeable layer 50, permeable layer 20, etc.) of a cementitious composite mat (e.g., cementitious composite 10, etc.) is provided. At process 2604, constituents of a cementitious layer (e.g., cementitious mixture 30, etc.) are disposed along the base layer. The constituents of the cementitious layer may include cementitious materials (e.g., cementitious materials 32, etc.), aggregates (e.g., aggregates 34, etc.), and/or additives (e.g., absorbent material 36, etc.). The constituents of the cementitious layer may be mixed together to evenly distribute the constituents. The constituents may be mixed together in a container or hopper, may be mixed together within the cementitious composite mat or over the base layer, or otherwise mixed first and then disposed along the base layer. By way of example, the hopper or container may include a dispenser/distributor that deposits the constituents onto the base layer as the base layer passes below the dispenser. The dispenser/distributor may be shaped (e.g., rectangular, adjustable, etc.) to facilitate even distribution of the constituents onto the base layer. In one embodiment, the base layer passes over a vibratory table configured to vibrate to further facilitate even distribution and/or compaction of the constituents to form a uniform cementitious layer.

In some embodiments, compression is applied to at least one of the constituents and the base layer to compact the constituents of the cementitious layer. According to an exemplary embodiment, the base layer having received the constituents from the dispenser thereafter passes over a compactor. In one embodiment, the compactor includes rollers. In some embodiments, the rollers are configured to compress the constituents with a pressure of between 200 and 10,000 pounds per square inch. Such rollers may replace the vibratory table or may be positioned before, after, or with the vibratory table. Rollers may also move the impermeable layer and cementitious layer. In other embodiments, the compactor includes a hydraulic press or other type of physical compactor. In an alternative embodiment, compactor incorporates a vacuum system configured to draw cementitious material into a prescribed shape.

At process 2606, a top layer (e.g., permeable layer 20, impermeable layer 50, etc.) is disposed along the cementitious layer, opposite the base layer. The top layer may include a film, sheet, or other configuration of material applied to form an upper containment layer around the cementitious layer. By way of example, the top layer may include a water soluble material (e.g., a cold water soluble material, etc.). In some embodiments, the water soluble material is a fabric material. Such a fabric material may be woven or nonwoven. In one embodiment, the fabric material is a cold water soluble nonwoven material manufactured from partially hydrolyzed polyvinyl alcohol fibers (e.g., a PVA fabric, etc.). Such a film or sheet may be melted, welded, adhesively secured, or otherwise bonded to the cementitious layer. The top layer may be applied as part of a continuous process, where the base layer and top layer are moved at a common speed.

At process 2608, connectors (e.g., rods, pins, nails, staples, connectors 260, etc.) are inserted (e.g., pushed through, punched through, etc.) within the cementitious composite mat. In one embodiment, the connectors are inserted through the top layer. In other embodiments, the connectors are inserted through the base layer. In some embodiments, the connectors extend through one of the base layer and the top layer. In other embodiments, the connectors extend through the base layer and the top layer. In still other embodiments, the connectors are disposed within the cementitious composite mat (e.g., do not extend through either of the base layer or the top layer, etc.).

At process 2610, the connectors are secured to the base layer and the top layer to form the cementitious composite mat. In one embodiment, the connectors are adhesively coupled to at least one of the base layer and the top layer. In other embodiments, the connectors are mechanically coupled to at least one of the base layer and the top layer (e.g., with retaining member 300, retainer 310, and/or head 290, etc.). In still other embodiments, the connectors are thermally coupled to at least one of the base layer and the top layer (e.g., with a heat treatment process, etc.). Connectors may have elements that more easily fuse or melt to facilitate attachment. In some embodiments, a combination of thermal coupling, mechanical coupling, and/or adhesive coupling is used. In some embodiments, the connectors are secured to the base layer using a different method than the top layer.

According to an exemplary embodiment, a sealing system is configured to seal the sides and ends of the cementitious composite mat. Such a sealing system may include sprayers configured to apply a coating to the sides and ends of the cementitious layer, a roller configured to fold a portion of the base layer and/or the top layer over the sides and ends, or another system. According to an exemplary embodiment, sealing the sides and ends over the cementitious layer further contains the constituents within the cementitious composite mat and prevents the constituents from migrating from the cementitious composite mat (e.g., during handling, transportation, installation, etc.).

According to an exemplary embodiment, a take-up roll is configured to roll the cementitious composite mat around a core. According to an exemplary embodiment, the core is coupled to a driver to rotate and apply a driving force that draws the cementitious composite mat. According to an exemplary embodiment, the cementitious composite mat is vacuum sealed as an entire roll. According to an alternative embodiment, sheets of cementitious composite mat may be vacuum sealed individually or as a stacked group. Such sealing facilitates transportation and handling of the cementitious composite mat.

Figure 27:
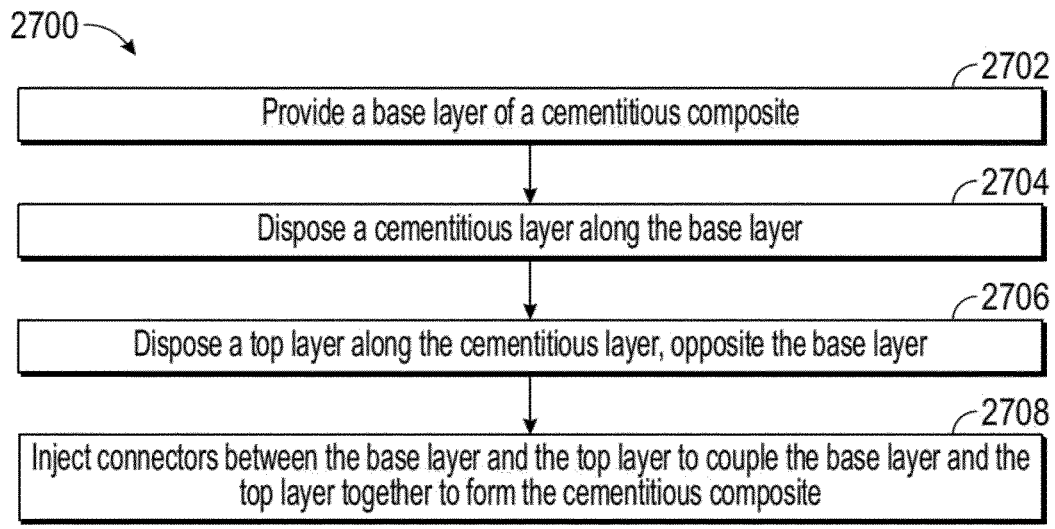
FIG. 27 is a flow diagram of a method for manufacturing the cementitious composite of FIG. 8, according to another exemplary embodiment.

Referring now to FIG. 27, a method 2700 for manufacturing a cementitious composite mat is shown, according to another exemplary embodiment. At process 2702, a base layer (e.g., impermeable layer 50, permeable layer 20, etc.) of a cementitious composite mat (e.g., cementitious composite 10, etc.) is provided. At process 2704, constituents of a cementitious layer (e.g., cementitious mixture 30, etc.) are disposed along the base layer. In some embodiments, compression is applied to at least one of the constituents and the base layer to compact the constituents of the cementitious layer. At process 2706, a top layer (e.g., permeable layer 20, impermeable layer 50, etc.) is disposed along the cementitious layer, opposite the base layer. At process 2708, connectors (e.g., liquefied connectors 330, etc.) are injected within the cementitious composite mat with an injection mechanism (e.g., injection mechanism 332, etc.). In one embodiment, the connectors are injected through the top layer. In other embodiments, the connectors are injected through the base layer. In some embodiments, the connectors extend through one of the base layer and the top layer. In other embodiments, the connectors extend through the base layer and the top layer.

Figure 28:
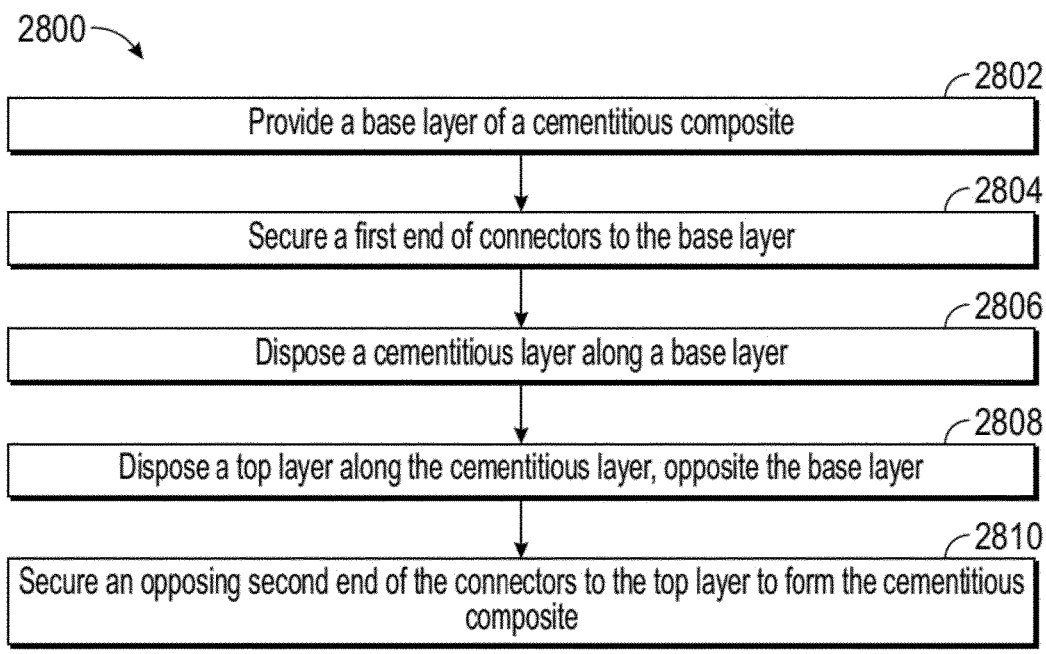
FIG. 28 is a flow diagram of a method for manufacturing the cementitious composite of FIG. 8, according to yet another exemplary embodiment.

Referring now to FIG. 28, a method 2800 for manufacturing a cementitious composite mat is shown, according to still another exemplary embodiment. At process 2802, a base layer (e.g., impermeable layer 50, permeable layer 20, etc.) of a cementitious composite mat (e.g., cementitious composite 10, etc.) is provided. At process 2804, first ends of connectors are secured to the base layer (e.g., with adhesive, using a heat treatment process to melt the two together, connectors 260, etc.). At process 2806, constituents of a cementitious layer (e.g., cementitious mixture 30, etc.) are disposed along the base layer. At process 2808, a top layer (e.g., permeable layer 20, impermeable layer 50, etc.) is disposed along the cementitious layer, opposite the base layer. At process 2810, an opposing second end of the connectors are secured to the top layer (e.g., with adhesive, using a heat treatment process to melt the two together, etc.) to form the cementitious composite mat. In another alternative embodiment, the cementitious layer is disposed along the base layer prior to the connectors being secured to the base layer (e.g., the connectors are inserted through the cementitious layer, etc.).

Figure 29:
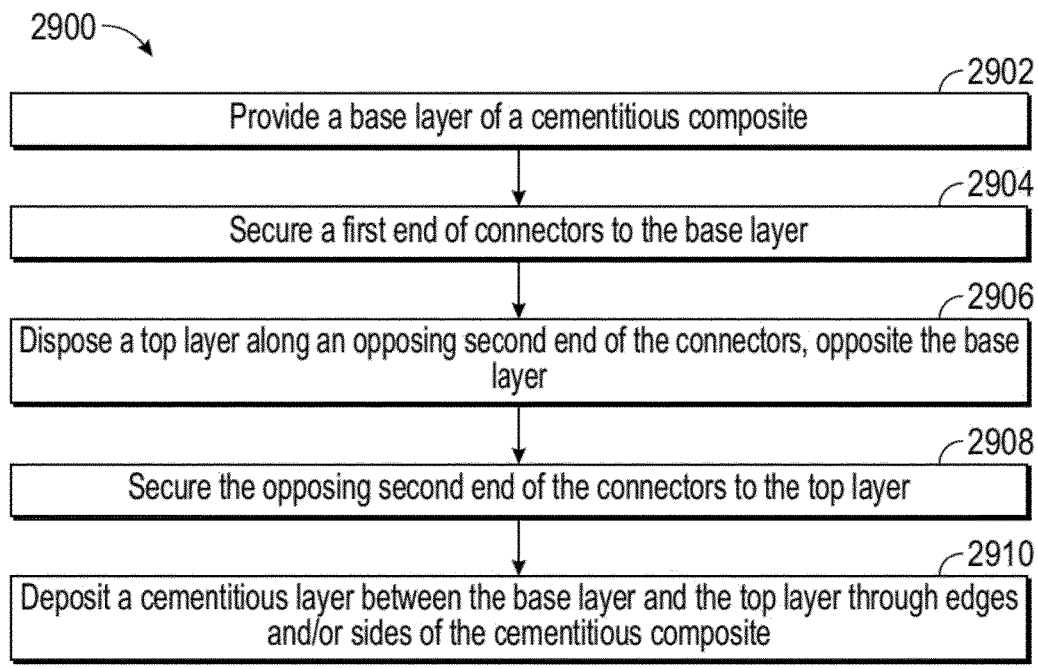
FIG. 29 is a flow diagram of a method for manufacturing the cementitious composite of FIG. 8, according to still another exemplary embodiment.

Referring now to FIG. 29, a method 2900 for manufacturing a cementitious composite mat is shown, according to yet another exemplary embodiment. At process 2902, a base layer (e.g., impermeable layer 50, permeable layer 20, etc.) of a cementitious composite mat (e.g., cementitious composite 10, etc.) is provided. At process 2904, first ends of connectors are secured to the base layer (e.g., with adhesive, using a heat treatment process to melt the two together, connectors 260, etc.). At process 2906, a top layer (e.g., permeable layer 20, impermeable layer 50, etc.) is disposed along an opposing second end of the connectors, opposite the base layer. At process 2908, the opposing second ends of the connectors are secured to the top layer (e.g., with adhesive, using a heat treatment process to melt the two together, etc.). Thus, the base layer and the top layer are arranged in a spaced apart configuration by the connectors. In other embodiments, the first and second ends of the connectors are secured to the base layer and the top layer simultaneously. At process 2910, constituents of a cementitious layer (e.g., cementitious mixture 30, etc.) are deposited between the base layer and the top layer through the edges and/or sides of the cementitious composite mat.

Figure 30:
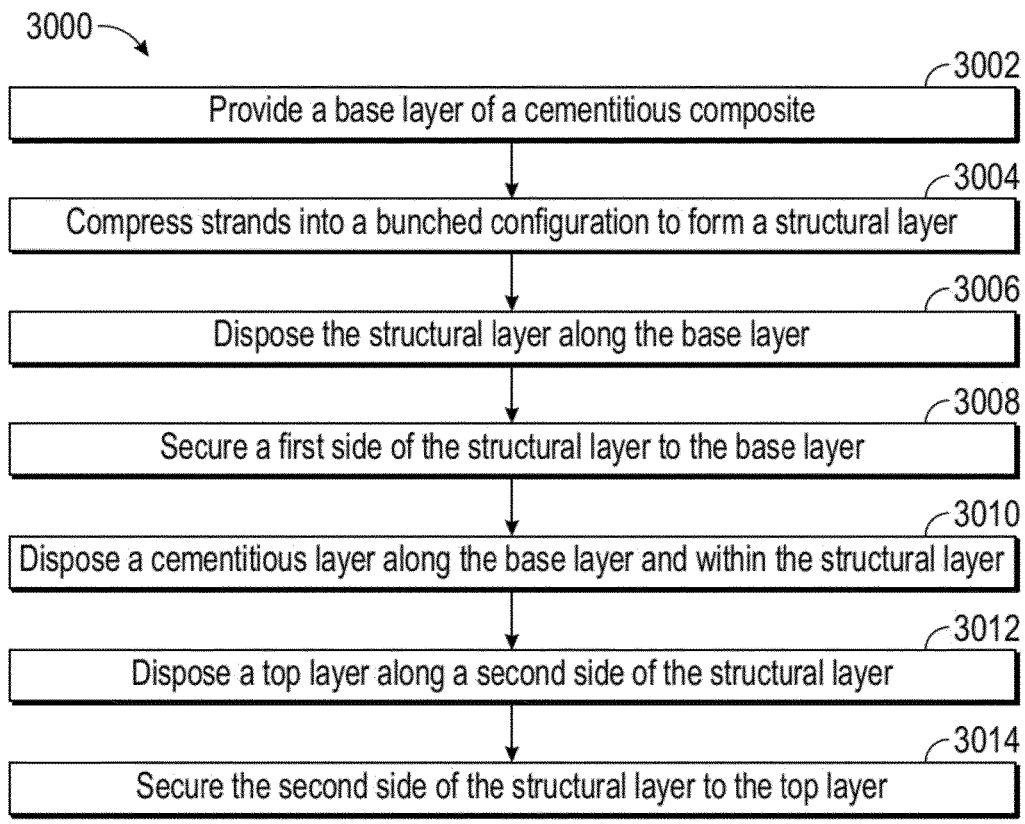
FIG. 30 is a flow diagram of a method for manufacturing the cementitious composite of FIG. 15, according to an exemplary embodiment.

Referring to FIG. 30, cementitious composite 10 may be manufactured using a line assembly machine, which may operate continuously (or may engage in an indexed operation mode where material is fed, stopped (e.g., to allow the machine to perform an operation) and thereafter again feed. According to an exemplary embodiment, FIG. 30 is a method 3000 for manufacturing cementitious composite 10 of FIGS. 15-17B.

At process 3002, a base layer (e.g., impermeable layer 50, etc.) of a cementitious composite mat (e.g., cementitious composite 10, etc.) is provided. At process 3004, one or more strands (e.g., strands 360, etc.) are arranged (e.g., randomly, in a predetermined pattern, etc.) into a bunched configuration (e.g., bunching 366, etc.) and compressed to form a structural layer (e.g., structure layer 340, bunching mat 368, etc.). At process 3006, the structural layer is disposed along the base layer. At process 3008, a first side (e.g., bottom surface 344, etc.) of the structural layer is secured to the base layer. The first side of the structural layer may be secured to the base layer using heat (e.g., heat welded, melted, bonded in a furnace, etc.), an adhesive, a chemical reaction, an intermediate coupling material, or still another process.

At process 3010, a cementitious layer (e.g., cementitious mixture 30, etc.) is disposed along the base layer and within the structural layer. According to an exemplary embodiment, constituents (e.g., cementitious materials 32, aggregates 34, additives, absorbent material 36, etc.) of the cementitious layer are mixed together prior to being deposited along the base layer and within the structural layer. The mixing may evenly distribute the constituents. The constituents may be mixed together in a container or hopper. By way of example, the hopper or container may include a dispenser/distributor that deposits the constituents onto the base layer and within the structural layer as the impermeable layer and the structural layer pass below the dispenser. The dispenser/distributor may be shaped (e.g., rectangular, adjustable, etc.) to facilitate even distribution of the constituents. In one embodiment, the base layer and the structural layer pass over a vibratory table configured to vibrate to further facilitate even distribution and/or compaction of the constituents to form a uniform cementitious layer within the structural layer. In other embodiments, the constituents are compressed into the structural layer. According to an exemplary embodiment, the base layer and the structural layer having received the constituents from the dispenser thereafter passes over a compactor. In one embodiment, the compactor includes rollers. In some embodiments, the rollers are configured to compress the constituents with a pressure of between 200 and 10,000 pounds per square inch. Such rollers may replace the vibratory table or may be positioned before, after, or with the vibratory table. Rollers may also move the base layer, structural layer, and the cementitious layer. In other embodiments, the compactor includes a hydraulic press or other type of physical compactor. In an alternative embodiment, compactor incorporates a vacuum system configured to draw cementitious material into a prescribed shape.

At process 3012, a top layer (e.g., permeable layer 20, etc.) is disposed along a second side (e.g., top surface 342, etc.) of the structural layer, opposite the base layer. The top layer may include a film, sheet, or other configuration of material applied to form an upper containment layer around the cementitious layer. By way of example, the top layer may include a water soluble material (e.g., a cold water soluble material, etc.). In some embodiments, the water soluble material is a fabric material. Such a fabric material may be woven or nonwoven. In one embodiment, the fabric material is a cold water soluble nonwoven material manufactured from partially hydrolyzed polyvinyl alcohol fibers (e.g. a PVA fabric, etc.). Such a film or sheet may be melted, welded, adhesively secured, or otherwise bonded to the cementitious layer. The top layer may be applied as part of a continuous process, where the base layer and top layer are moved at a common speed. In an alternative embodiment, a coating may be deposited along the cementitious layer and the second side of the structural layer, opposite the base layer by a sprayer to form the permeable layer. In some embodiments, the coating is configured to secure the constituents. A single sprayer may be configured on a track to move across the second side of the structural layer or one or more spray units may be stationary and configured to apply a coating to at least one of the top, sides, and ends of the structural layer.

At process 3014, the second side of the structural layer is secured to the top layer. The second side of the structural layer may be secured to the top layer using heat (e.g., heat welded, melted, bonded in a furnace, etc.), an adhesive, a chemical reaction, an intermediate coupling material, or still another process.

According to an exemplary embodiment, a sealing system is configured to seal the sides and ends of the cementitious composite mat. Such a sealing system may include additional sprayers configured to apply a coating to the sides and ends of the cementitious layer, a roller configured to fold a portion of the impermeable layer and/or the permeable layer over the sides and ends, or another system. According to an exemplary embodiment, sealing the sides and ends the cementitious layer further contains the constituents within the cementitious composite mat and prevents the constituents from migrating from the cementitious composite mat (e.g., during handling, transportation, installation, etc.).

According to an exemplary embodiment, a take-up roll is configured to roll the cementitious composite mat around a core. According to an exemplary embodiment, the core is coupled to a driver to rotate and apply a driving force that draws the cementitious composite mat. According to an exemplary embodiment, the cementitious composite mat is vacuum sealed as an entire roll. According to an alternative embodiment, sheets of cementitious composite mat may be vacuum sealed individually or as a stacked group. Such sealing facilitates transportation and handling of the cementitious composite mat.

Figure 31:
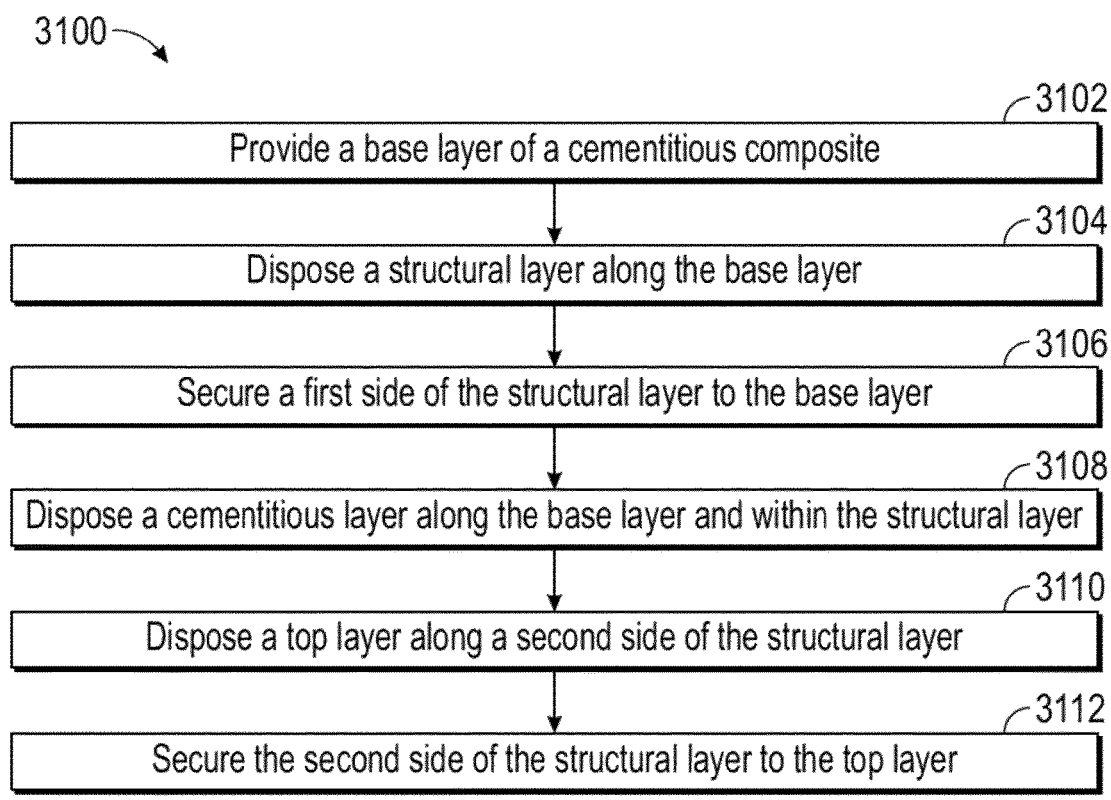
FIG. 31 is a flow diagram of a method for manufacturing the cementitious composite of FIG. 18, according to an exemplary embodiment.

Referring to FIG. 31, cementitious composite 10 may be manufactured using a line assembly machine, which may operate continuously (or may engage in an indexed operation mode where material is fed, stopped (e.g., to allow the machine to perform an operation) and thereafter again feed. According to an exemplary embodiment, FIG. 31 is a method 3100 for manufacturing cementitious composite 10 of FIGS. 18-21B.

At process 3102, a base layer (e.g., impermeable layer 50, etc.) of a cementitious composite mat (e.g., cementitious composite 10, etc.) is provided. At process 3104, a structural layer (e.g., structure layer 440, grid 460, geogrid 480, a combination thereof, etc.) is disposed along the base layer. At process 3106, a first side (e.g., bottom surface 468, bottom strand layer 482, etc.) of the structural layer is secured to the base layer. The first side of the structural layer may be secured to the base layer using heat (e.g., heat welded, melted, bonded in a furnace, etc.), an adhesive, a chemical reaction, an intermediate coupling material, or still another process.

At process 3108, a cementitious layer (e.g., cementitious mixture 30, etc.) is disposed along the base layer and within the structural layer. According to an exemplary embodiment, constituents (e.g., cementitious materials 32, aggregates 34, additives, absorbent material 36, etc.) of the cementitious layer are mixed together prior to deposition along the base layer and within the structural layer. The mixing may evenly distribute the constituents. The constituents may be mixed together in a container or hopper. By way of example, the hopper or container may include a dispenser/distributor that deposits the constituents onto the base layer and within the structural layer as the impermeable layer and the structural layer pass below the dispenser. The dispenser/distributor may be shaped (e.g., rectangular, adjustable, etc.) to facilitate even distribution of the constituents. In one embodiment, the base layer and the structural layer pass over a vibratory table configured to vibrate to further facilitate even distribution and/or compaction of the constituents to form a uniform cementitious layer within the structural layer. In other embodiments, the constituents are compressed into the structural layer. According to an exemplary embodiment, the base layer and the structural layer having received the constituents from the dispenser thereafter passes over a compactor. In one embodiment, the compactor includes rollers. In some embodiments, the rollers are configured to compress the constituents with a pressure of between 200 and 10,000 pounds per square inch. Such rollers may replace the vibratory table or may be positioned before, after, or with the vibratory table. Rollers may also move the base layer, structural layer, and the cementitious layer. In other embodiments, the compactor includes a hydraulic press or other type of physical compactor. In an alternative embodiment, compactor incorporates a vacuum system configured to draw cementitious material into a prescribed shape.

At process 3110, a top layer (e.g., permeable layer 20, etc.) is disposed along a second side (e.g., top surface 466, top strand layer 482, etc.) of the structural layer, opposite the base layer. The top layer may include a film, sheet, or other configuration of material applied to form an upper containment layer around the cementitious layer. By way of example, the top layer may include a water soluble material (e.g., a cold water soluble material, etc.). In some embodiments, the water soluble material is a fabric material. Such a fabric material may be woven or nonwoven. In one embodiment, the fabric material is a cold water soluble nonwoven material manufactured from partially hydrolyzed polyvinyl alcohol fibers (e.g. a PVA fabric, etc.). Such a film or sheet may be melted, welded, adhesively secured, or otherwise bonded to the cementitious layer. The top layer may be applied as part of a continuous process, where the base layer and top layer are moved at a common speed. In an alternative embodiment, a coating may be deposited along the cementitious layer and the second side of the structural layer, opposite the base layer by a sprayer to form the permeable layer. In some embodiments, the coating is configured to secure the constituents. A single sprayer may be configured on a track to move across the second side of the structural layer or one or more spray units may be stationary and configured to apply a coating to at least one of the top, sides, and ends of the structural layer.

At process 3112, the second side of the structural layer is secured to the top layer. The second side of the structural layer may be secured to the top layer using heat (e.g., heat welded, melted, bonded in a furnace, etc.), an adhesive, a chemical reaction, an intermediate coupling material, or still another process. In an alternative embodiment, process 3106 and process 3112 are performed simultaneously. For example, the first side and the second side of the structural layer may be secured to the base layer and the top layer, respectively, after the cementitious layer is disposed within the structural layer and the top layer is disposed along the structural layer (i.e., the base layer is not attached to the structural layer before the top layer).

According to an exemplary embodiment, a sealing system is configured to seal the sides and ends of the cementitious composite mat. Such a sealing system may include additional sprayers configured to apply a coating to the sides and ends of the cementitious layer, a roller configured to fold a portion of the impermeable layer and/or the permeable layer over the sides and ends, or another system. According to an exemplary embodiment, sealing the sides and ends the cementitious layer further contains the constituents within the cementitious composite mat and prevents the constituents from migrating from the cementitious composite mat (e.g., during handling, transportation, installation, etc.).

According to an exemplary embodiment, a take-up roll is configured to roll the cementitious composite mat around a core. According to an exemplary embodiment, the core is coupled to a driver to rotate and apply a driving force that draws the cementitious composite mat. According to an exemplary embodiment, the cementitious composite mat is vacuum sealed as an entire roll. According to an alternative embodiment, sheets of cementitious composite mat may be vacuum sealed individually or as a stacked group. Such sealing facilitates transportation and handling of the cementitious composite mat.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It should be noted that the orientation of various elements may differ according to other exemplary embodiments and that such variations are intended to be encompassed by the present disclosure.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" may be used to mean serving as an example, instance or illustration. Any embodiment or design described herein as "exemplary" may be not necessarily to be construed as preferred or advantageous over other embodiments or designs. Rather, use of the word exemplary may be intended to present concepts in a concrete manner. Accordingly, all such modifications are intended to be included within the scope of the present inventions. The order or sequence of any process or method steps may be varied or re-sequenced according to alternative embodiments. Any means-plus-function clause may be intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A cementitious composite for in-situ hydration, the cementitious composite comprising:

a structure layer having a first side and an opposing second side;

a cementitious material disposed within the structure layer, the cementitious material including a plurality of cementitious particles;

a sealing layer disposed along and coupled to the first side of the structure layer; and a containment layer disposed along the opposing second side of the structure layer, the containment layer configured to prevent the plurality of cementitious particles from migrating out of the structure layer;

wherein the containment layer includes a water soluble adhesive coating that includes a curing agent configured to be absorbed by the cementitious material during in-situ hydration.

2. The cementitious composite of claim 1, wherein the containment layer is at least one of water soluble and permeable.

3. The cementitious composite of claim 1, wherein the structure layer includes a plurality of independent connectors that extend from the sealing layer to the containment layer, each of the plurality of independent connectors including a first end that is coupled to the sealing layer and an opposing second end that is coupled to the containment layer.

4. The cementitious composite of claim 1, wherein the cementitious mixture further includes interconnection particles that are configured to at least one of melt, fuse, deform, and expand in response to activation, wherein the activation of the interconnection particles causes the interconnection particles to form the structure layer within the cementitious mixture that attaches to at least one of the sealing layer and the containment layer.

5. The cementitious composite of claim 1, wherein the structure layer includes a grid having interconnecting walls that define a plurality of cavities configured to receive the cementitious material.

6. The cementitious composite of claim 1, wherein the structure layer includes a geogrid having a first strand layer attached to a second strand layer with a plurality of coupling members.

7. The cementitious composite of claim 1, wherein the containment layer is treated with at least one of paint, glued fibers, glued sand, and a water soluble adhesive to provide a desired disintegration time of the containment layer during in-situ hydration.

8. A cementitious composite for in-situ hydration, the cementitious composite comprising:

a membrane including a structure layer and an impermeable layer;

a containment layer disposed along a first side of the structure layer, wherein the impermeable layer is disposed along an opposing second side of the structure layer; and a cementitious mixture disposed along and within the membrane, the cementitious mixture including cementitious material, aggregate, and absorbent material, the absorbent material configured to absorb water and at least one of expand and gel during in-situ hydration and thereby lock the cementitious material and aggregate in place to prevent washout of the cementitious mixture from the membrane;

wherein the containment layer includes a water soluble adhesive coating that includes a curing agent configured to be absorbed by the cementitious mixture during in-situ hydration.

9. The cementitious composite of claim 8, wherein the absorbent material absorbs between 75 and 300 times its weight in water.

10. The cementitious composite of claim 8, wherein the absorbent material includes at least one of a superabsorbent polymer and a superabsorbent clay.

11. The cementitious composite of claim 8, wherein the absorbent material includes particles that have a particle size at a mix ratio, wherein the mix ratio includes 0-30% of the particles having a size less than 90 microns, 10-60% of the particles having a size between 90-150 microns, 25-80% of the particles having a size between 150-300microns, and 0-30% of the particles having a size greater than 300 microns.

12. The cementitious composite of claim 8, wherein the cementitious mixture further includes interconnection particles that are configured to at least one of melt, fuse, deform, and expand in response to activation, wherein the activation of the interconnection particles causes the interconnection particles to form the structure layer within the cementitious mixture that attaches to the impermeable layer.

13. The cementitious composite of claim 8, wherein the structure layer includes at least one of a grid, a geogrid, a plurality of independent connectors, and a nonwoven bunched mat.

14. A cementitious composite for in-situ hydration, the cementitious composite comprising:
   a structure layer having at least one strand arranged in at least one of a coiled configuration and a bunched configuration, the structure layer forming a mat having a first side and an opposing second side;
   a cementitious material disposed within the structure layer, the cementitious material including a plurality of cementitious particles;
   a sealing layer disposed along the first side of the structure layer and coupled to the at least one strand; and
   a containment layer disposed along the opposing second side of the structure layer, the containment layer configured to prevent the plurality of cementitious particles from migrating out of the structure layers;
   wherein the containment layer includes a water soluble adhesive coating that includes a curing agent configured to be absorbed by the cementitious material during in-situ hydration.

15. The cementitious composite of claim 14, wherein the at least one strand includes a single, continuous strand arranged to form the least one of the coiled configuration and the bunched configuration of the structure layer.

16. The cementitious composite of claim 14, wherein the at least one strand includes a plurality of strands arranged to form the least one of the coiled configuration and the bunched configuration of the structure layer.

17. The cementitious composite of claim 14, wherein the at least one strand of the mat is held together by friction and entanglement.

18. The cementitious composite of claim 17, wherein the at least one strand includes a plurality of extensions that further hold the at least one strand in the least one of the coiled configuration and the bunched configuration.

* * * * *